Oct. 27, 1925. 1,558,947
M. TEETOR
CALCULATING MACHINE
Filed May 1, 1920 59 Sheets-Sheet 1
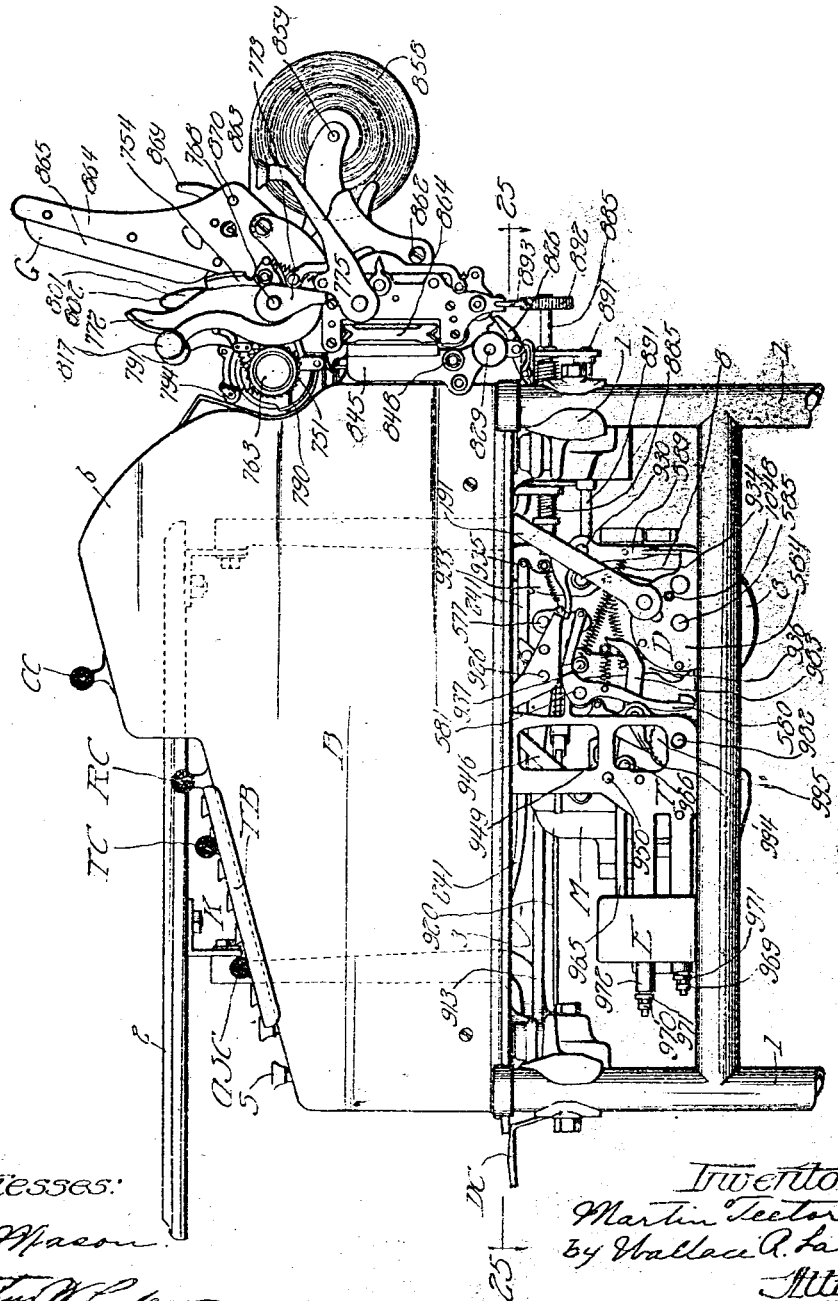

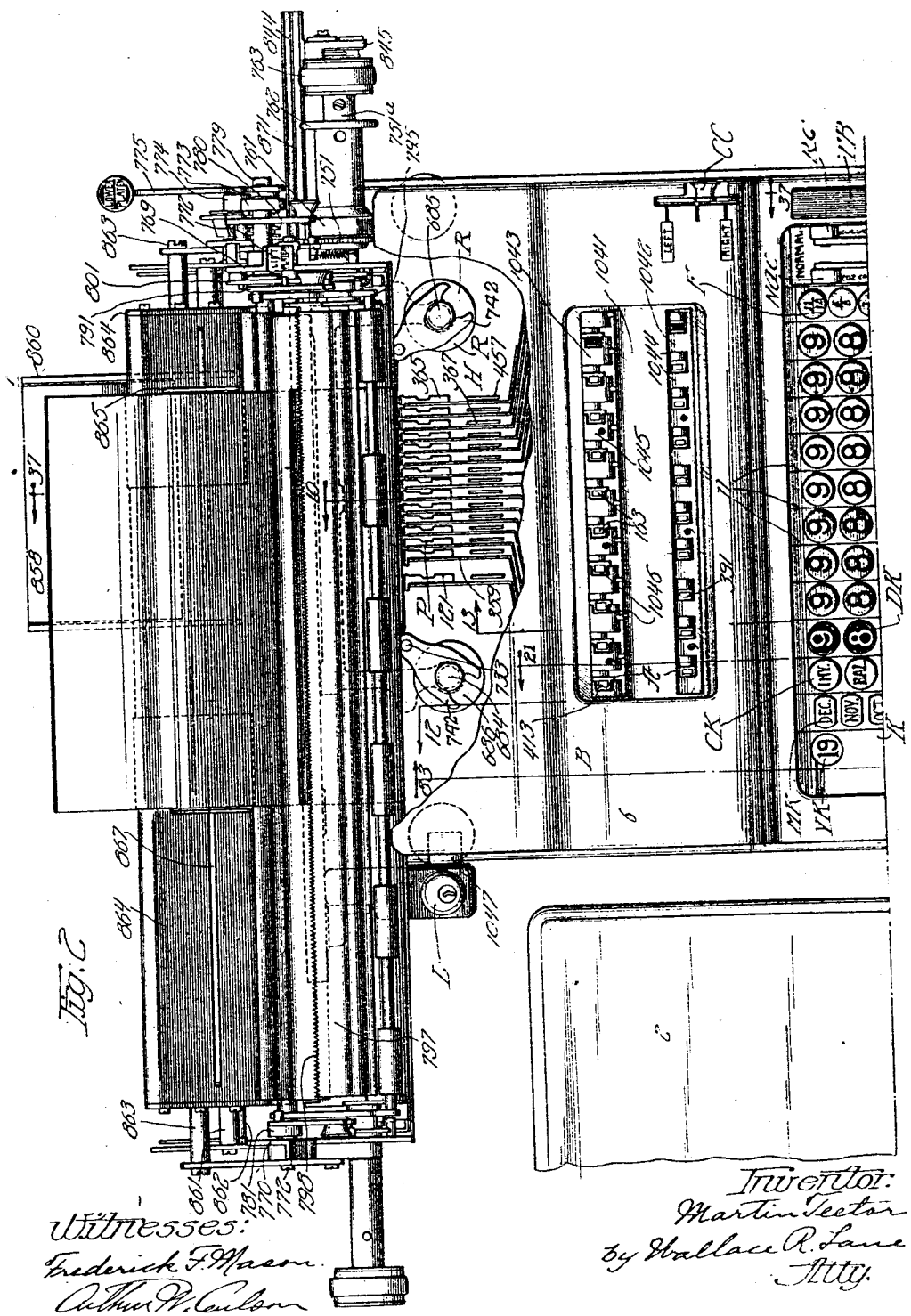

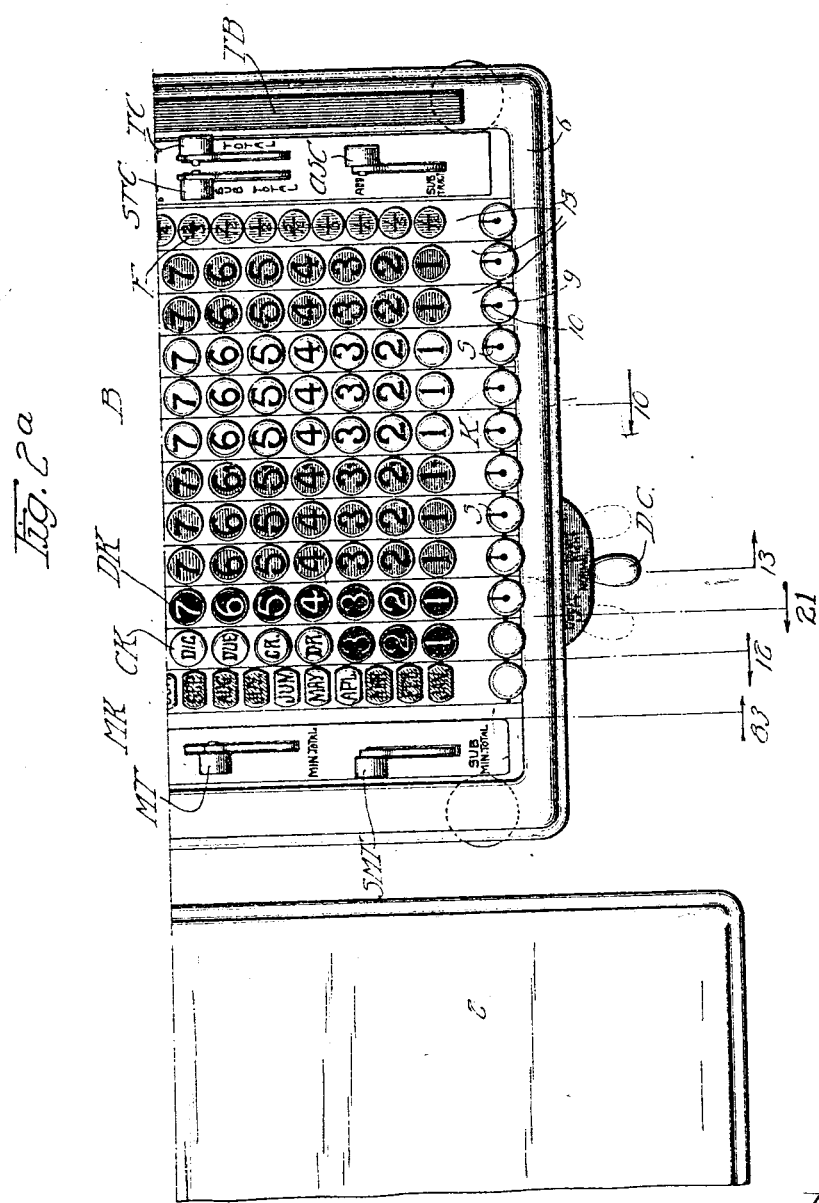

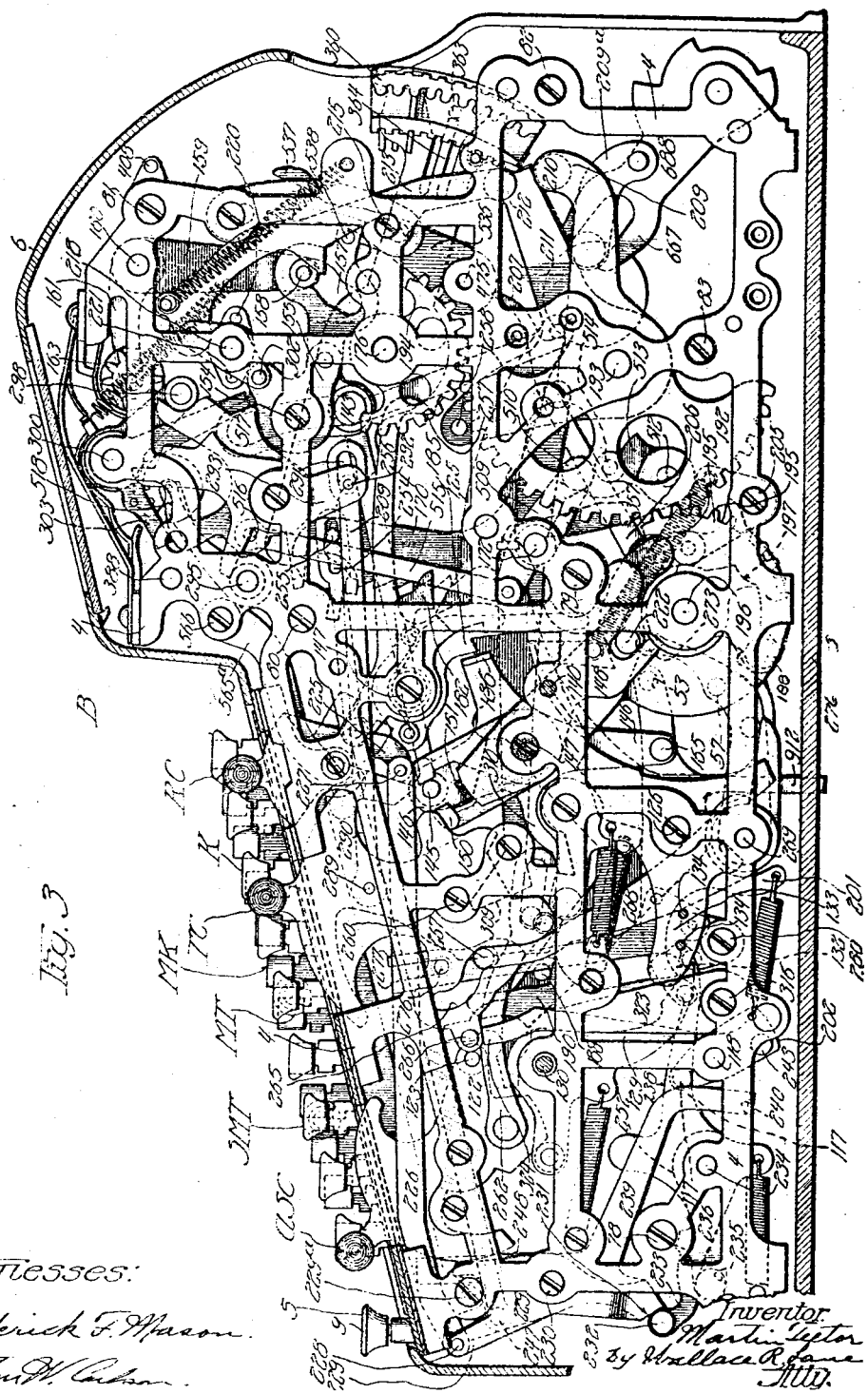

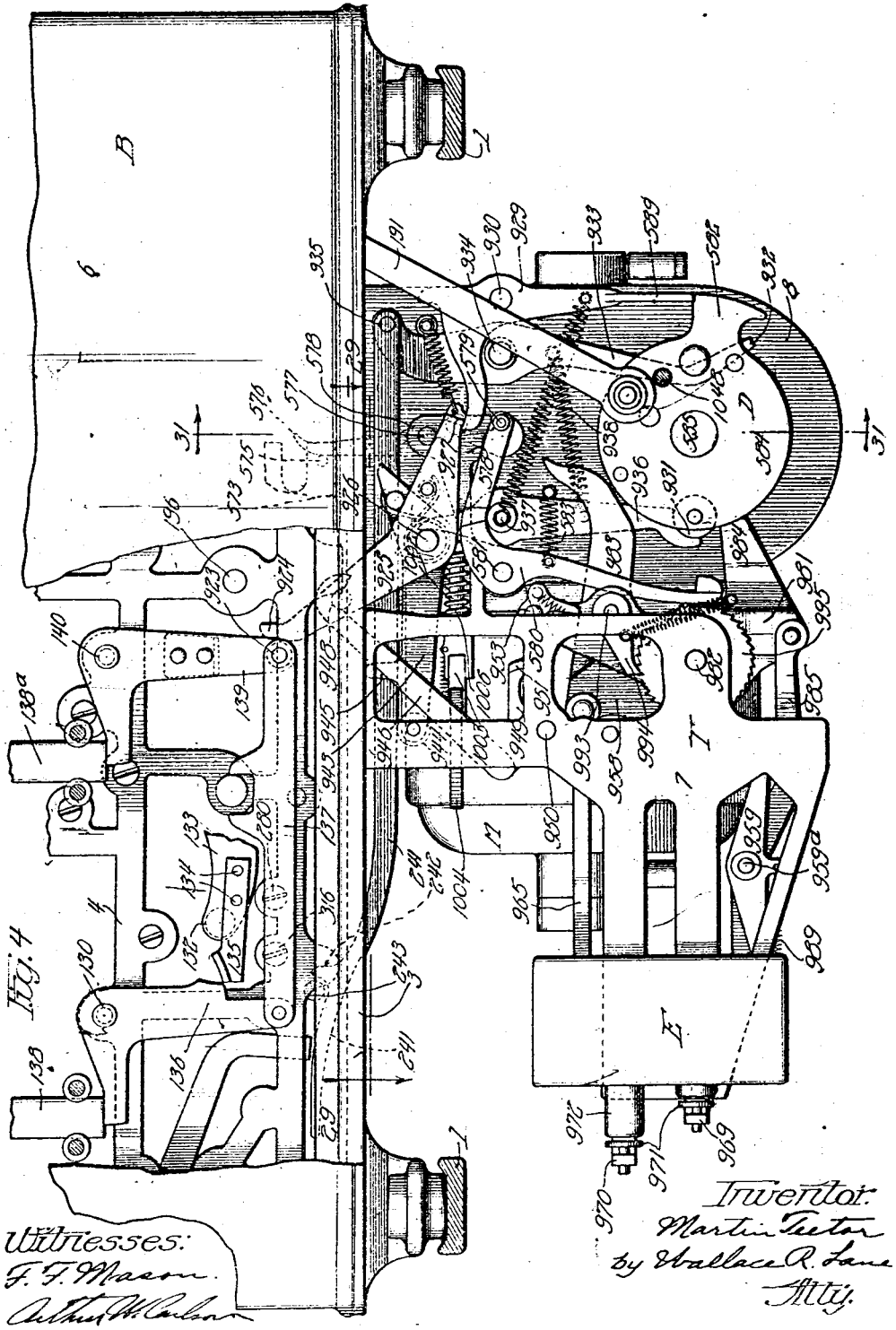

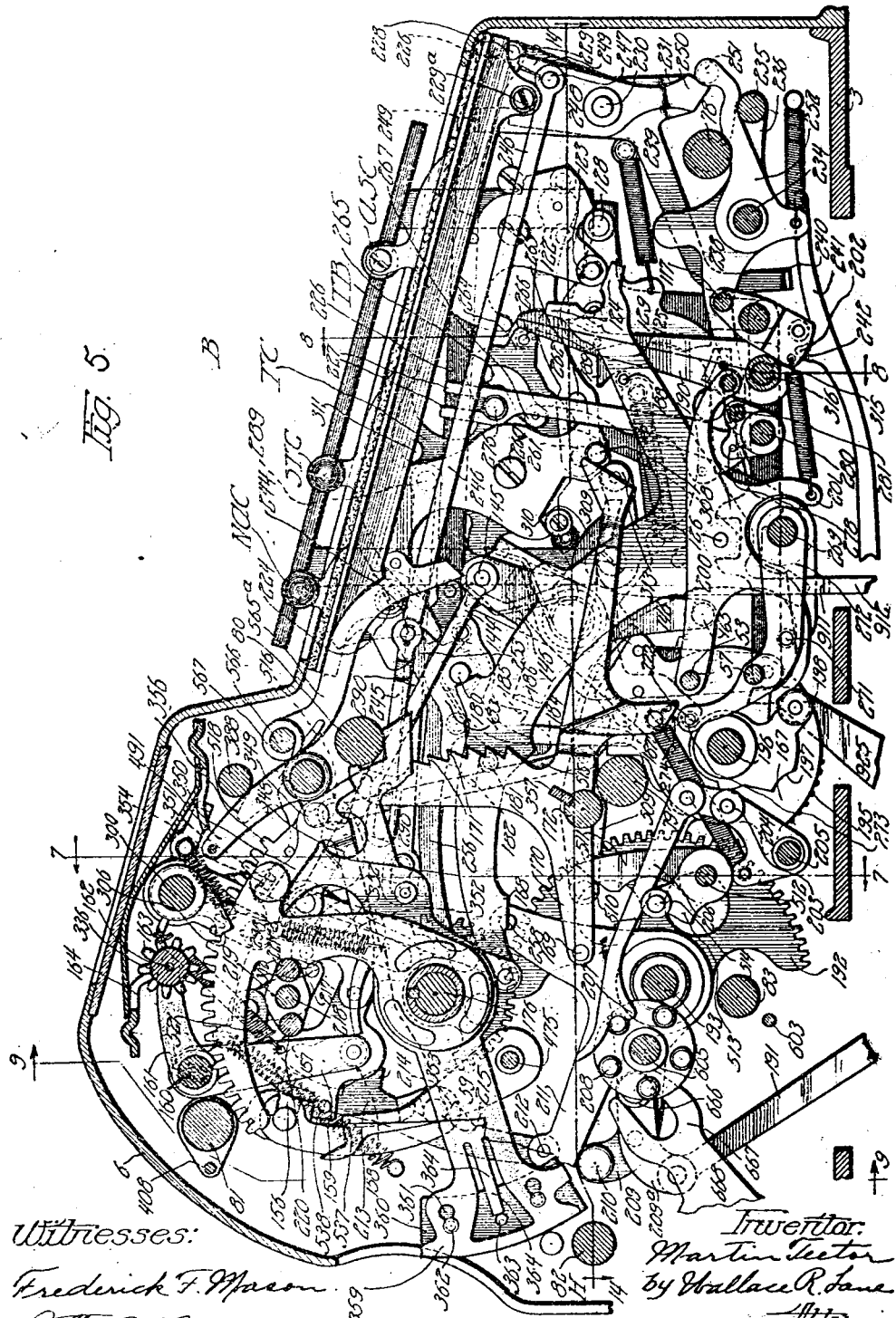

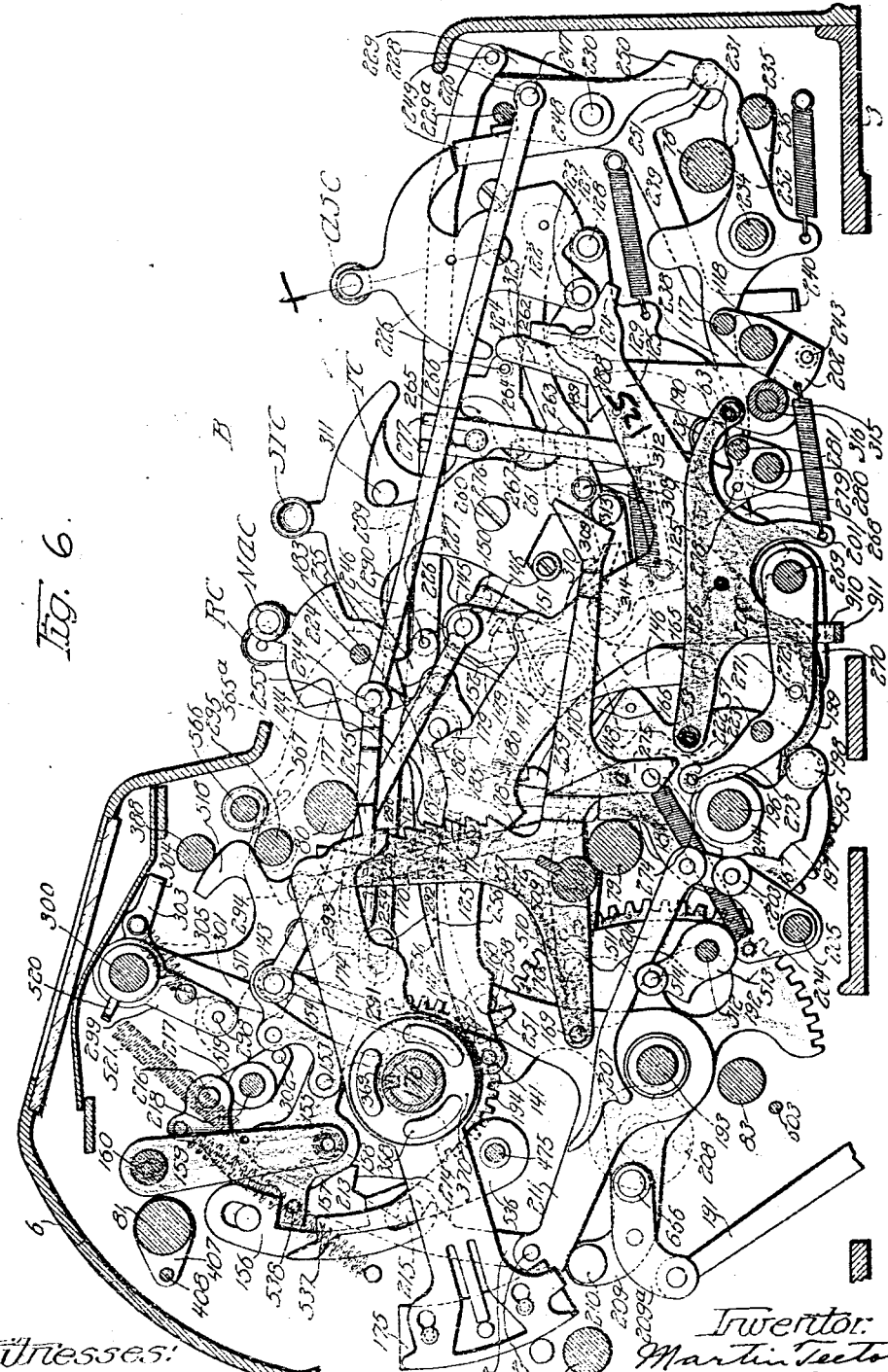

Oct. 27, 1925.
M. TEETOR
CALCULATING MACHINE
Filed May 1, 1920
1,558,947
59 Sheets-Sheet 8
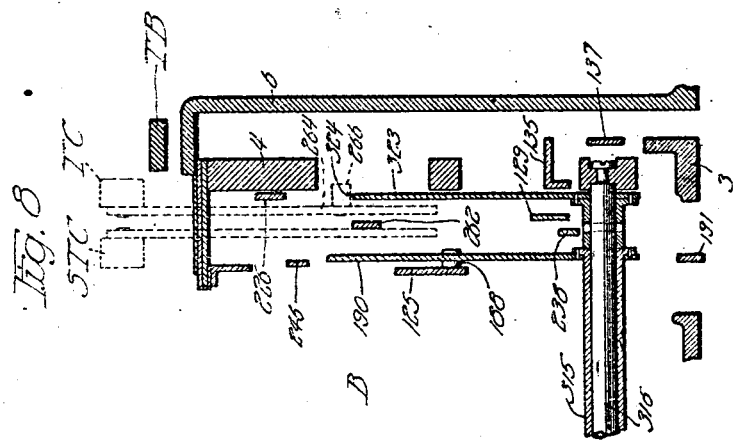
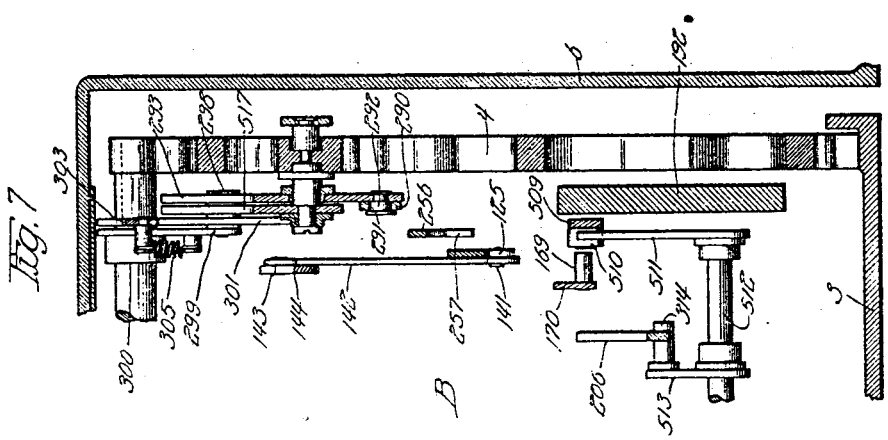
Witnesses:
Frederick F. Mason
Inventor.
Martin Teetor
by Wallace R. Lane
Atty.

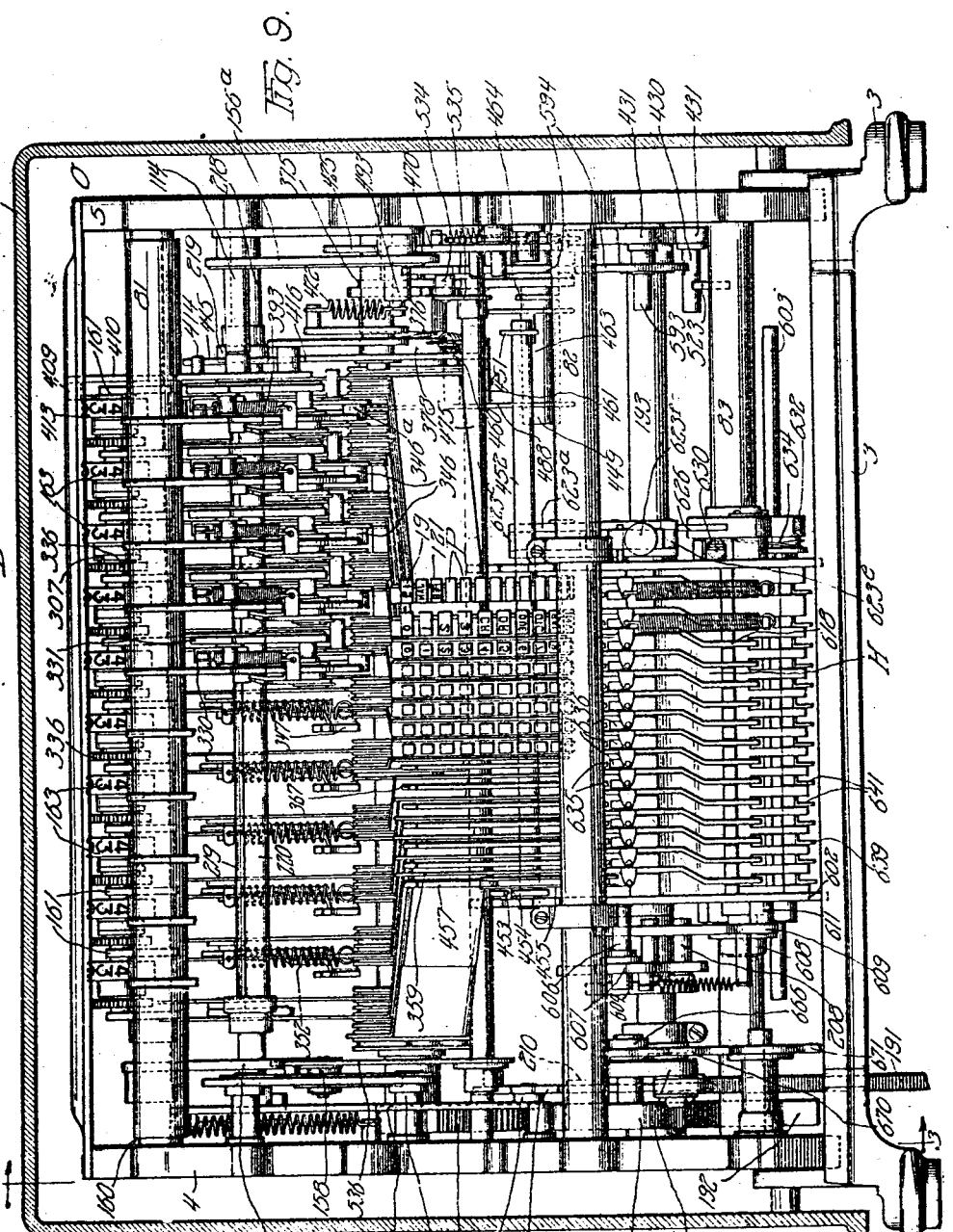

Oct. 27, 1925.

M. TEETOR

CALCULATING MACHINE

Filed May 1, 1920    59 Sheets-Sheet 10

1,558,947

Witnesses:
Frederick F. Mason

Inventor
Martin Teetor
By Wallace R. Lane Atty

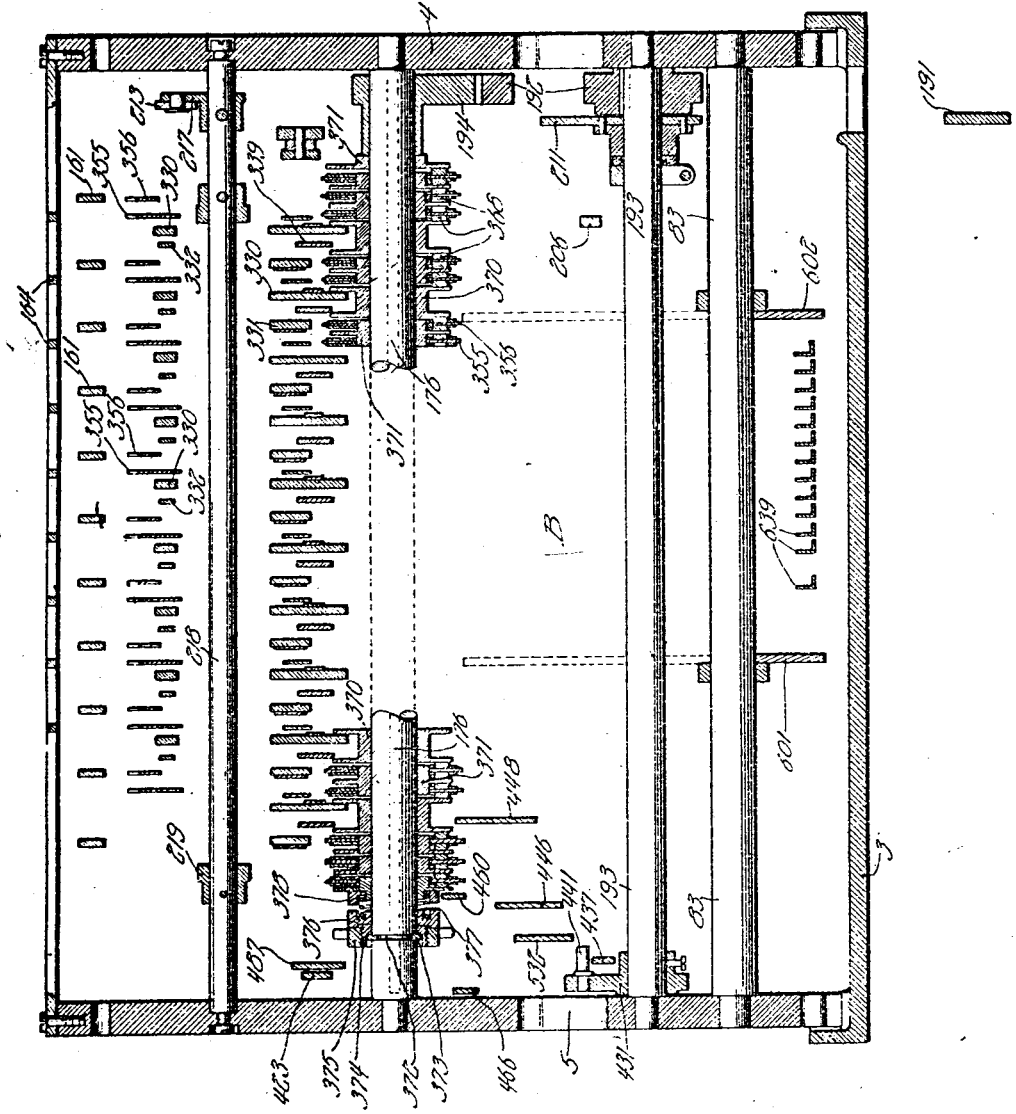

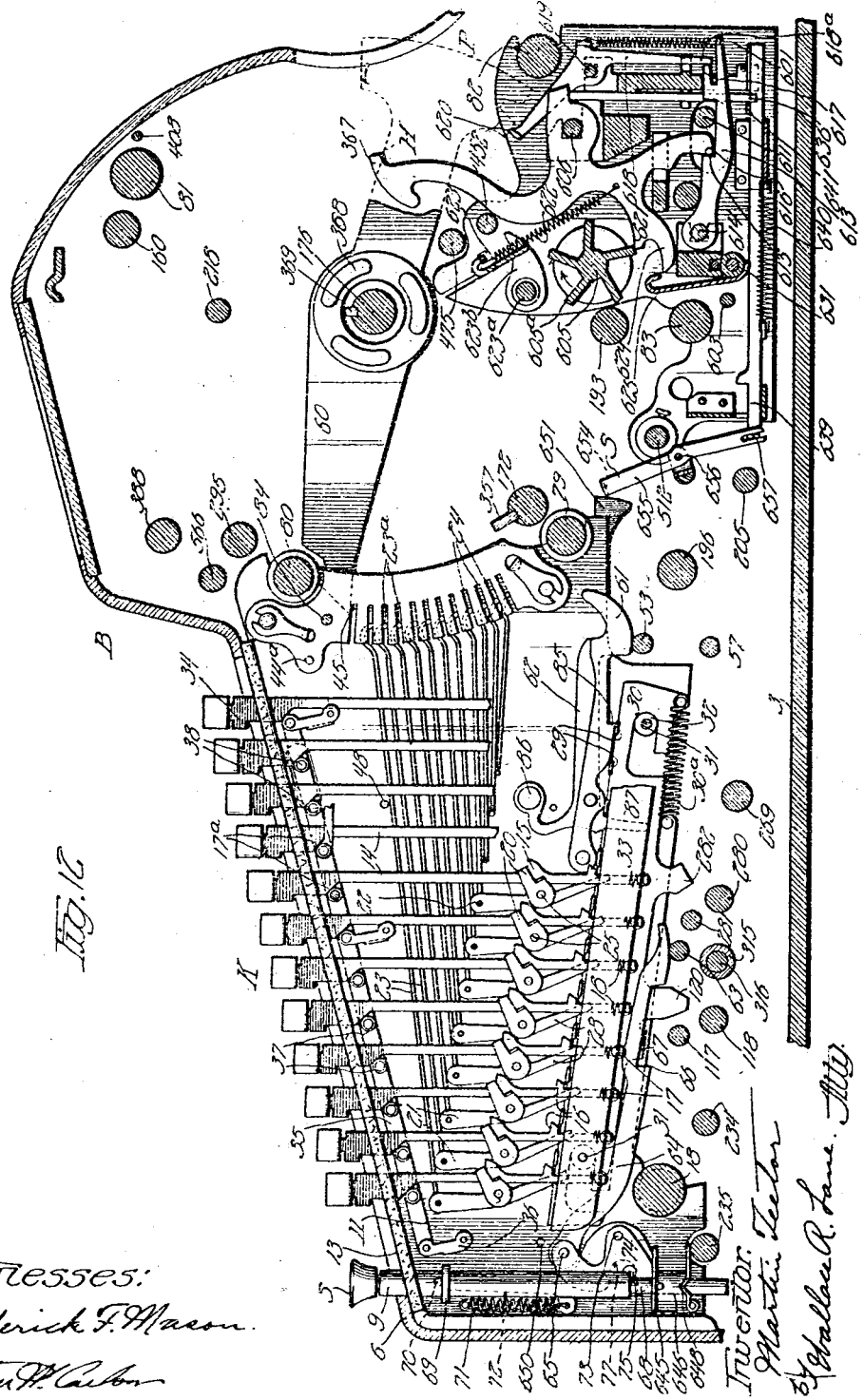

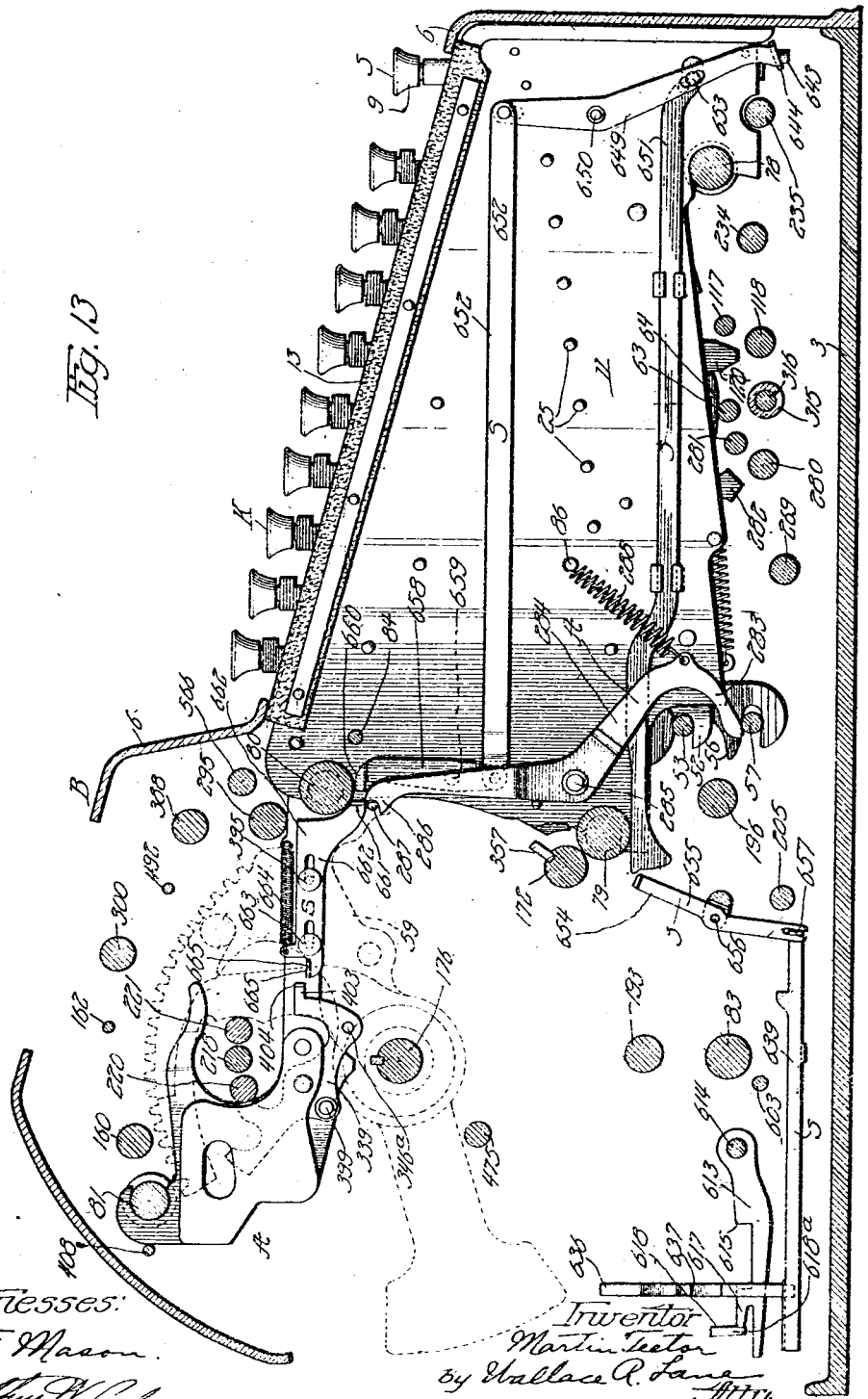

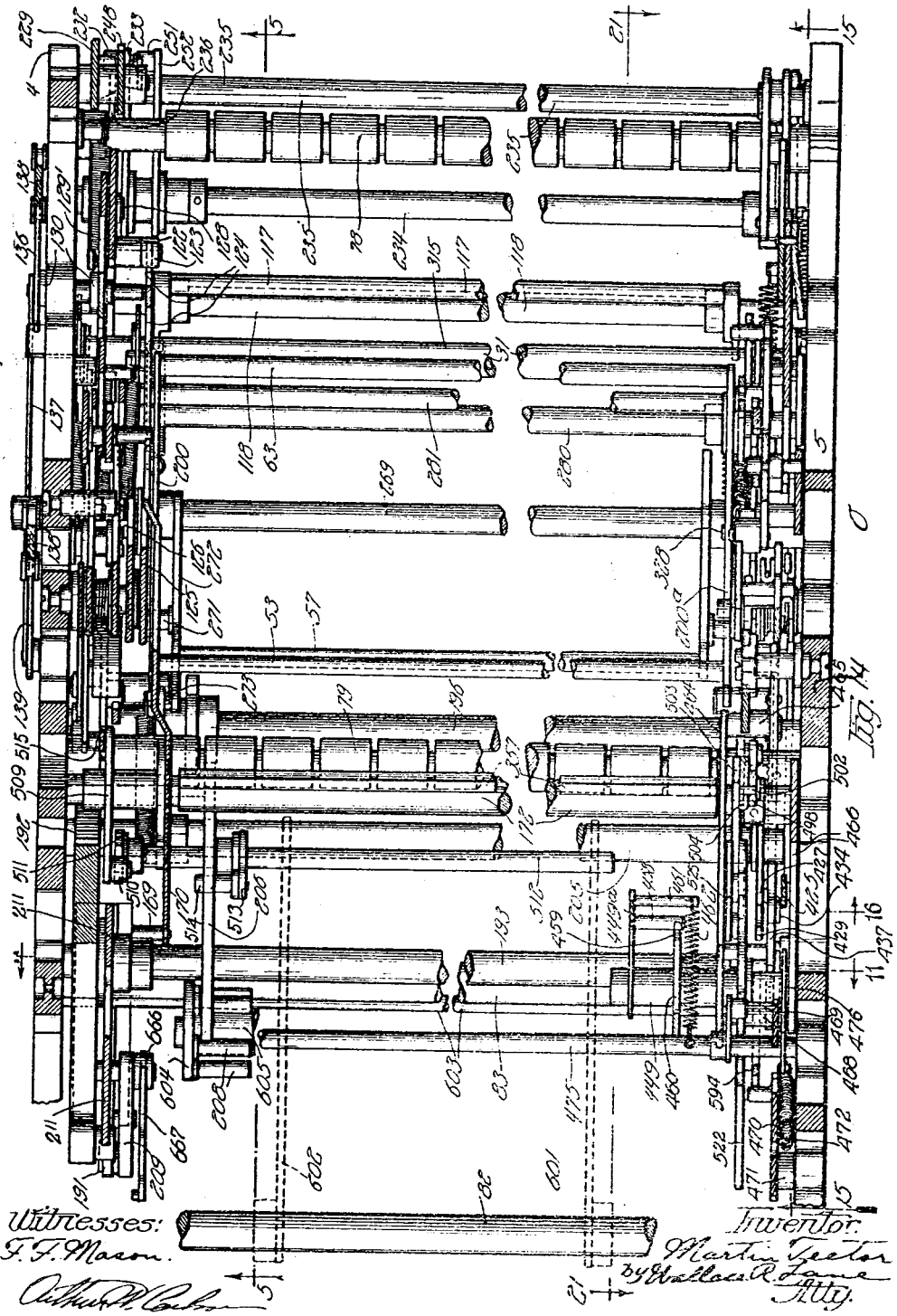

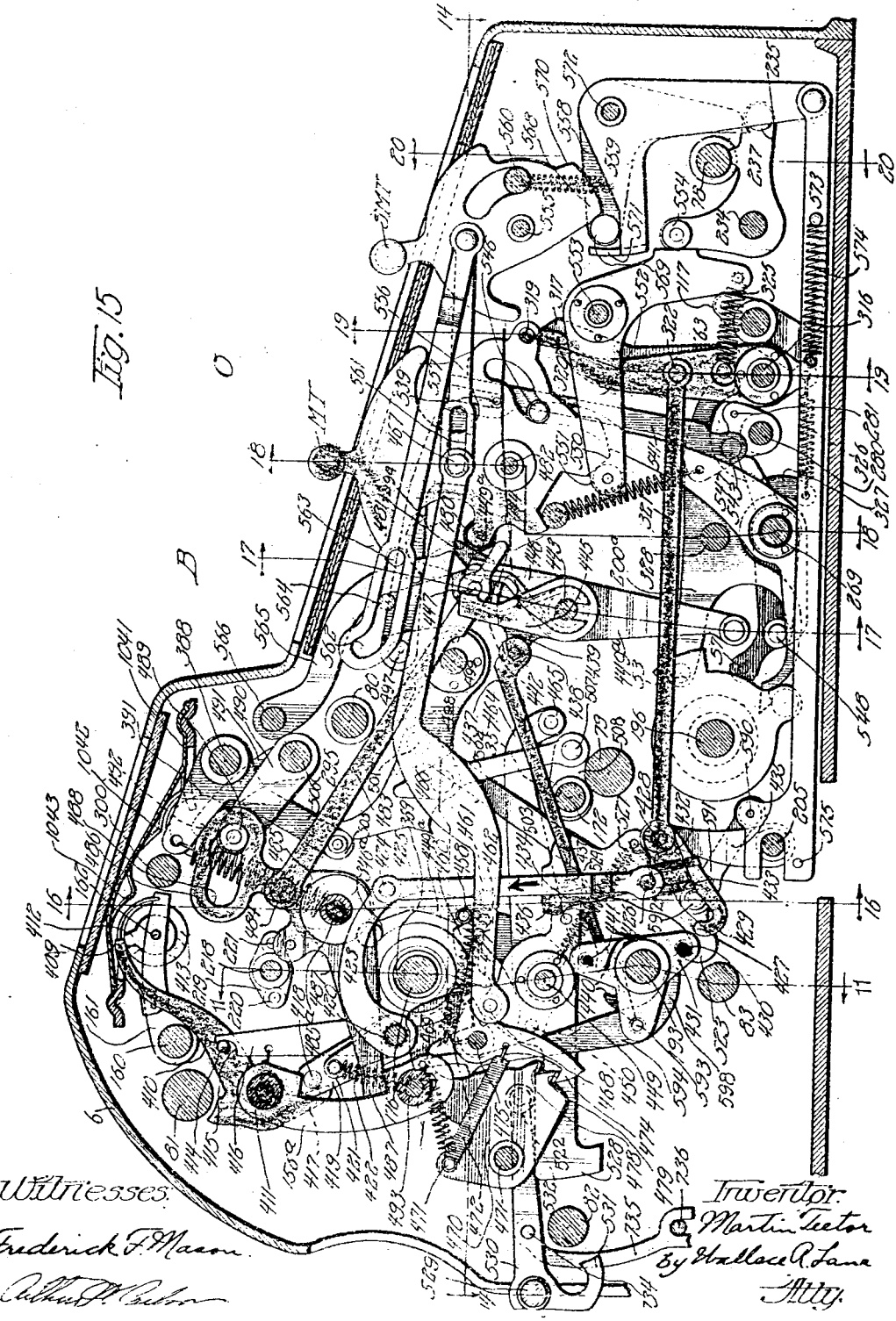

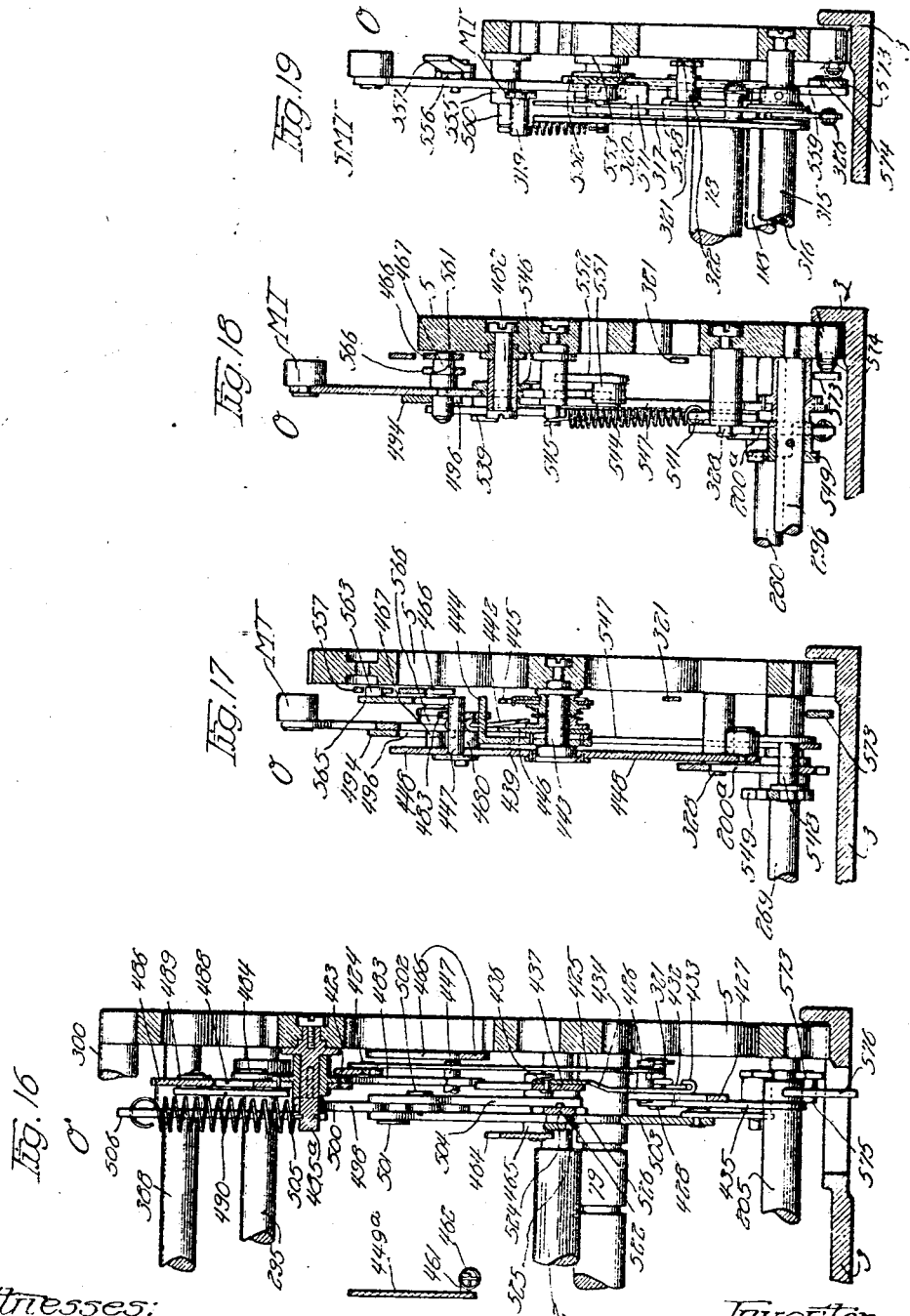

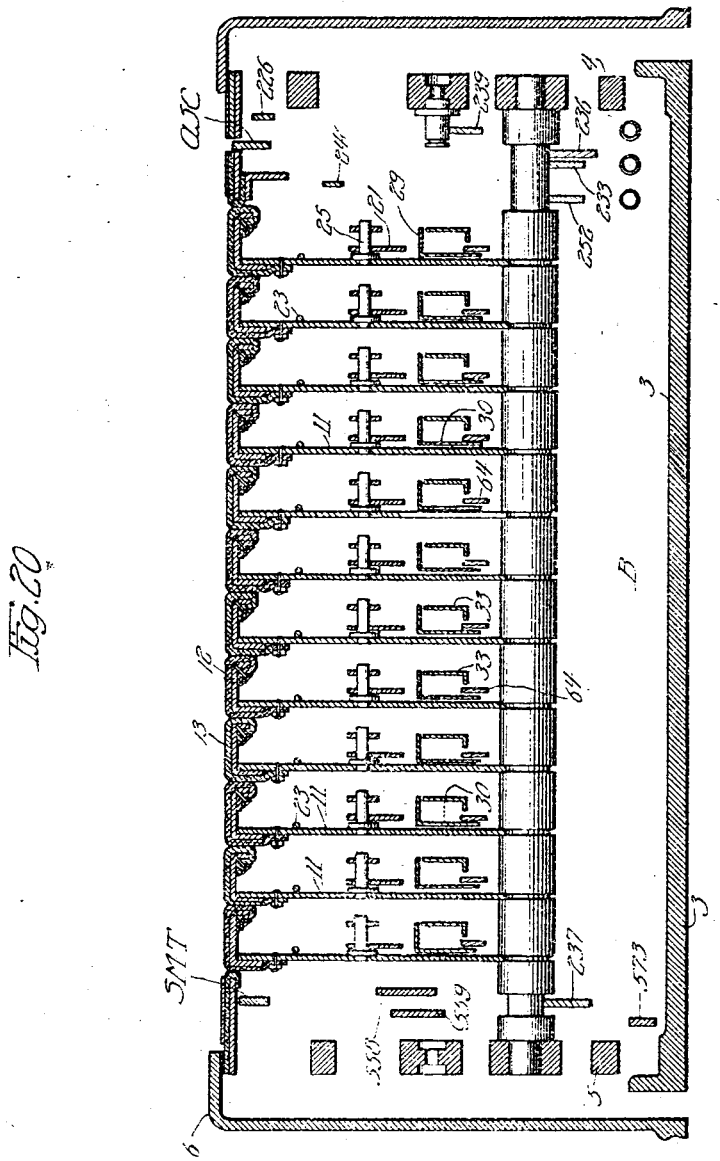

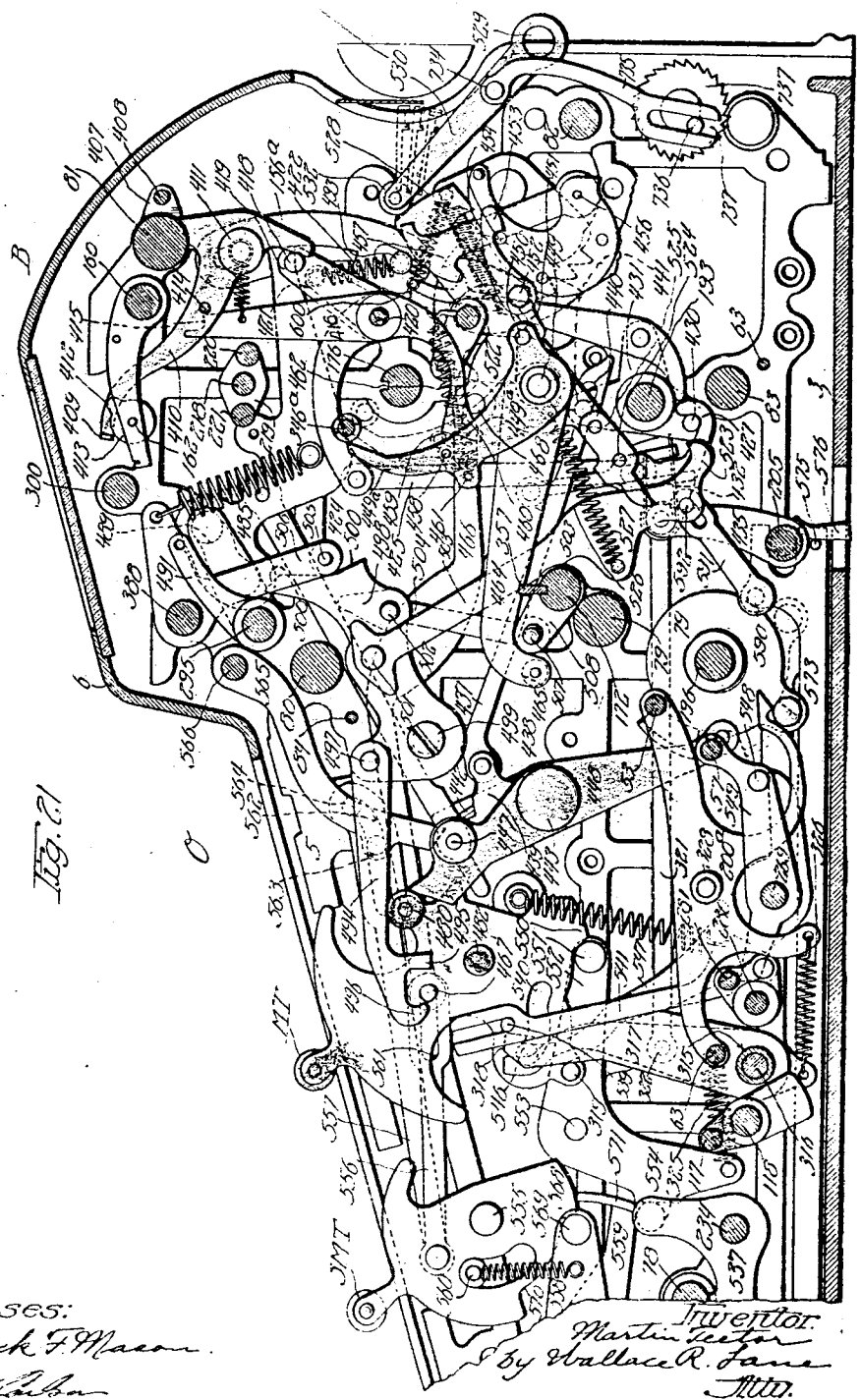

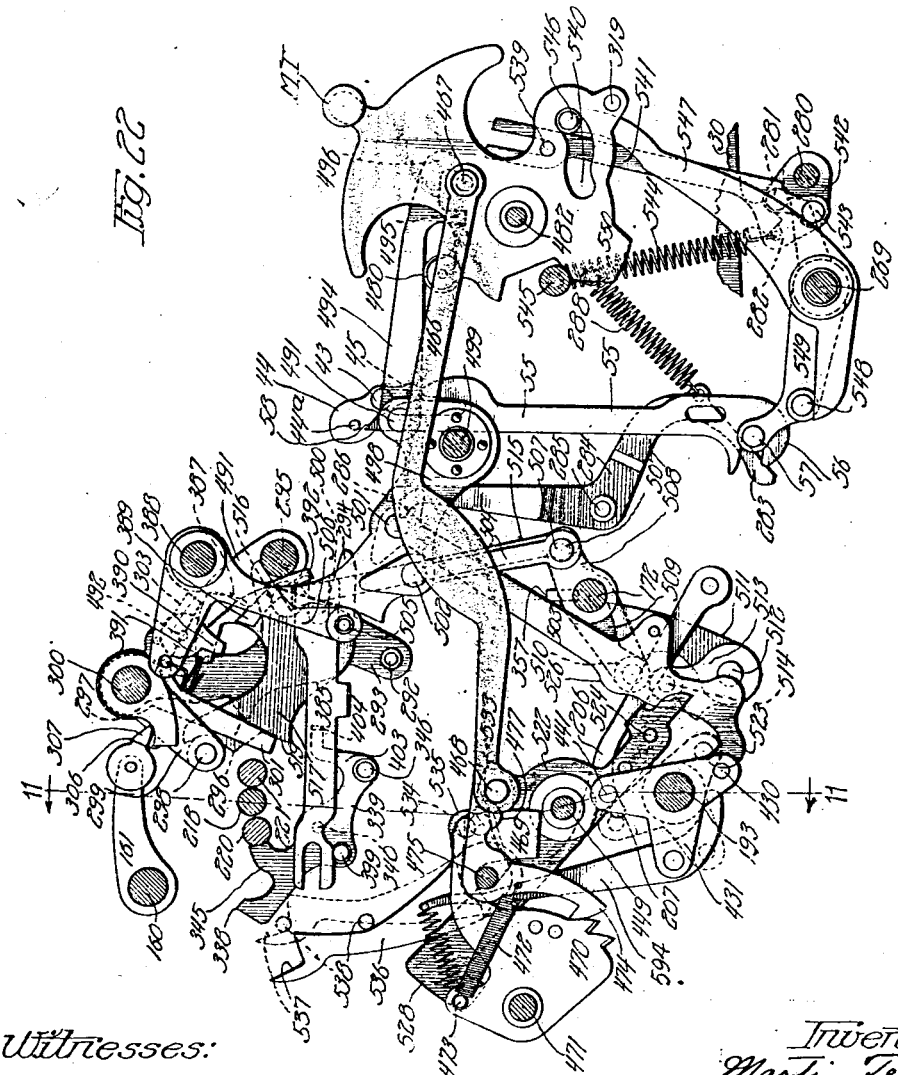

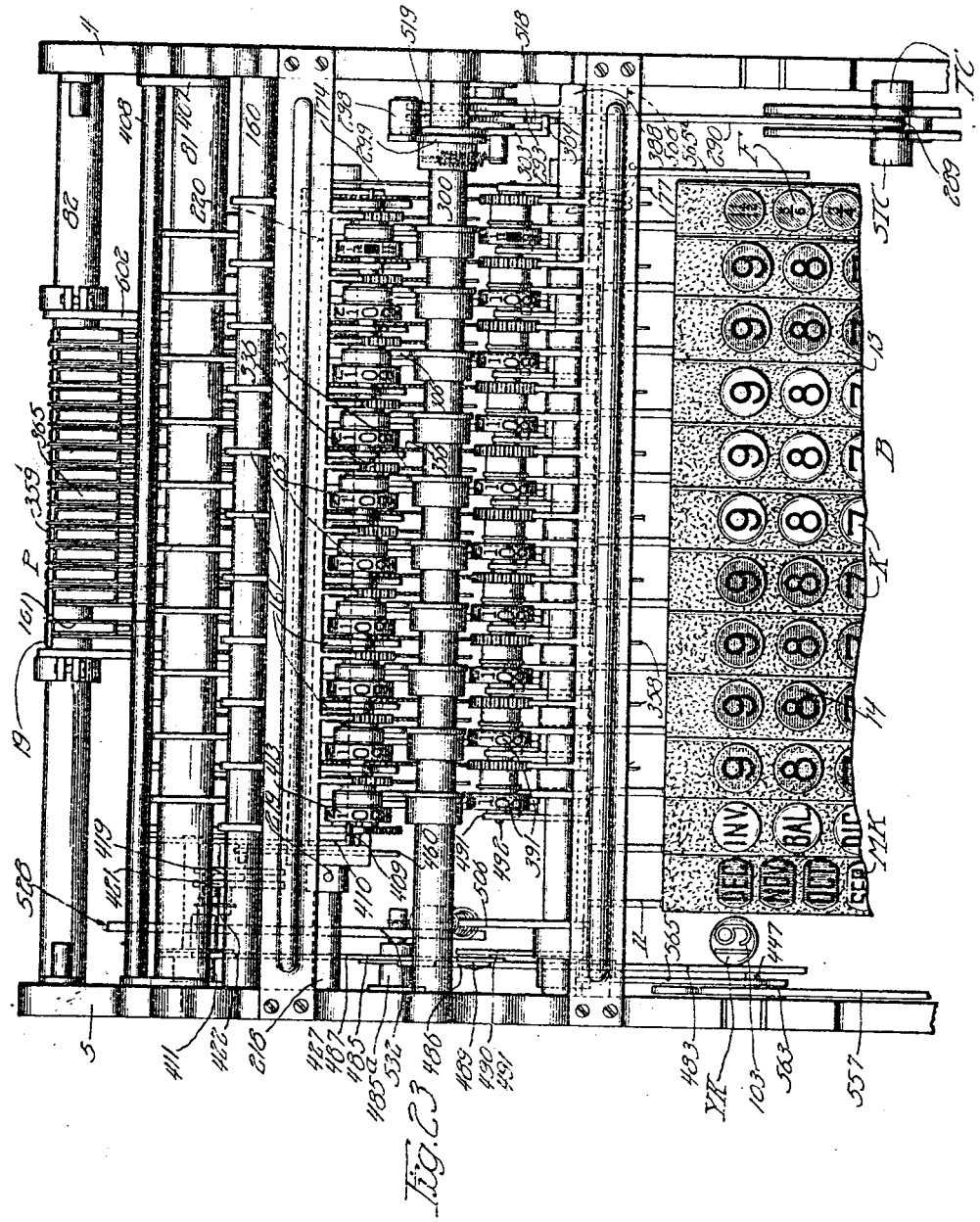

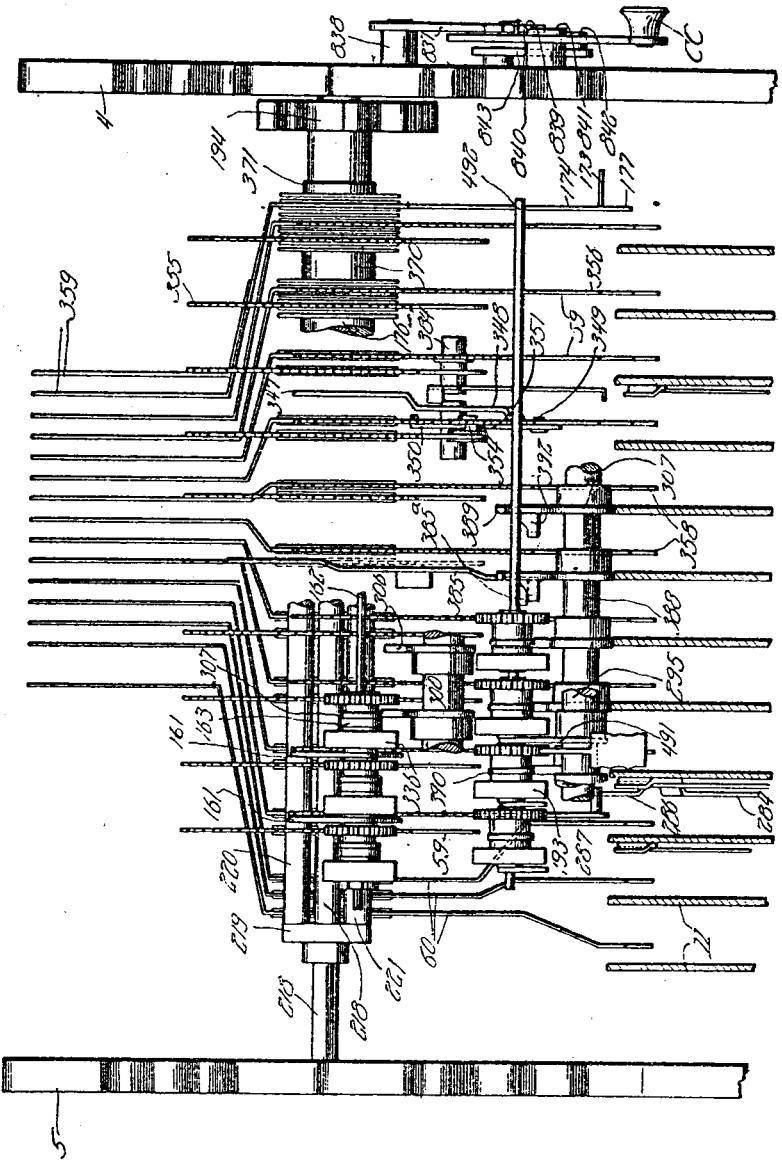

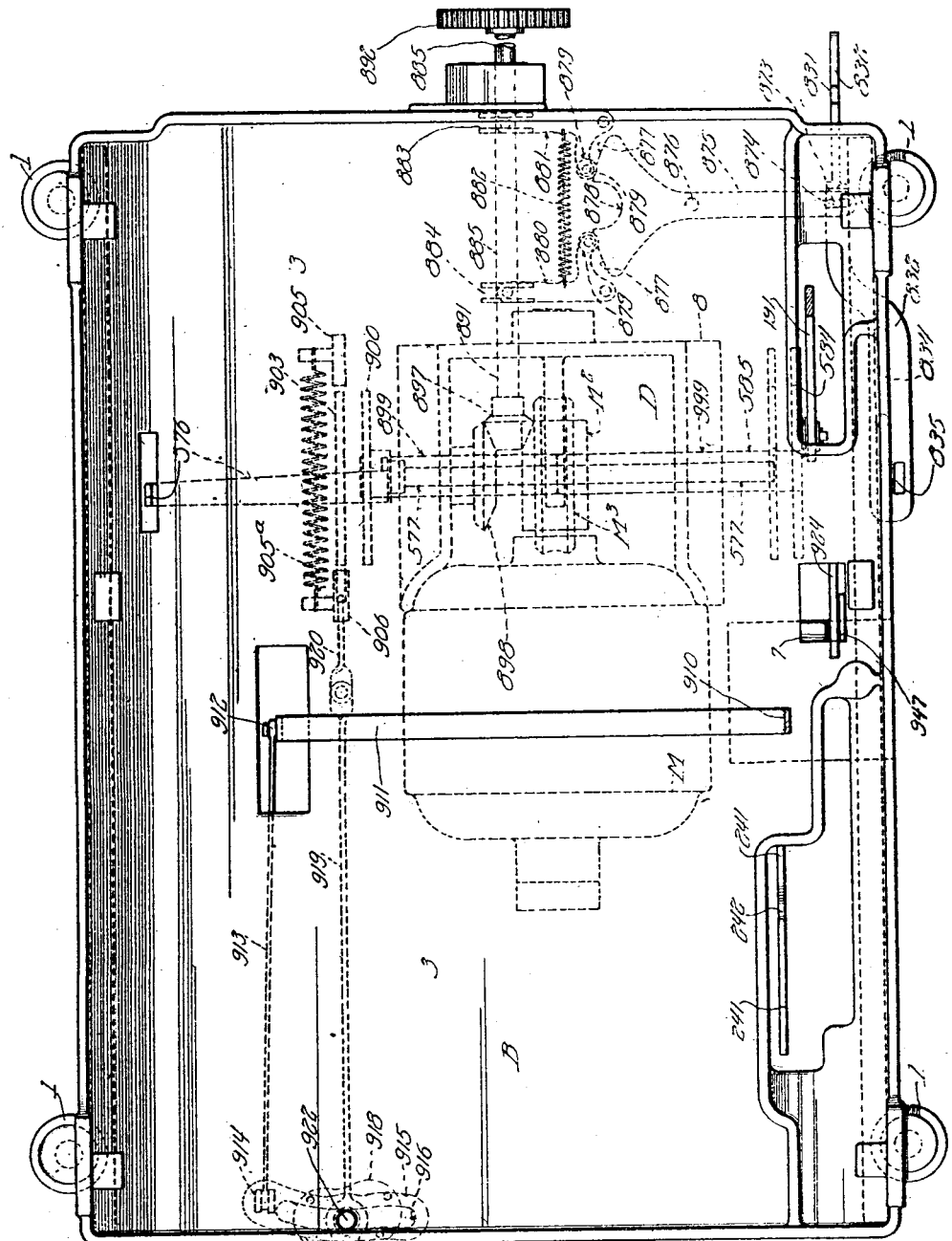

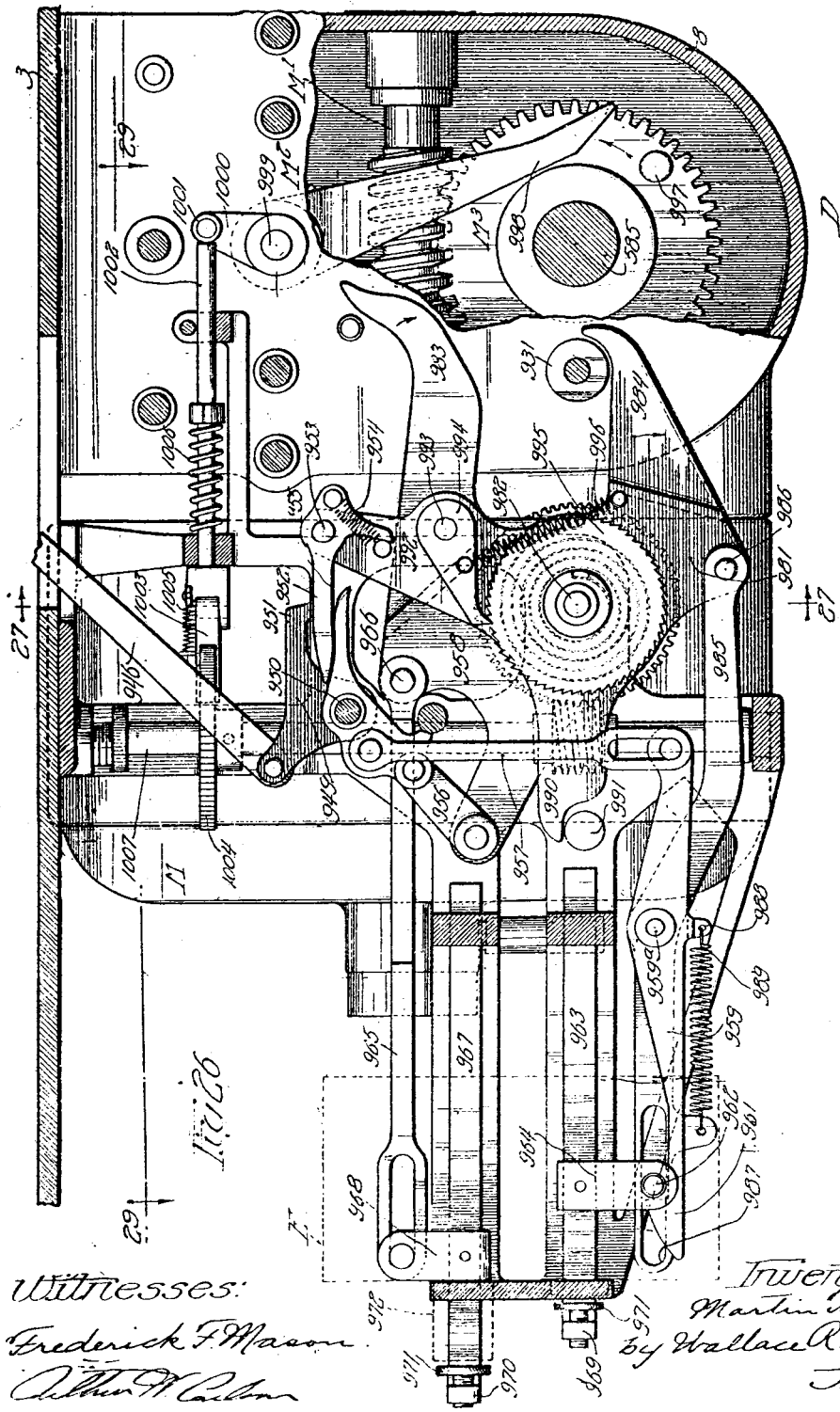

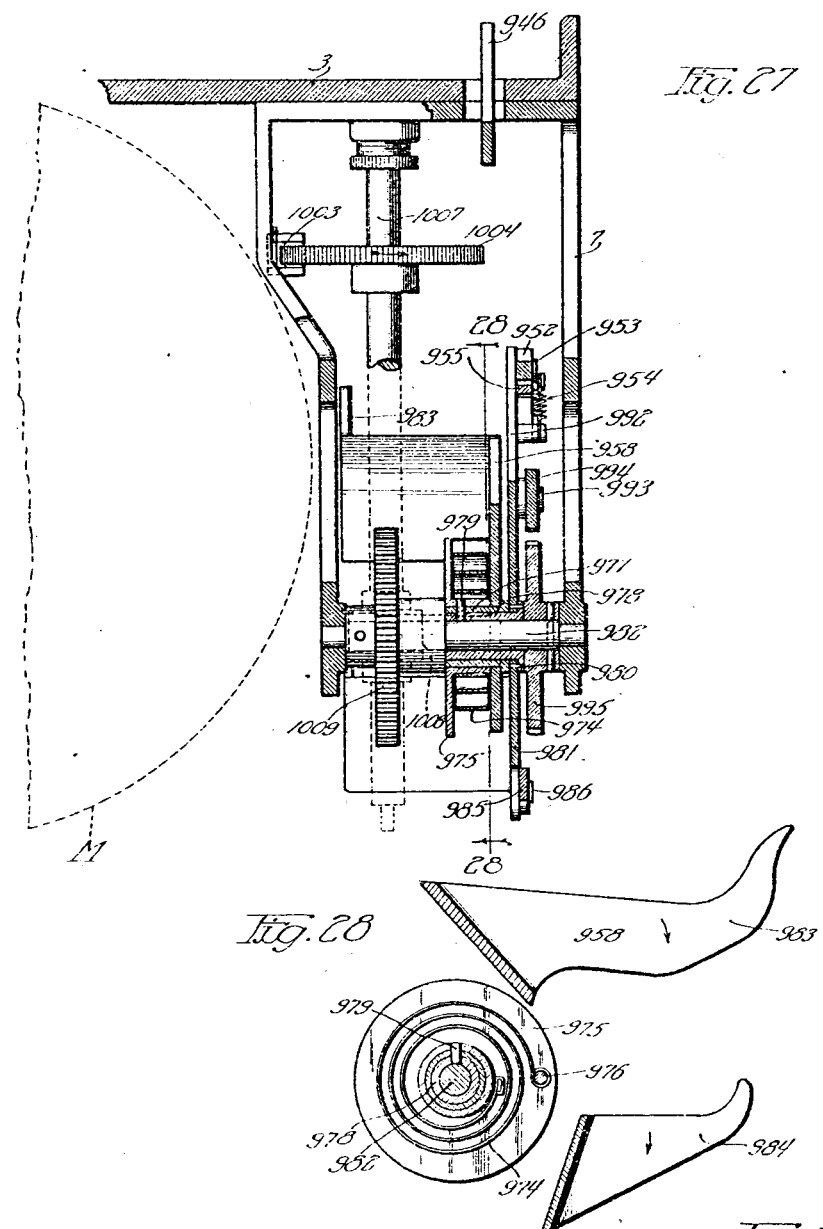

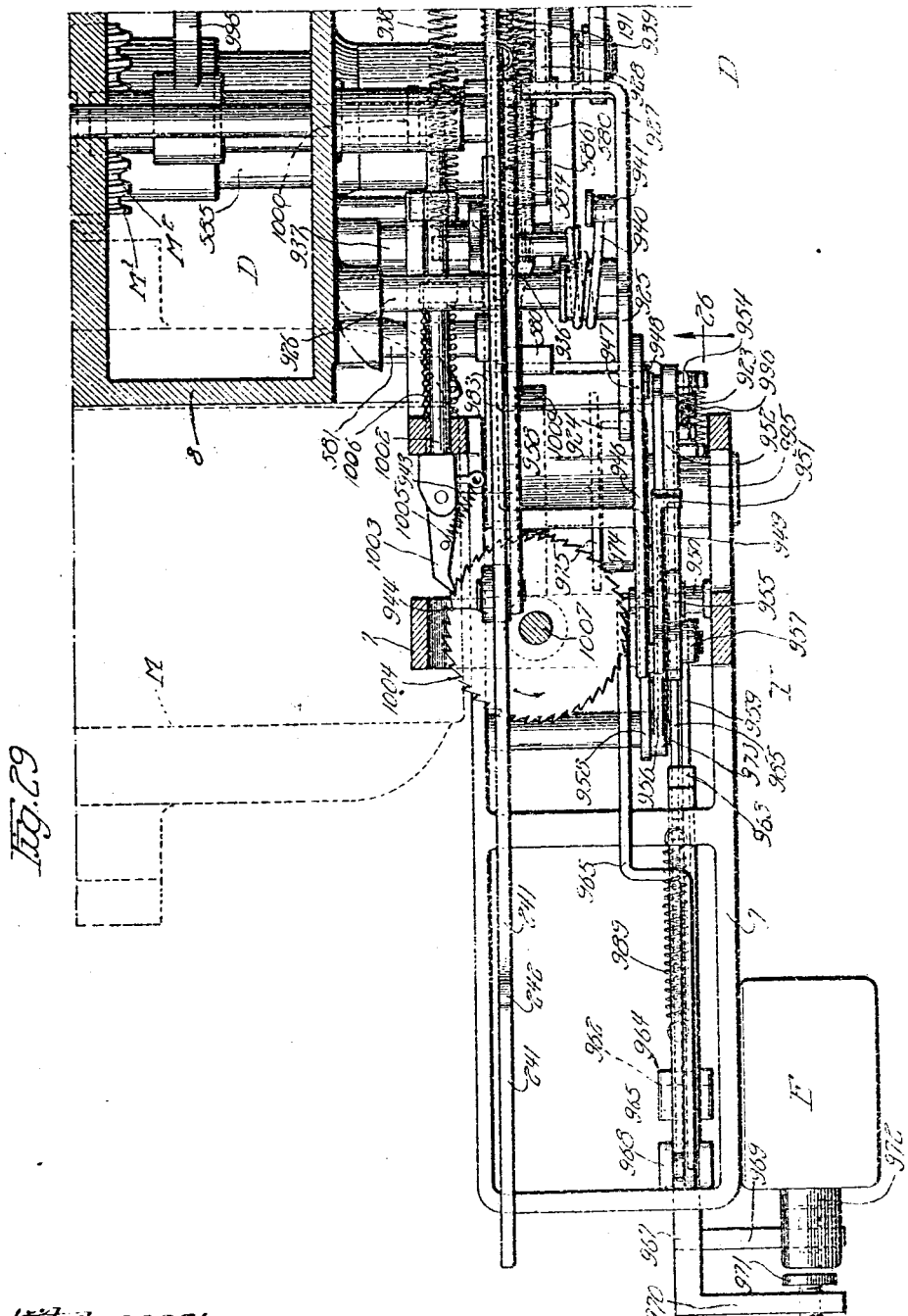

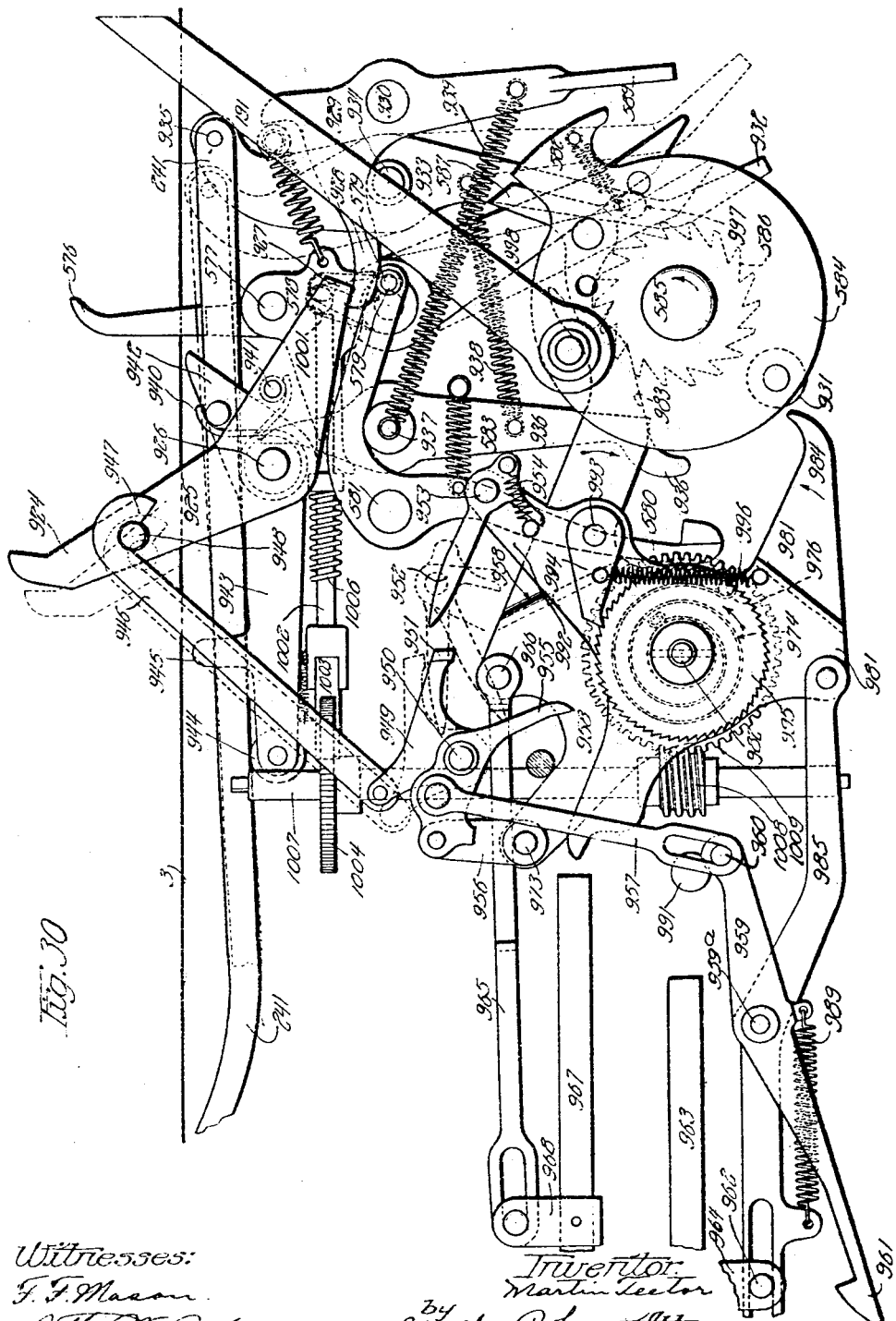

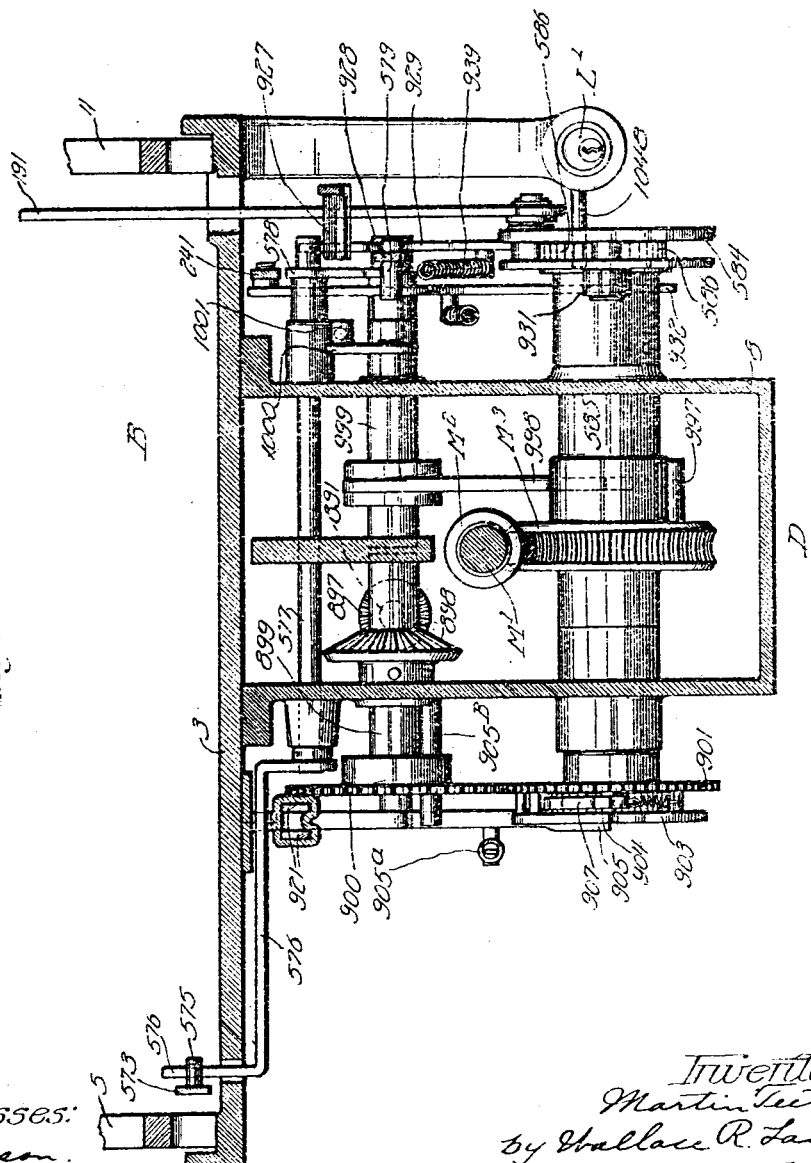

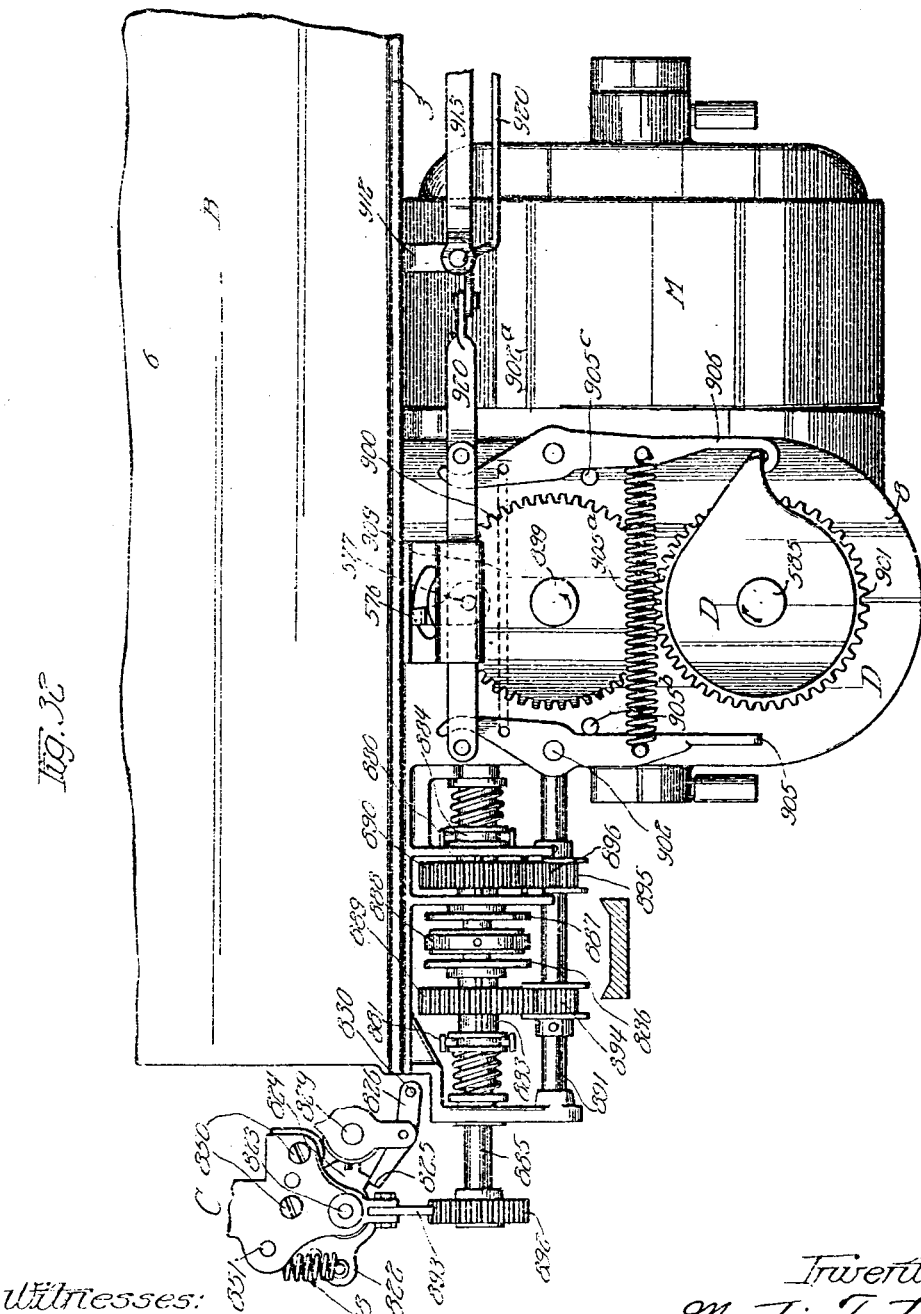

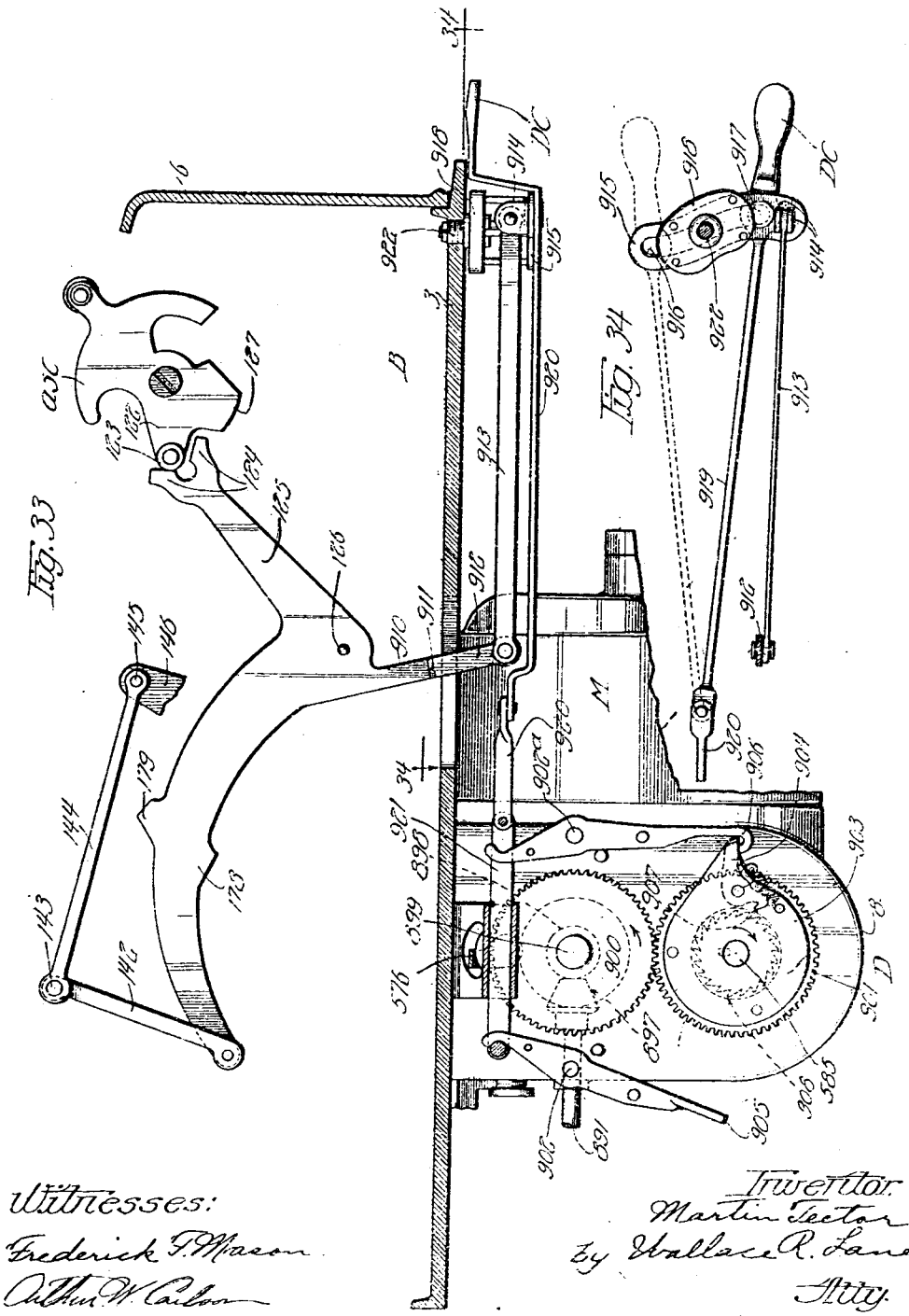

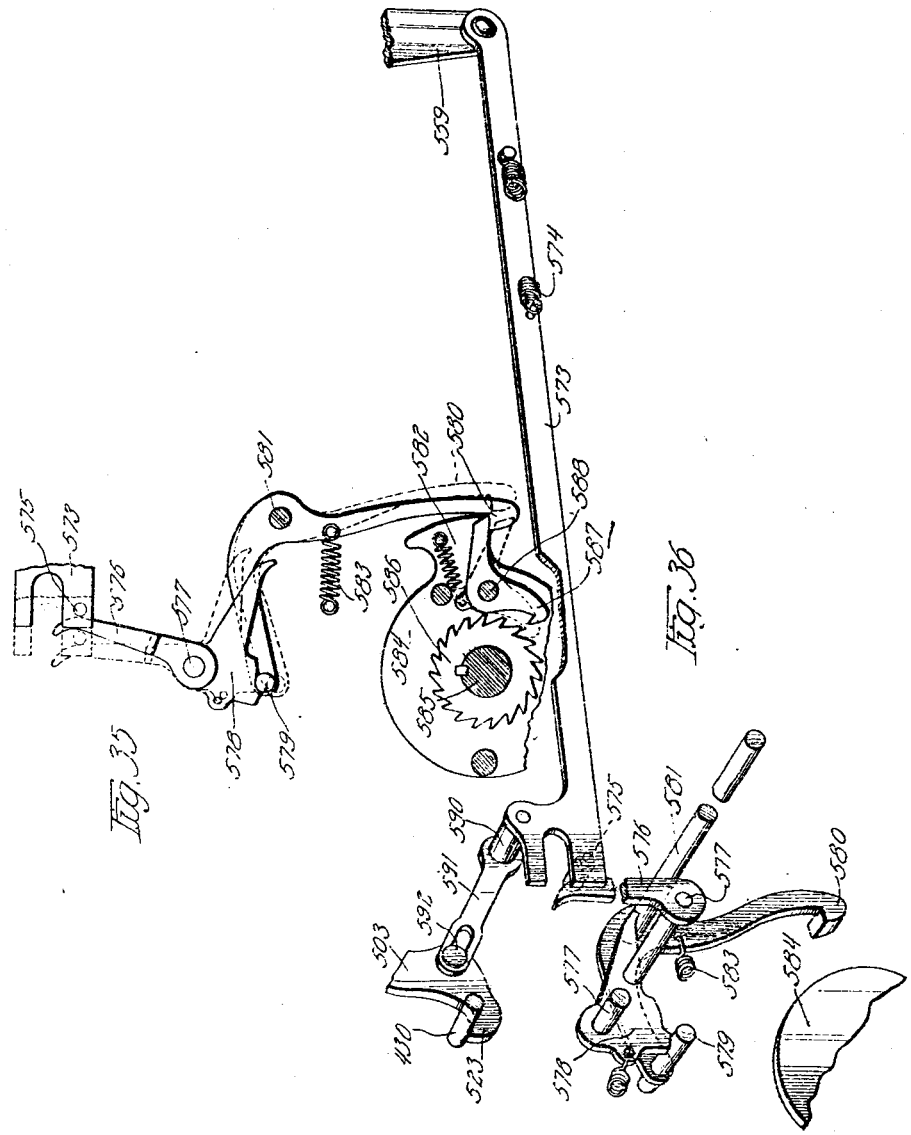

Oct. 27, 1925.
M. TEETOR
CALCULATING MACHINE
Filed May 1, 1920   59 Sheets-Sheet 31
1,558,947
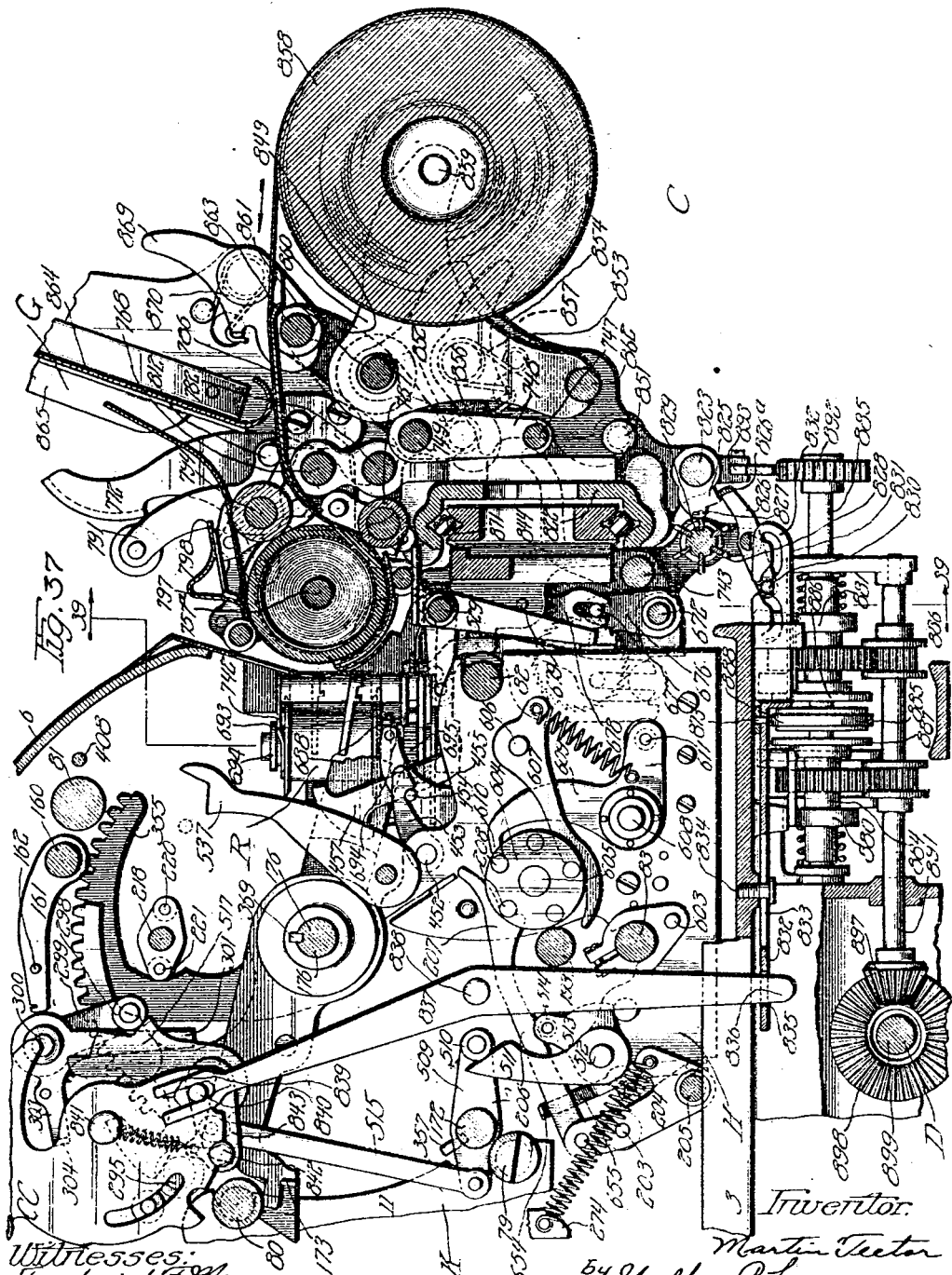

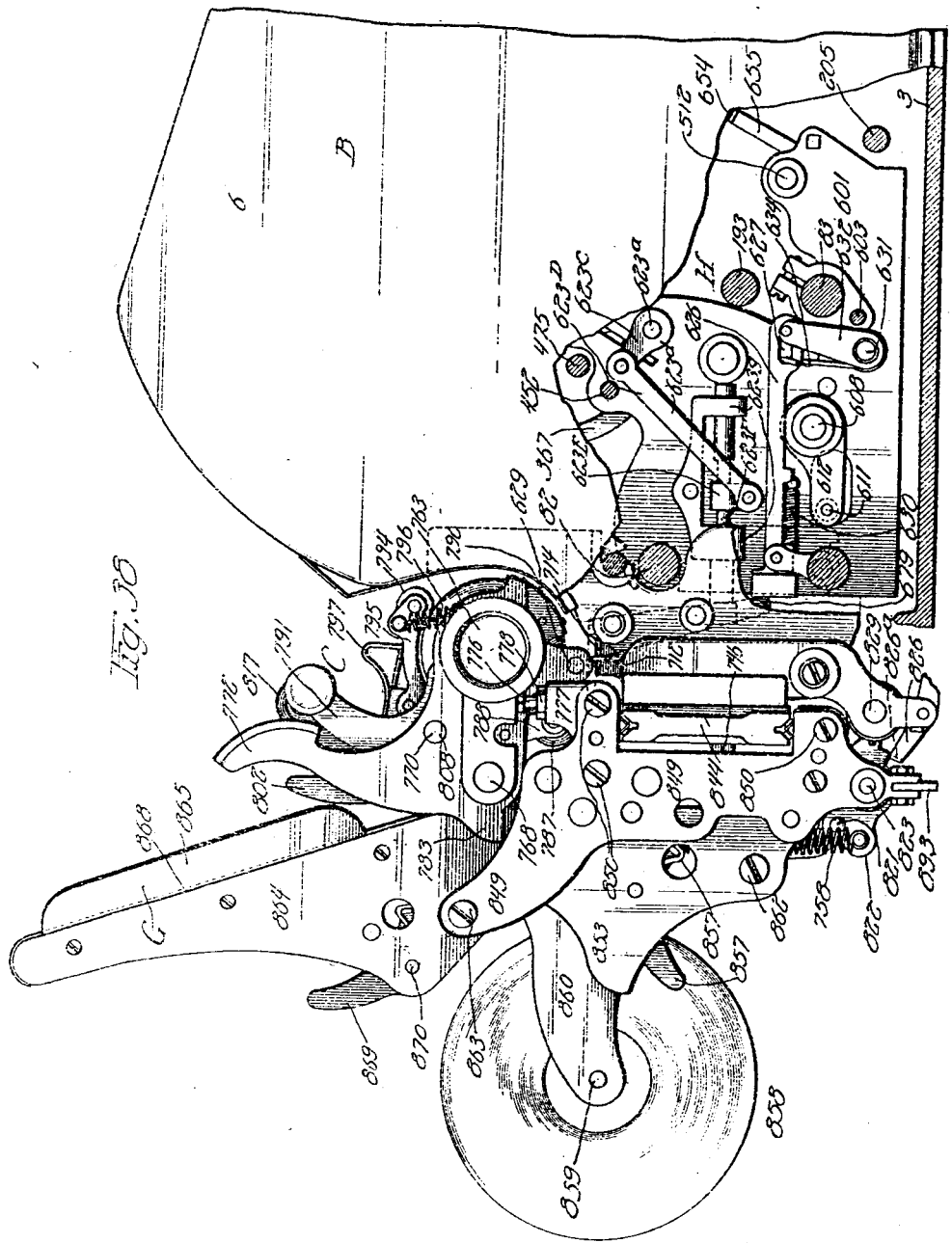

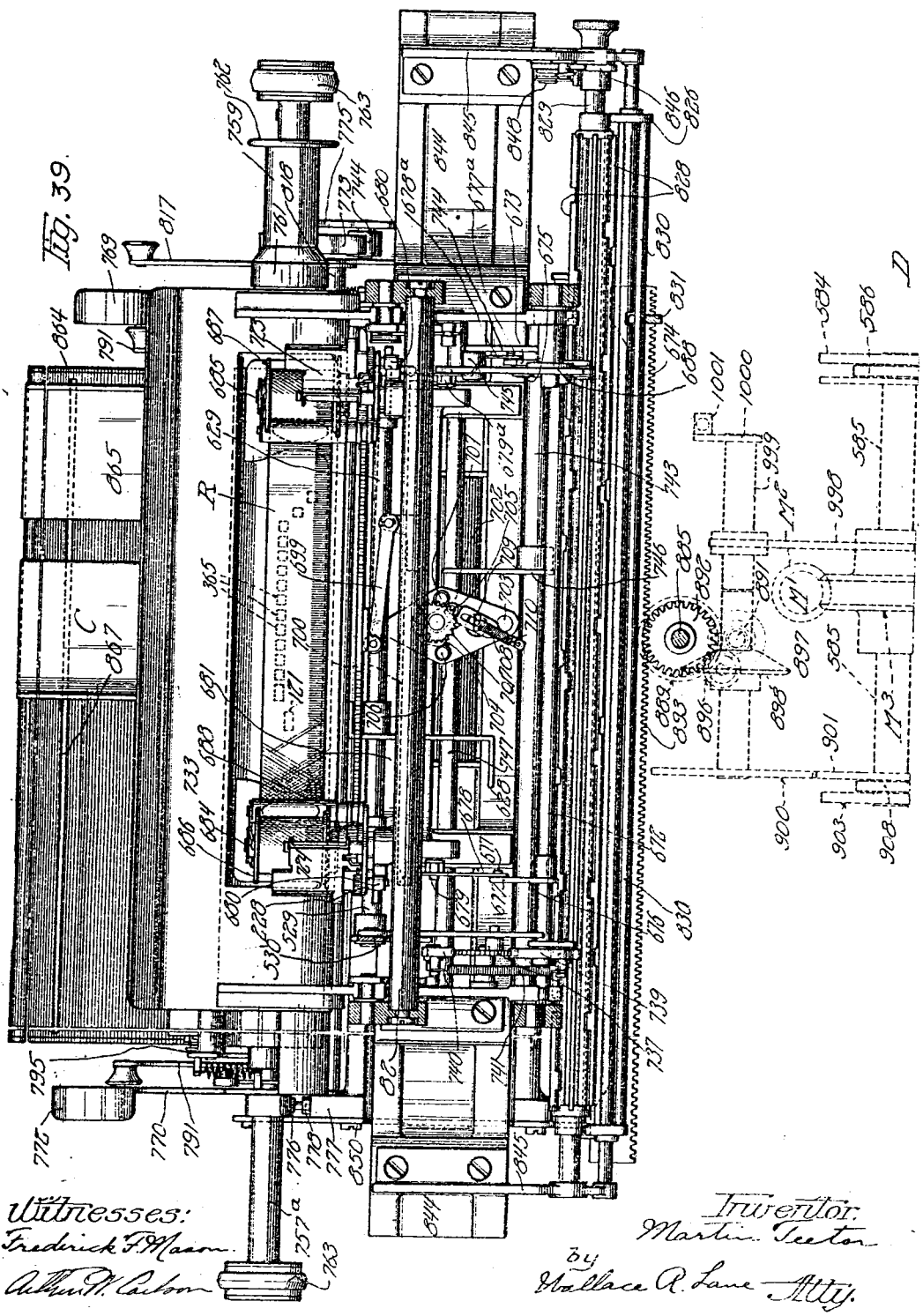

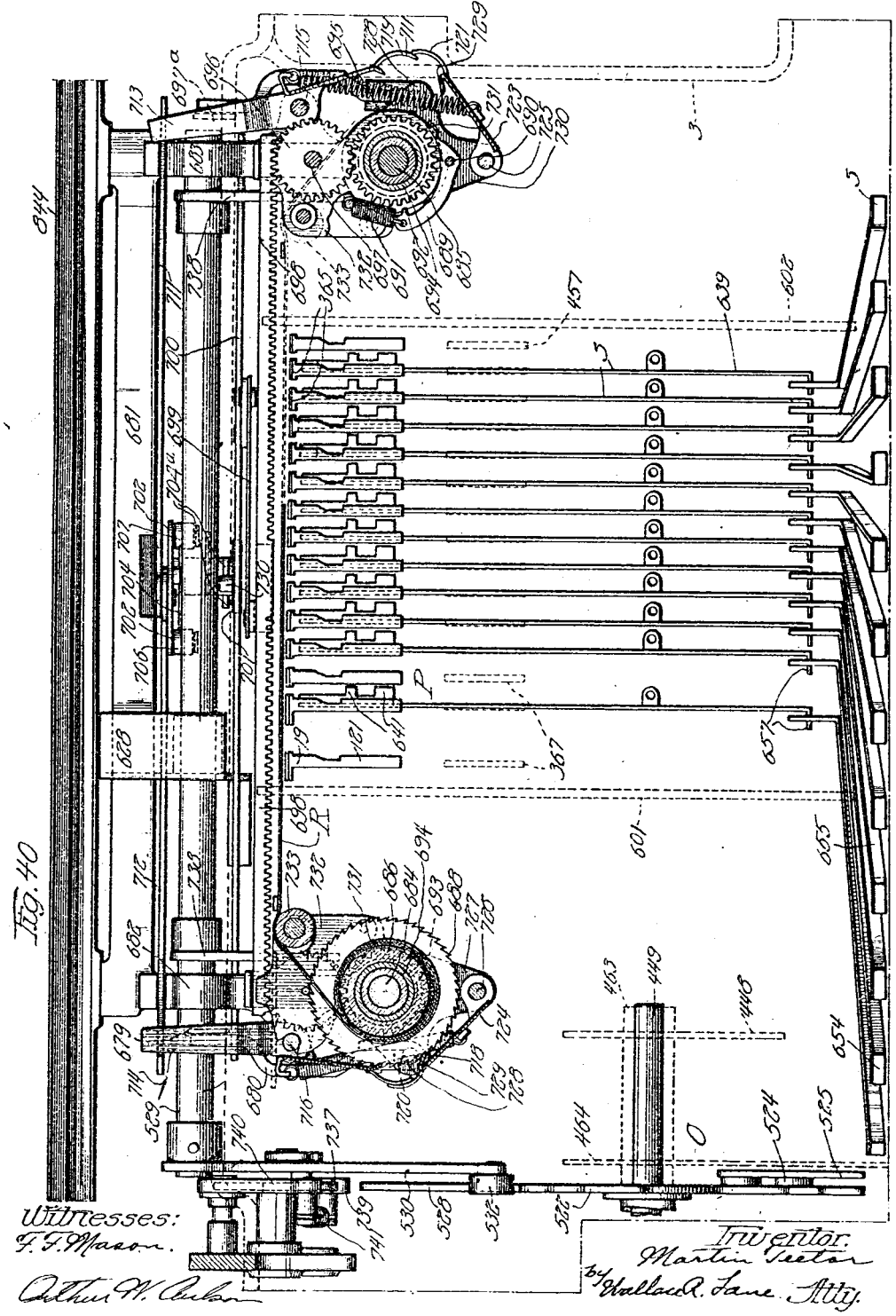

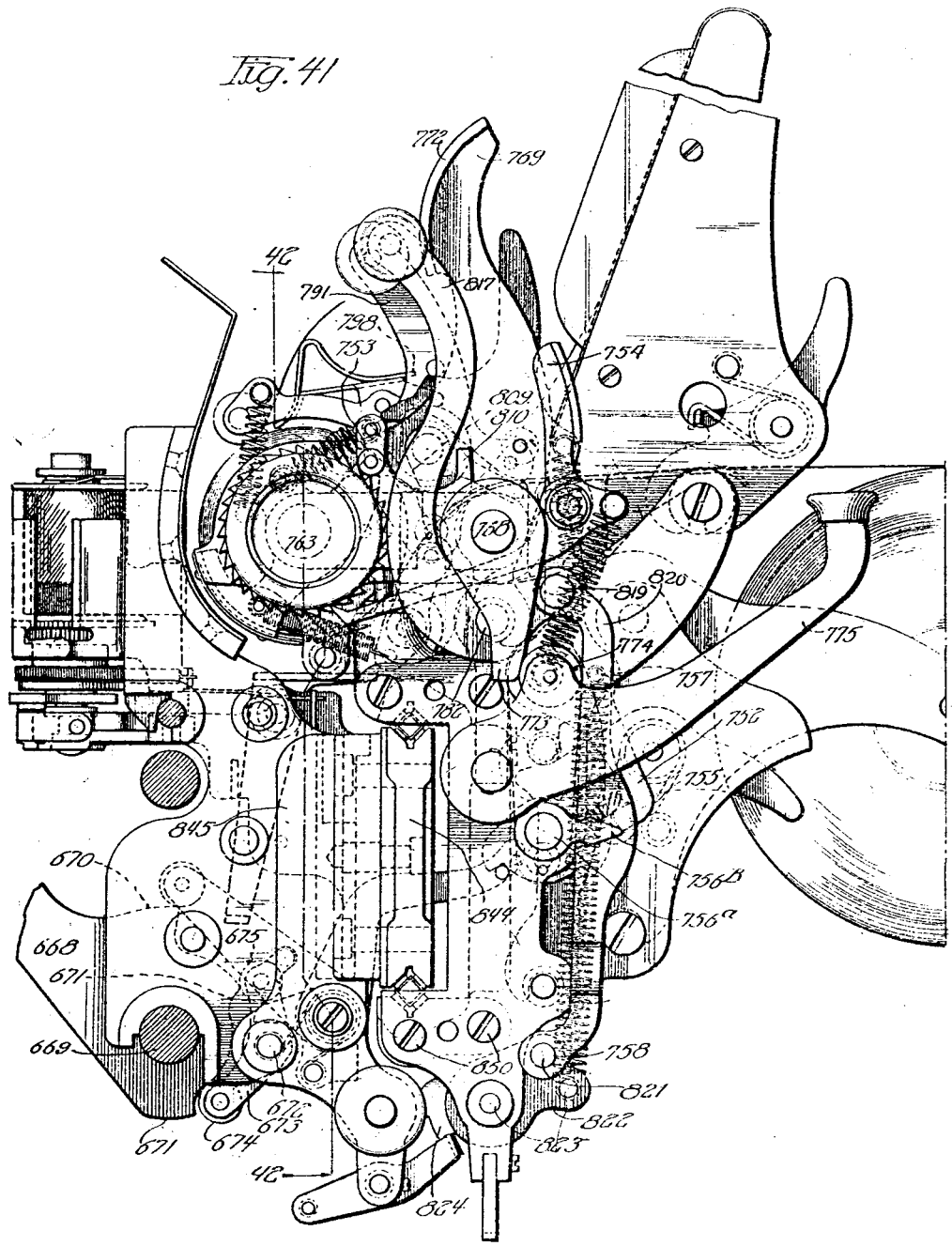

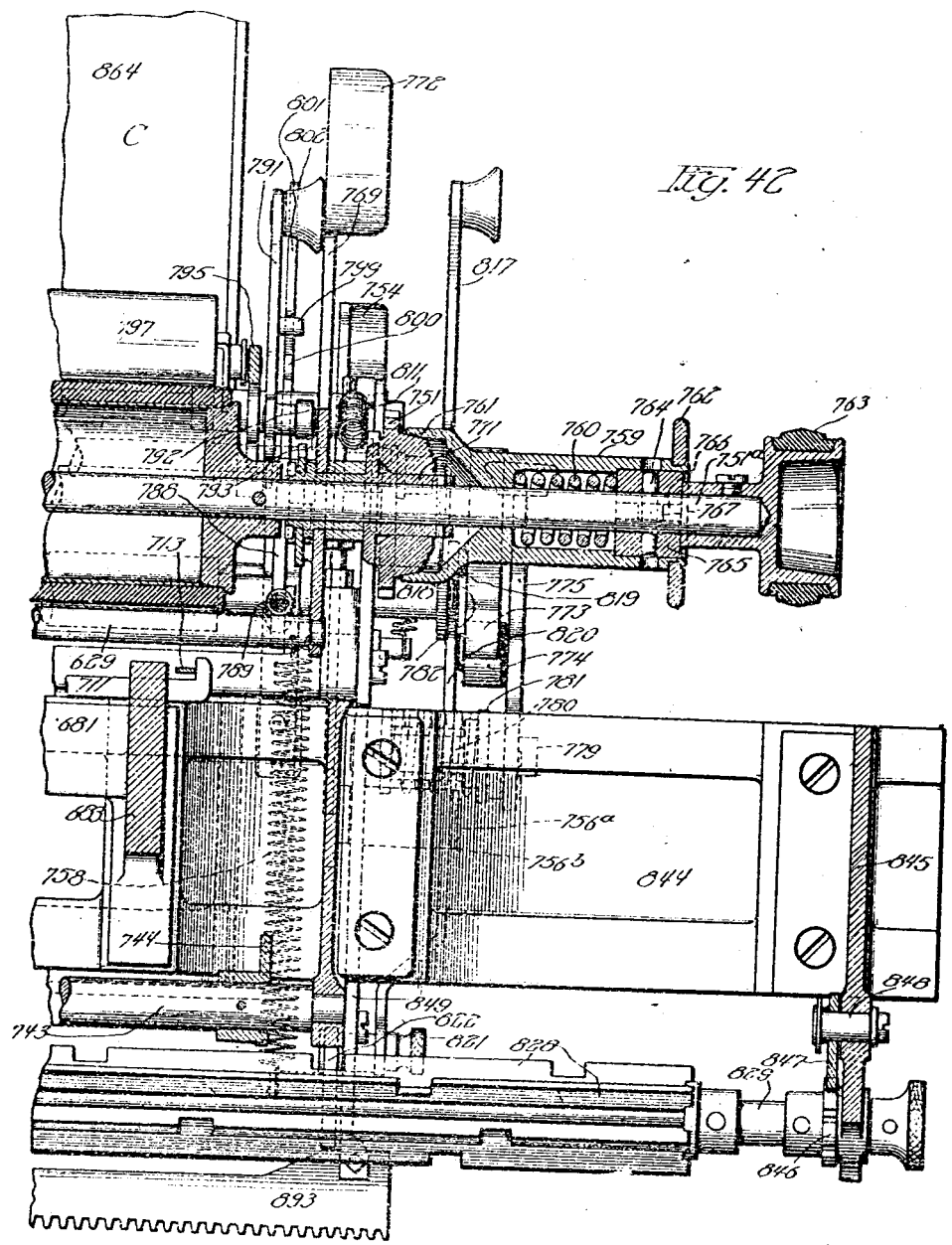

Oct. 27, 1925.

M. TEETOR 1,558,947

CALCULATING MACHINE

Filed May 1, 1920      59 Sheets-Sheet 37

Oct. 27, 1925.
M. TEETOR
1,558,947
CALCULATING MACHINE
Filed May 1, 1920      59 Sheets-Sheet 38
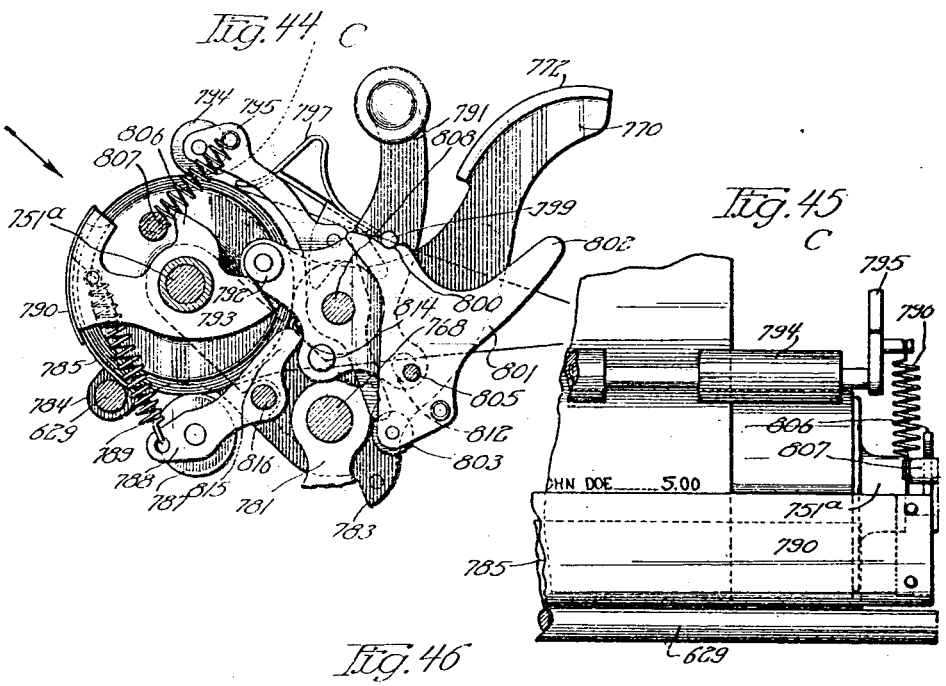
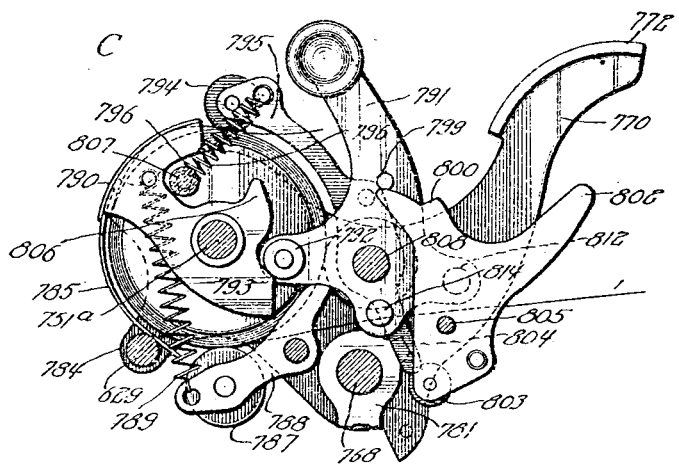

Oct. 27, 1925.

M. TEETOR 1,558,947

CALCULATING MACHINE

Filed May 1, 1920     59 Sheets-Sheet 39

Witnesses:
Frederick F. Mason.
Arthur W. Carlson

Inventor.
Martin Teetor
by Wallace R. Lane
Atty.

Oct. 27, 1925.

M. TEETOR 1,558,947

CALCULATING MACHINE

Filed May 1, 1920 59 Sheets-Sheet 41

Fig. 50

Witnesses:
Frederick F. Mason
Arthur W. Carlson

Inventor.
Martin Teetor
by Wallace R. Lane
Atty.

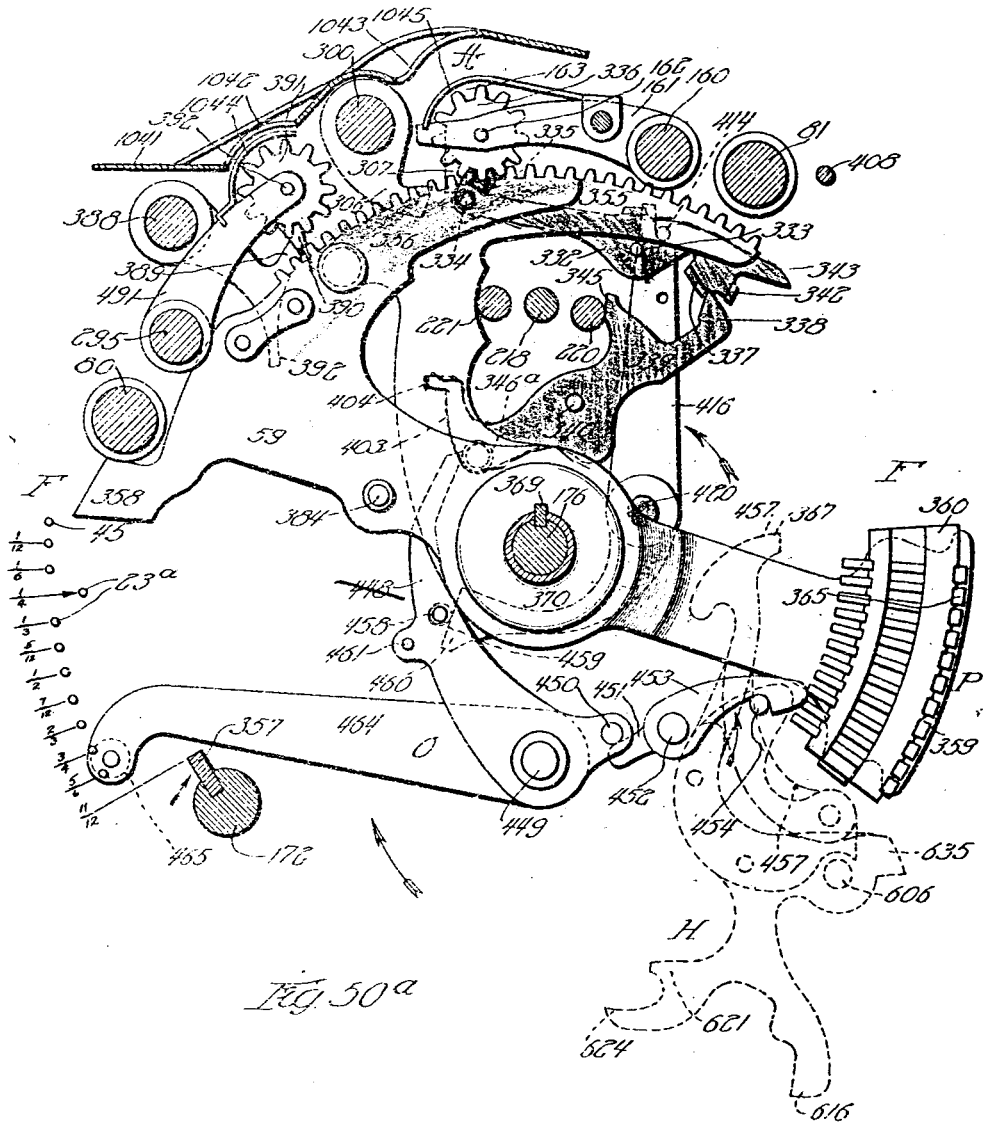

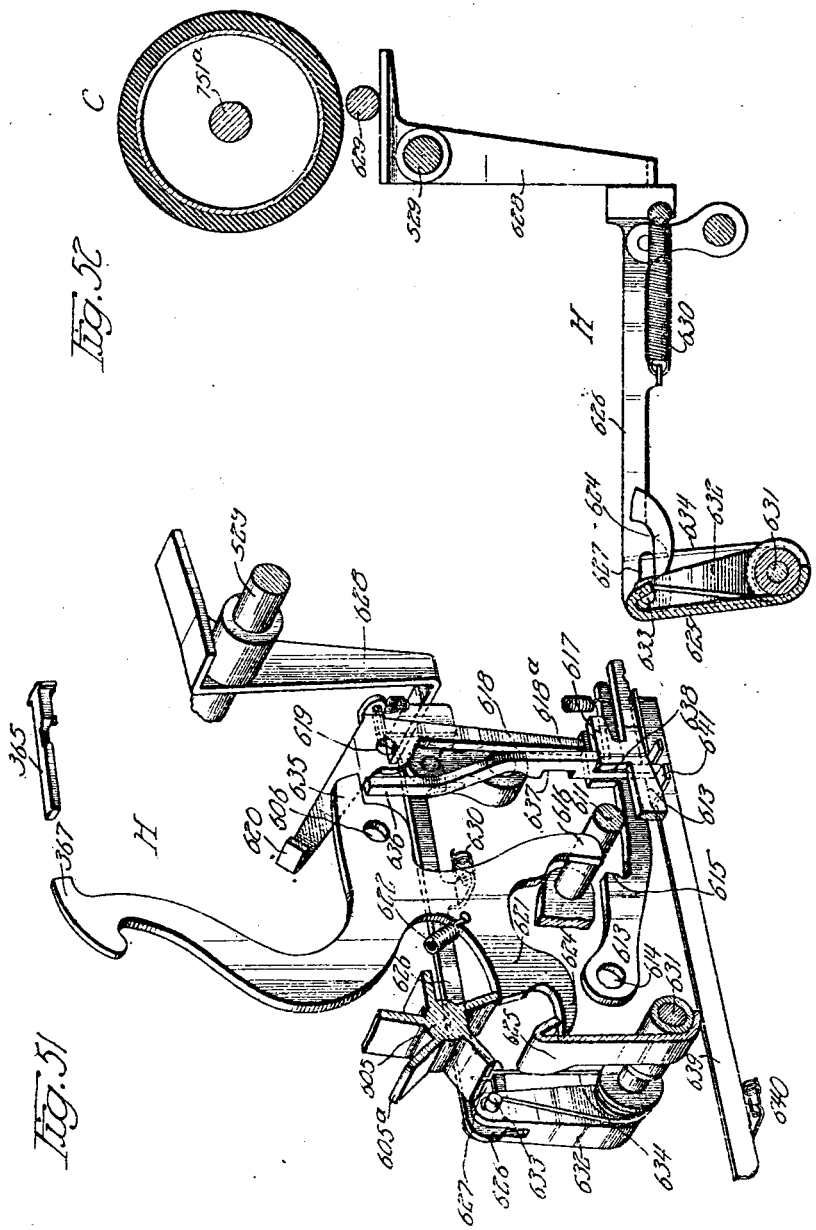

Oct. 27, 1925.
M. TEETOR
1,558,947
CALCULATING MACHINE
Filed May 1, 1920   59 Sheets-Sheet 44
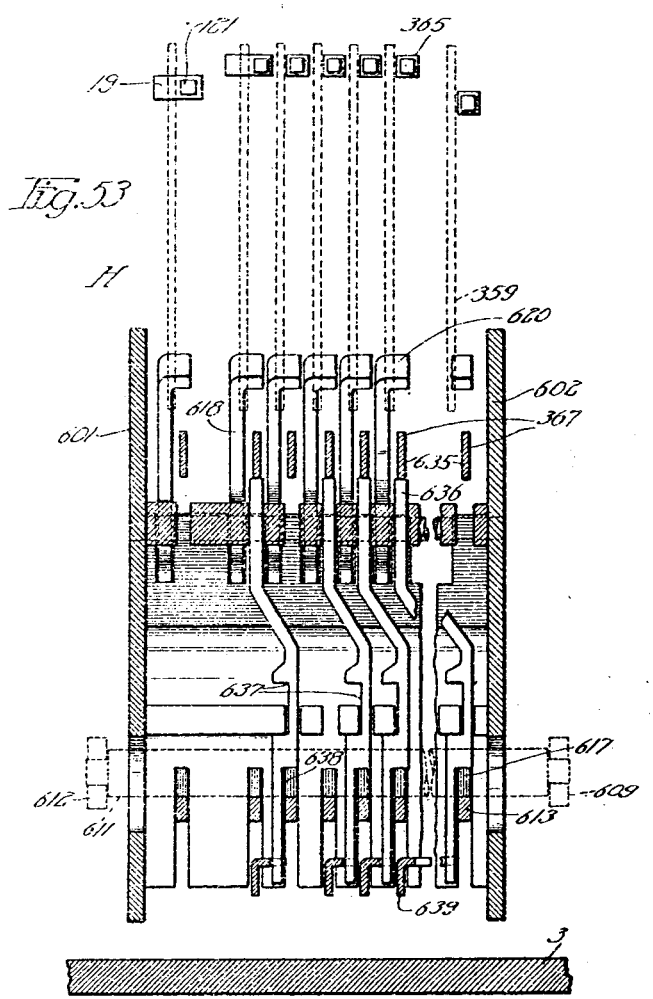
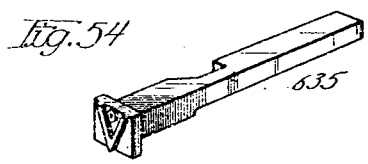

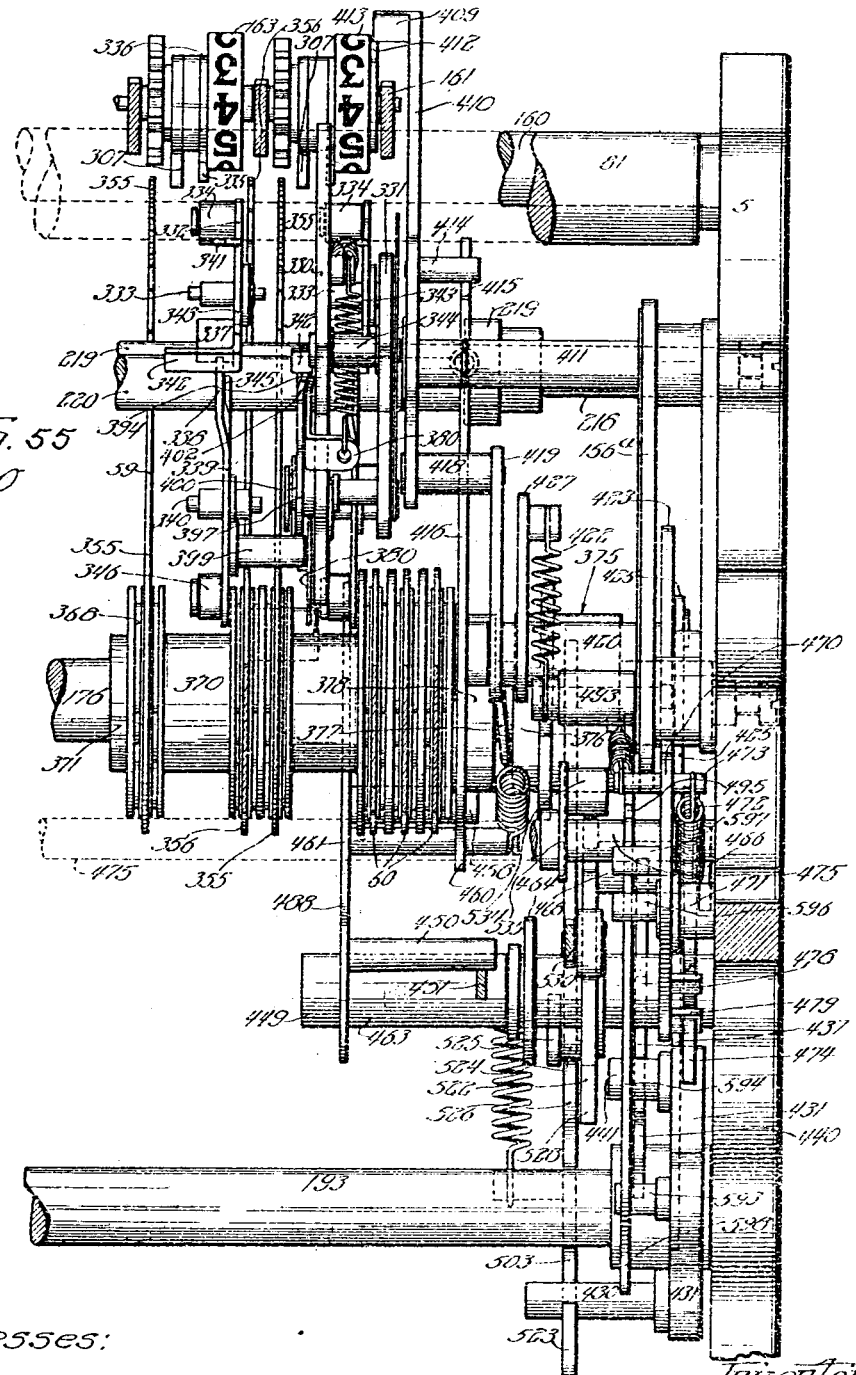

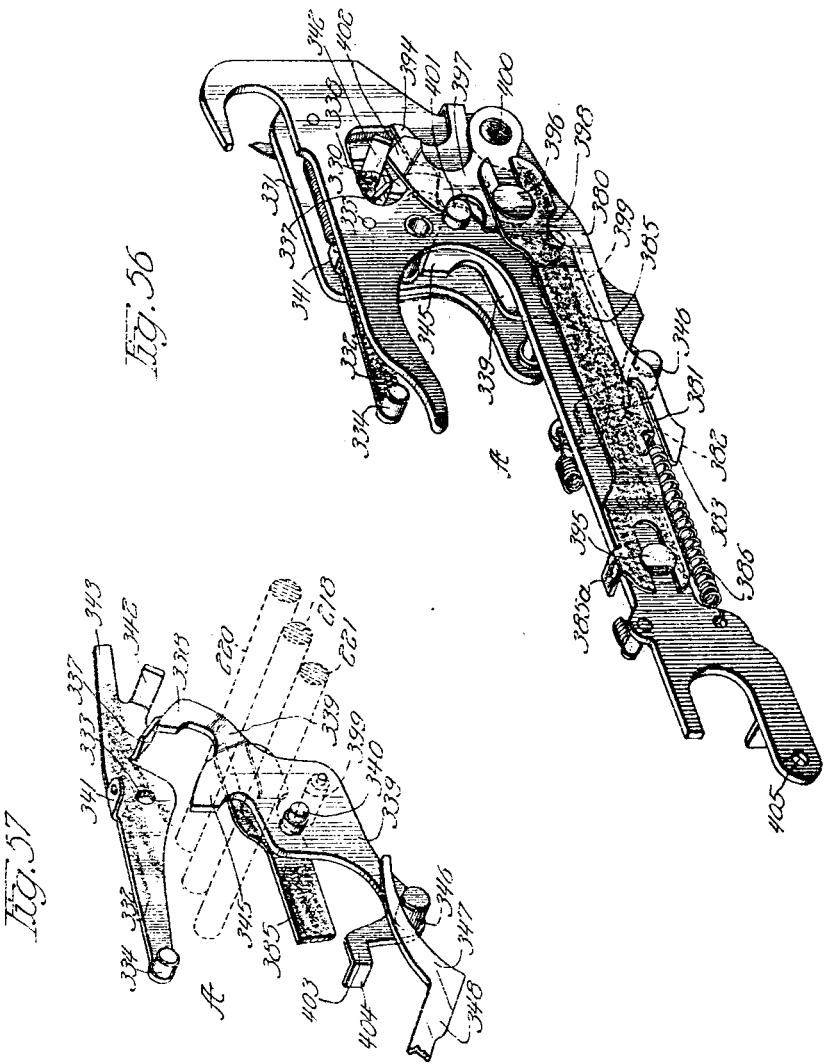

Oct. 27, 1925.
M. TEETOR
CALCULATING MACHINE
Filed May 1, 1920
1,558,947
59 Sheets-Sheet 47
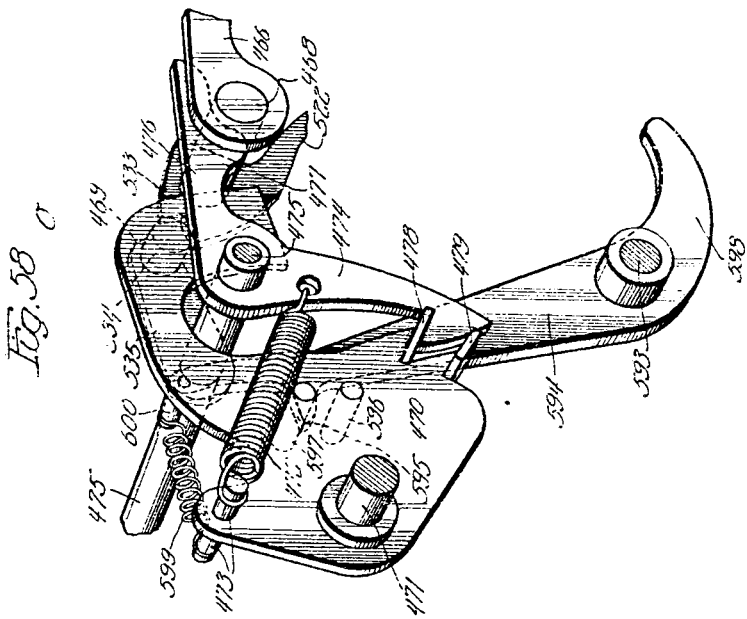
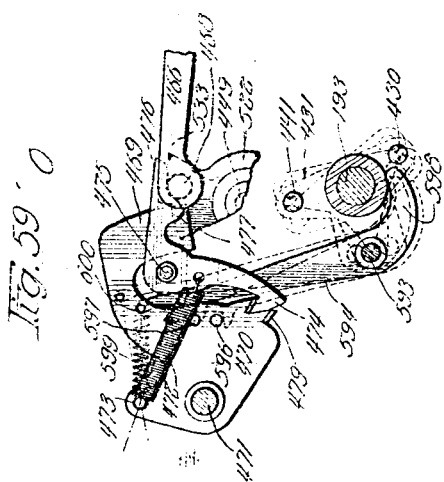

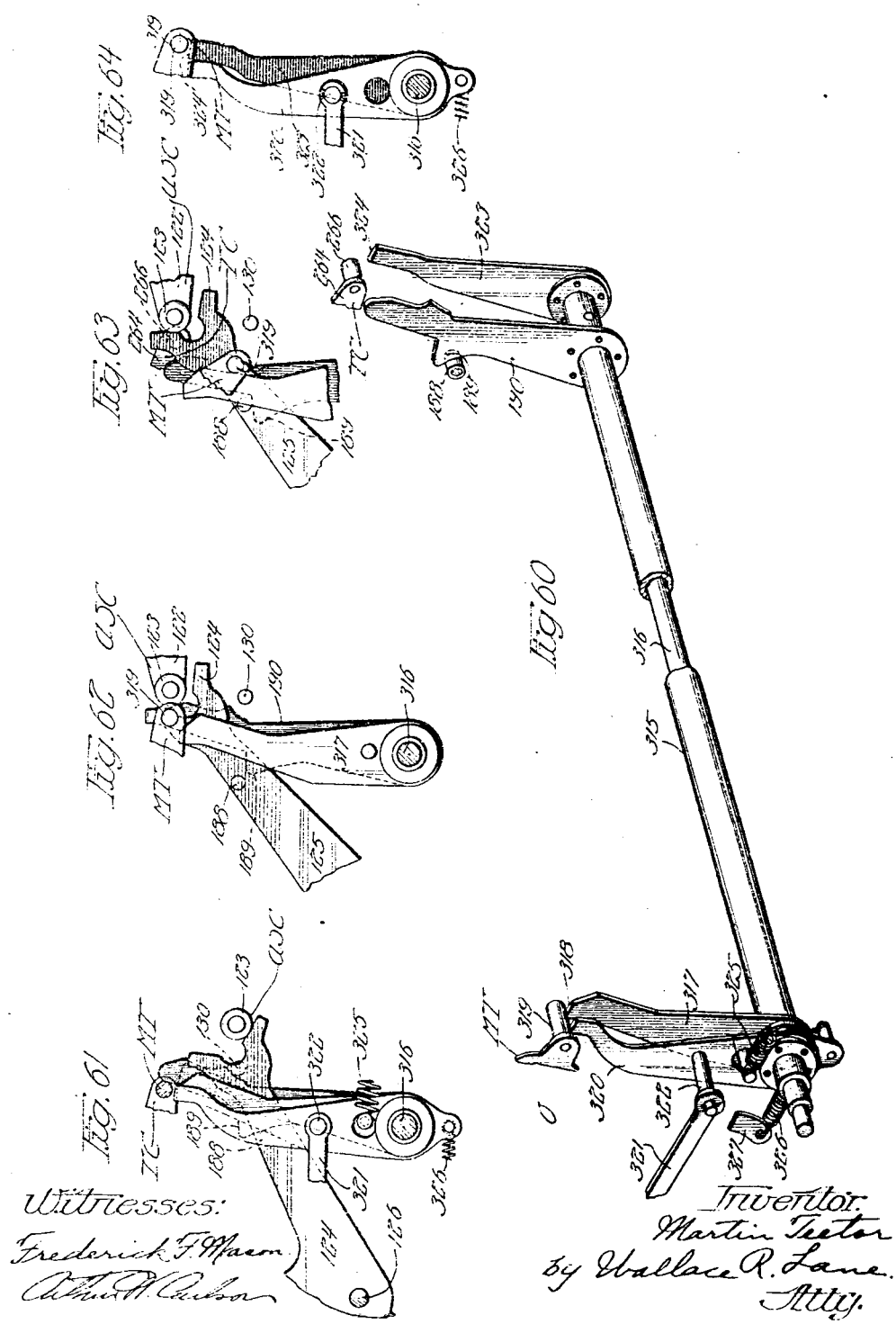

Oct. 27, 1925. 1,558,947
M. TEETOR
CALCULATING MACHINE
Filed May 1, 1920 59 Sheets-Sheet 49
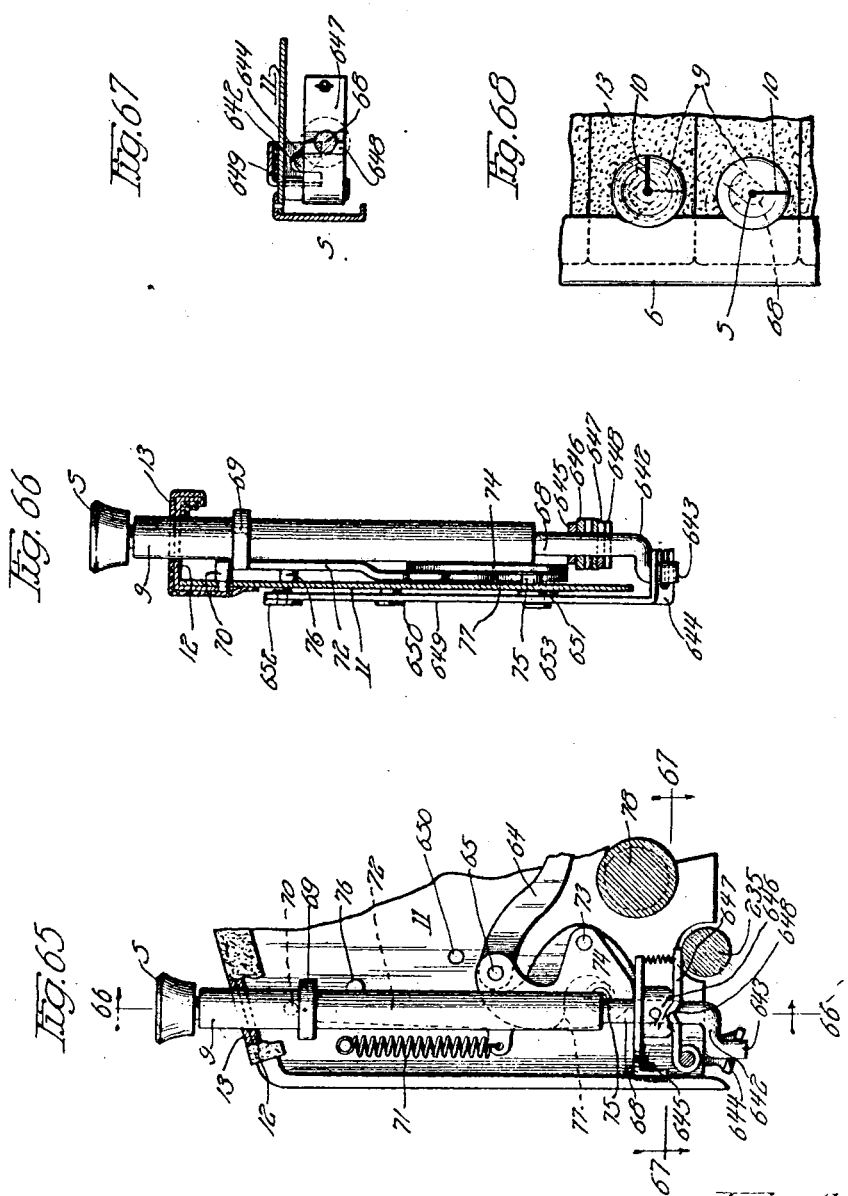

Oct. 27, 1925.
M. TEETOR
1,558,947
CALCULATING MACHINE
Filed May 1, 1920     59 Sheets-Sheet 50
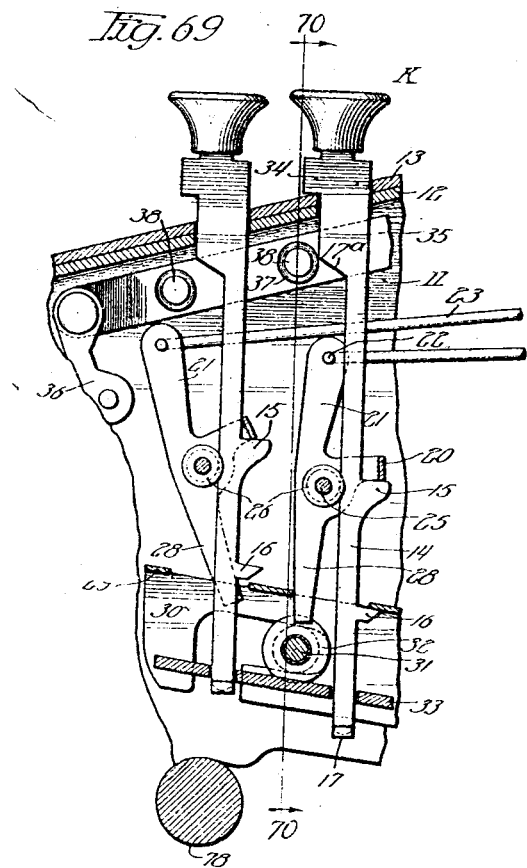
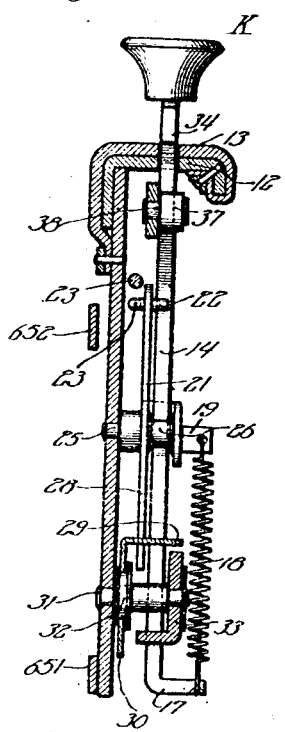
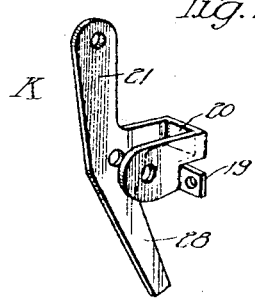

Oct. 27, 1925. 1,558,947
M. TEETOR
CALCULATING MACHINE
Filed May 1, 1920 59 Sheets-Sheet 51
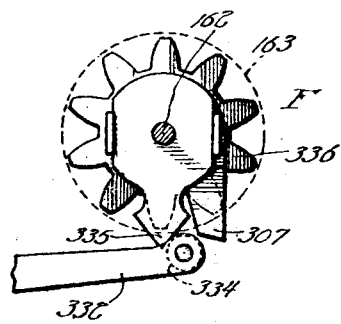
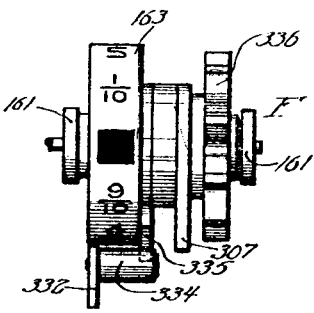
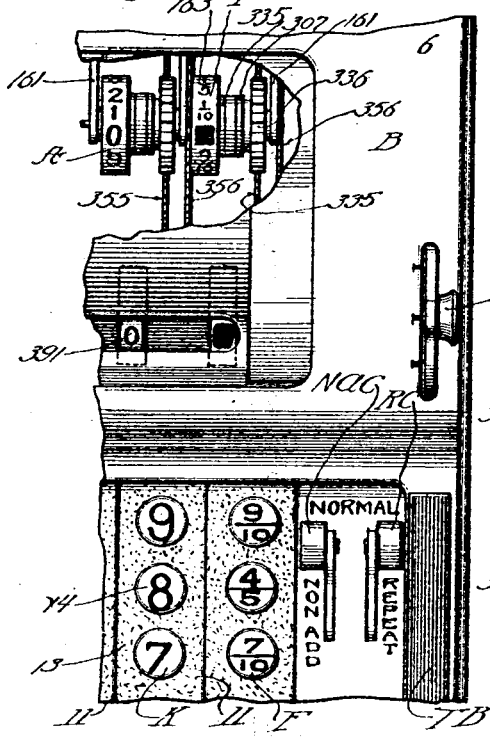
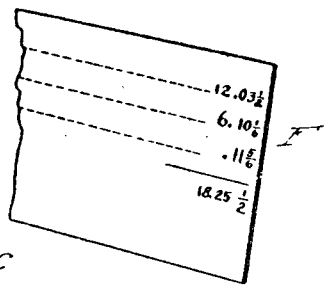
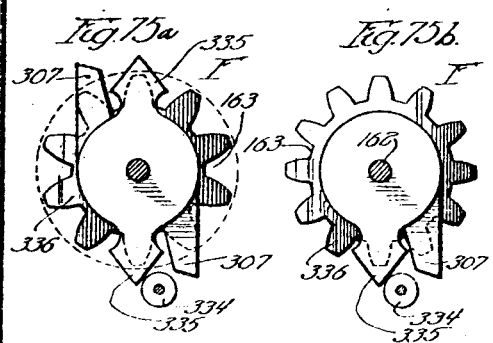

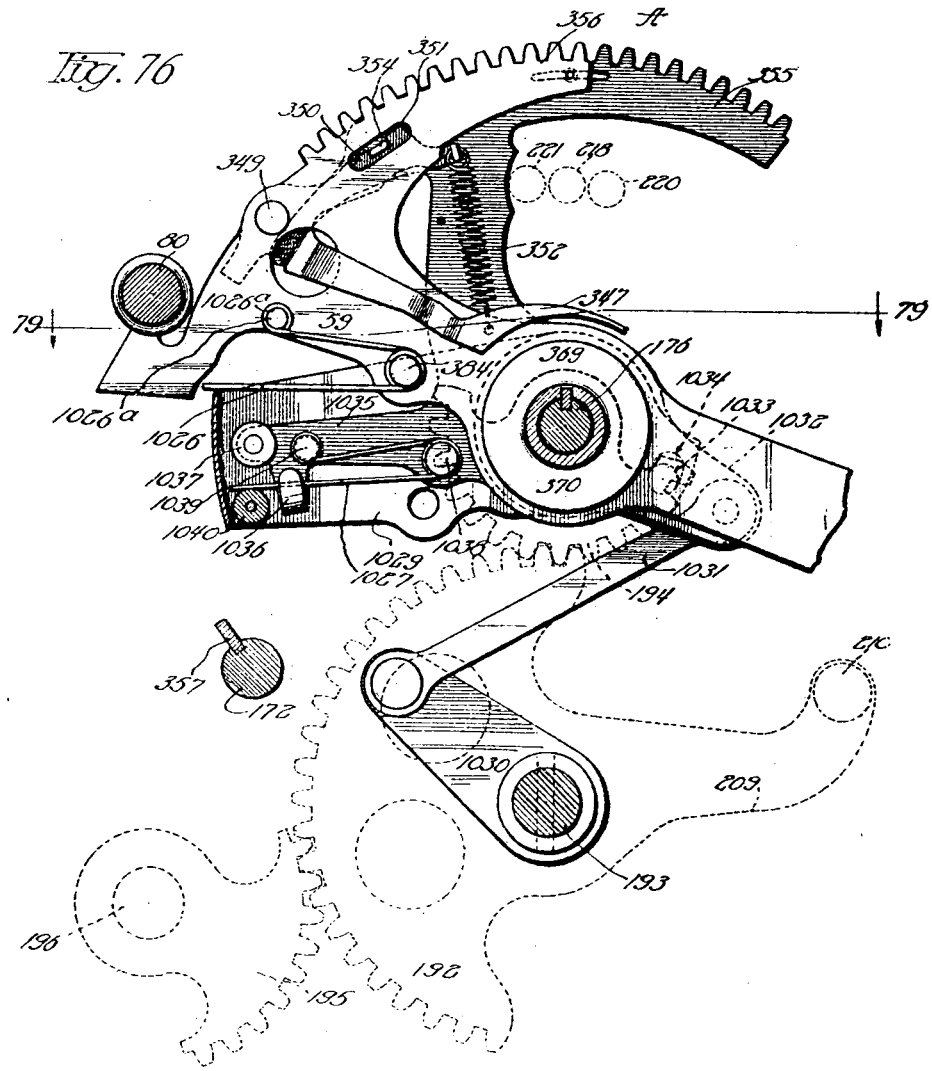

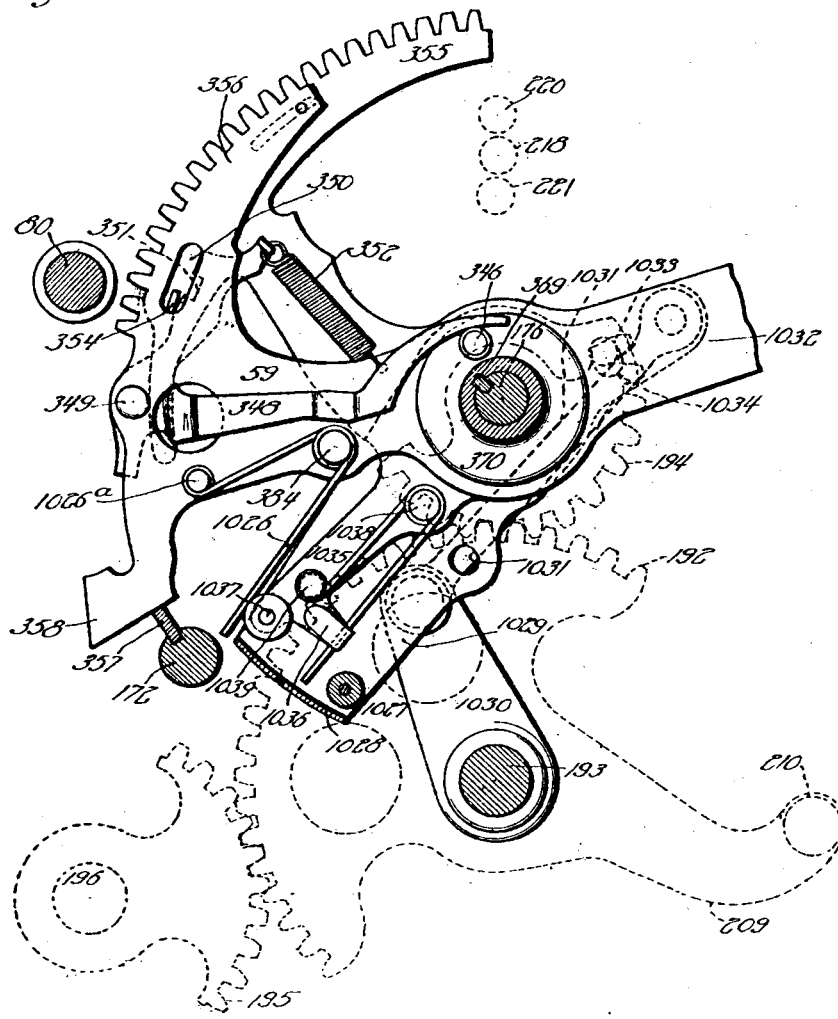

Oct. 27, 1925.
M. TEETOR
CALCULATING MACHINE
Filed May 1, 1920
1,558,947
59 Sheets-Sheet 54
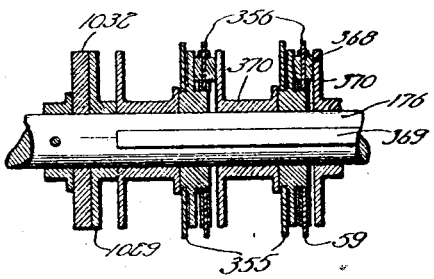
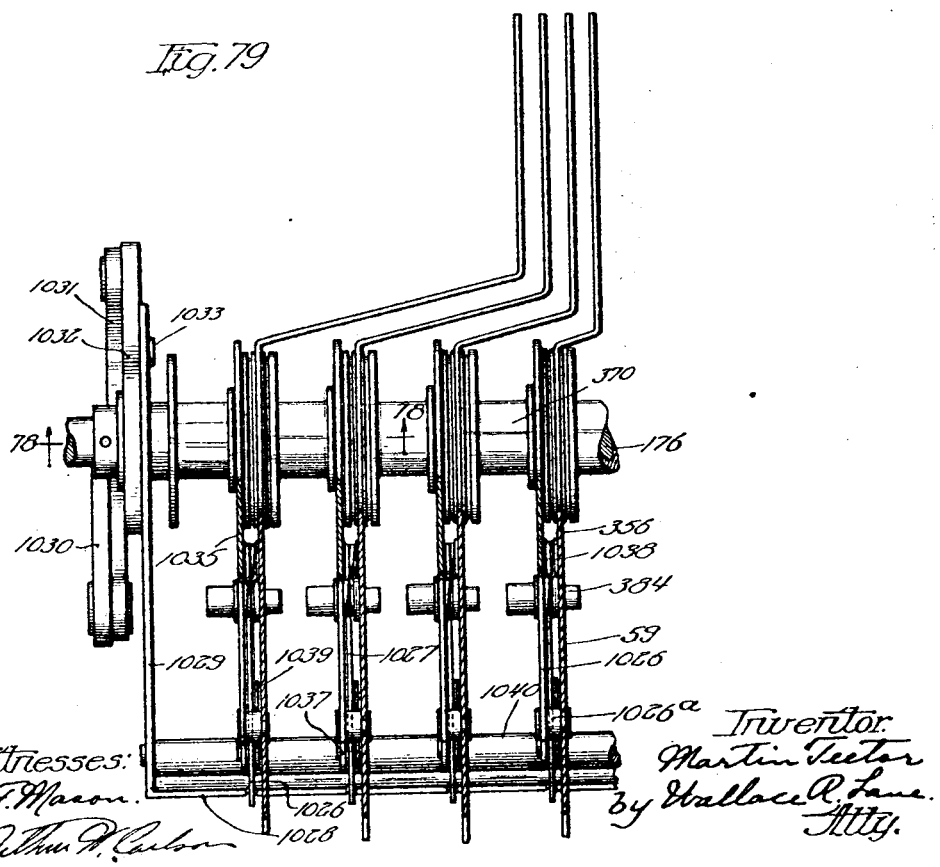

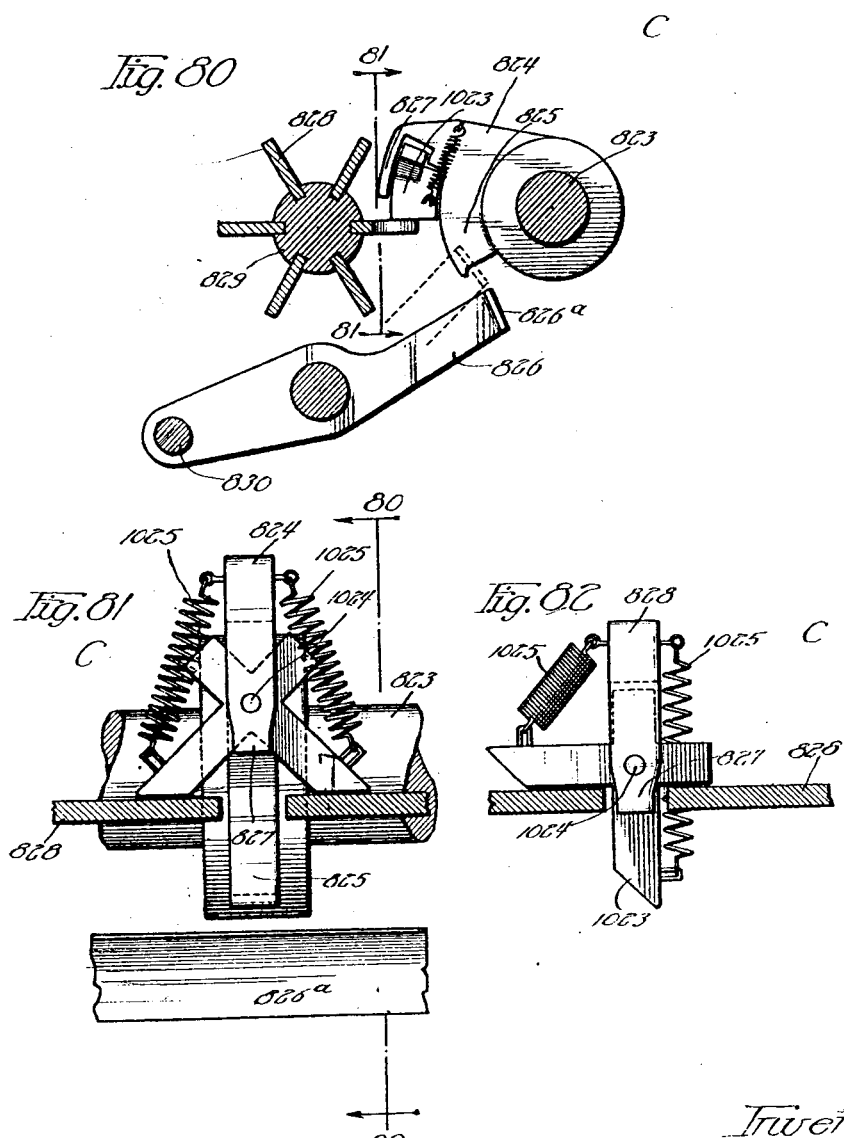

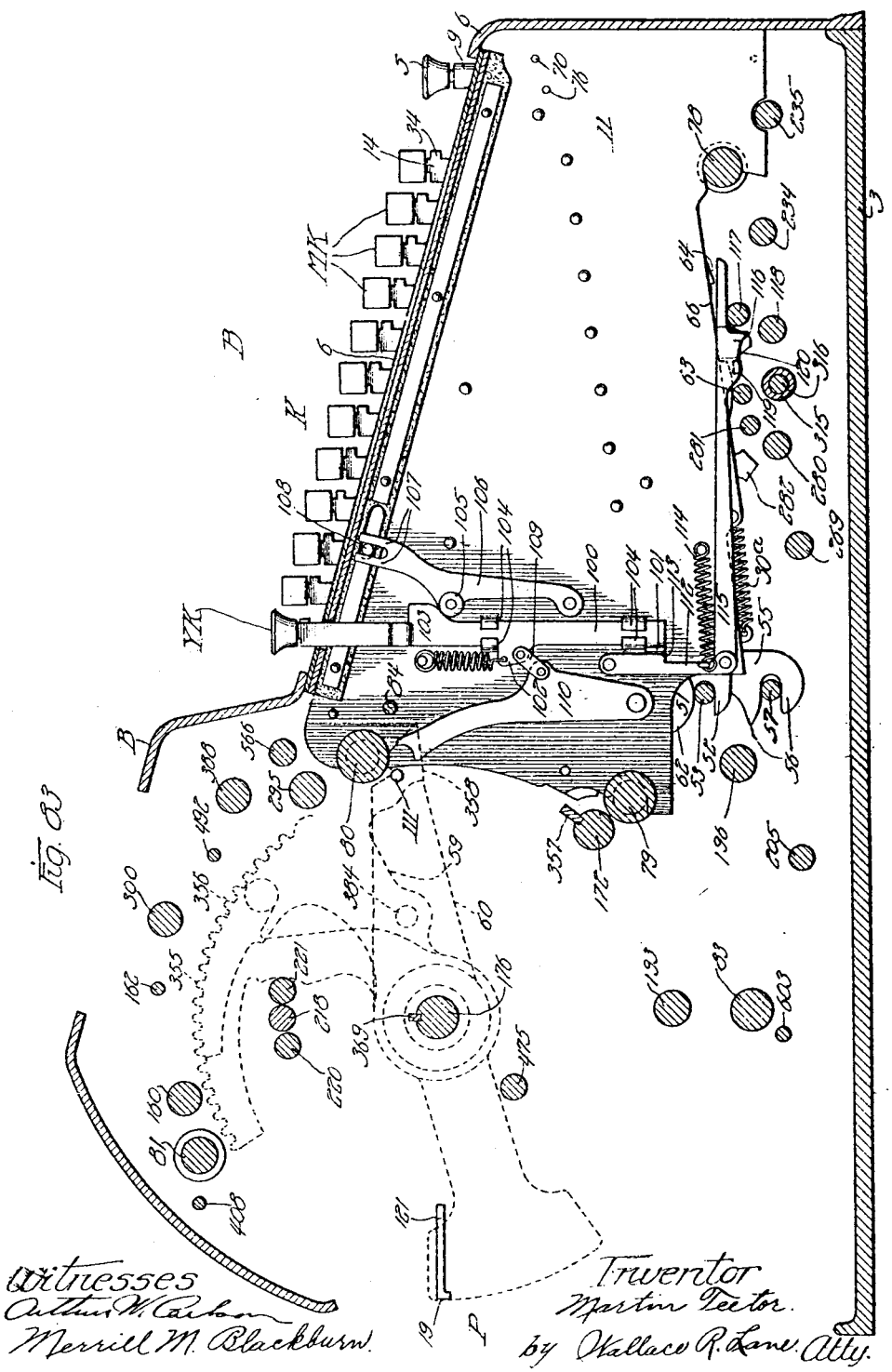

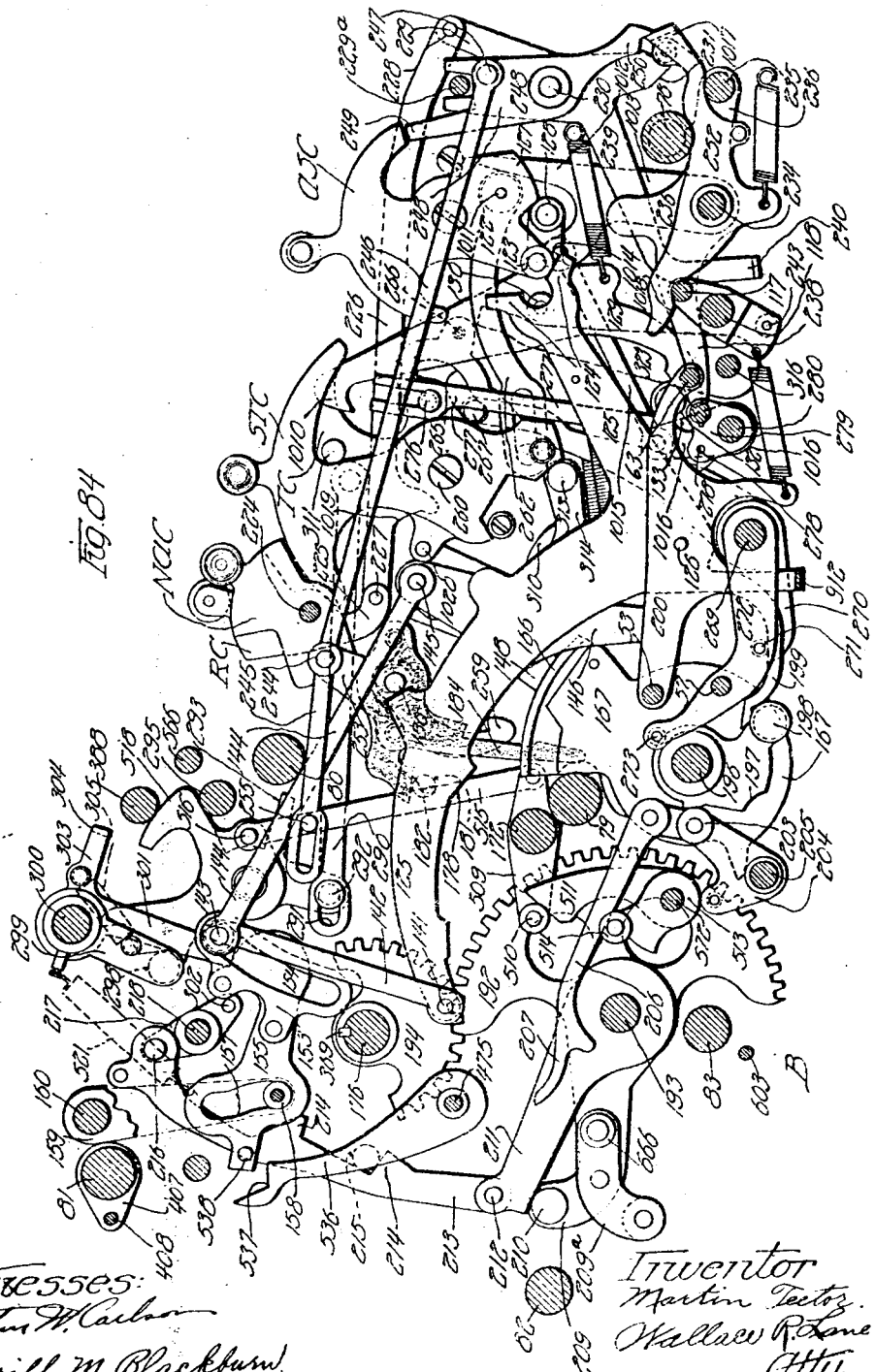

Oct. 27, 1925.
M. TEETOR
CALCULATING MACHINE
Filed May 1, 1920   59 Sheets-Sheet 58
1,558,947
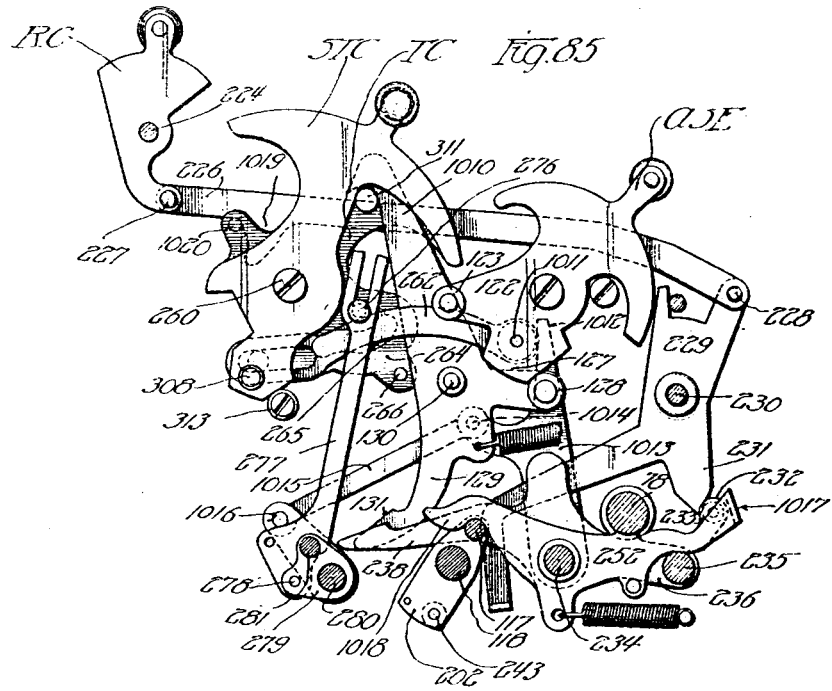
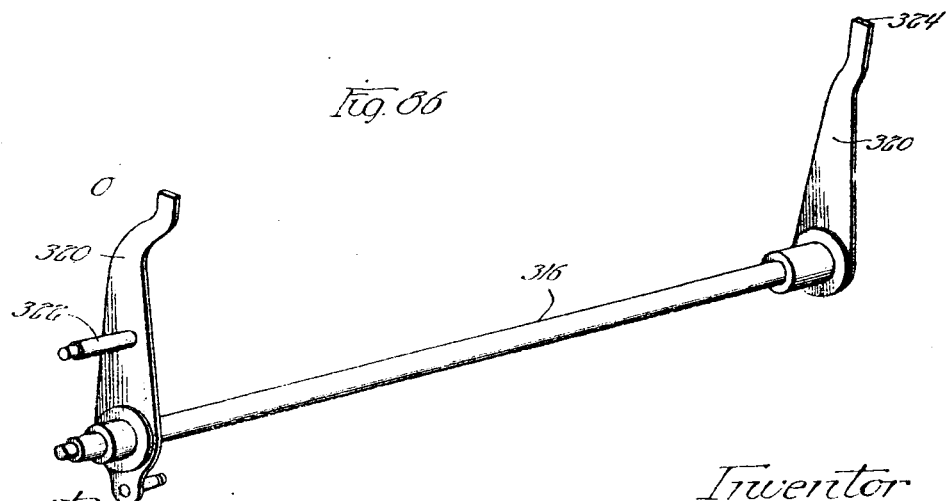

Oct. 27, 1925.
M. TEETOR
1,558,947
CALCULATING MACHINE
Filed May 1, 1920 59 Sheets-Sheet 59
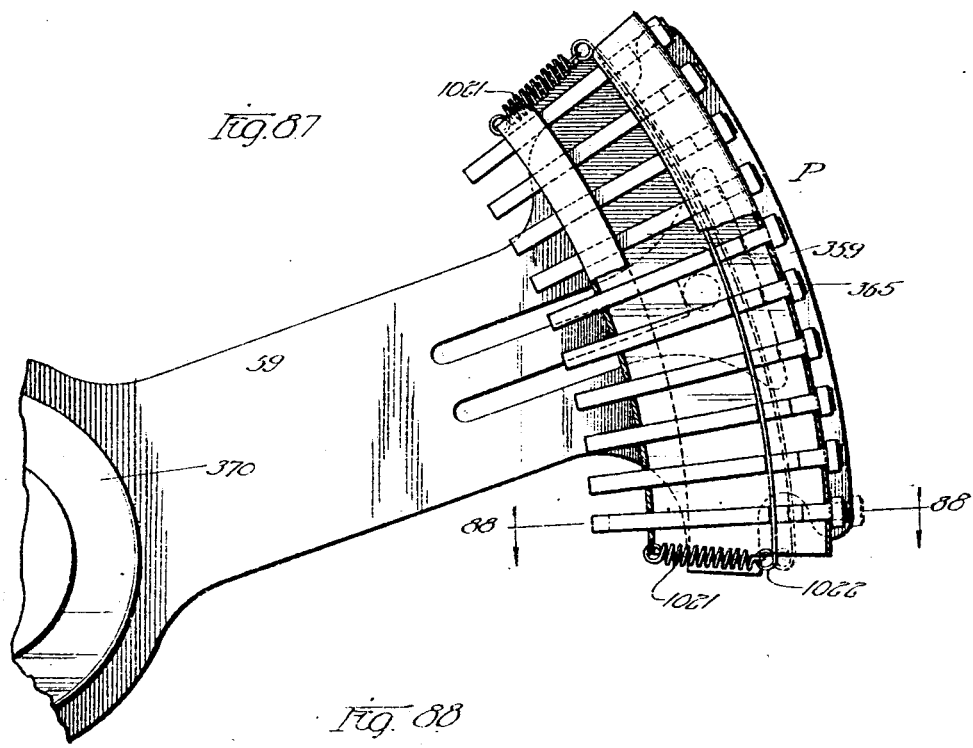
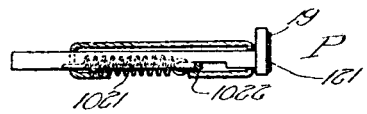
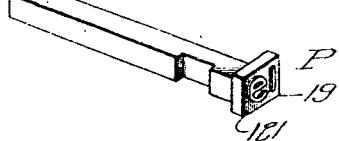

Patented Oct. 27, 1925.

1,558,947

UNITED STATES PATENT OFFICE.

MARTIN TEETOR, OF DES MOINES, IOWA, ASSIGNOR TO TEETOR COMPANY, OF DES MOINES, IOWA, A CORPORATION OF IOWA.

CALCULATING MACHINE.

Application filed May 1, 1920. Serial No. 378,246.

*To all whom it may concern:*

Be it known that I, MARTIN TEETOR, a citizen of the United States, residing at Des Moines, in the county of Polk and State of Iowa, have invented new and useful Improvements in Calculating Machines, of which the following is a specification.

Broadly stated, the objects of my invention are to improve upon some of the mechanisms heretofore used in computing machines, and to provide mechanisms for carrying out certain functions not heretofore carried out mechanically. More specifically stated, among the objects of my invention are the following:

1. To provide a mechanism for getting a net credit or overdraft, should the machine subtract beyond zero; (2) to provide for printing a net credit or overdraft in a distinctive manner; (3) to provide a distinctive character to indicate overdrafts or net credits; (4) to provide for raising and lowering the printing ribbon when printing an overdraft or net credit; (5) to provide a flexible keyboard structure; (6) to provide for shifting of the carriage by a motor and to provide for controlling this by the addition and subtraction lever; (7) to provide for simultaneous splitting of the numeral indicator, digit wheels, and hammer section; (8) to provide a dater mechanism which will print the year; (9) to provide for the addition, subtraction, etc. of fractions; (10) to provide a digit wheel not directly controlled by the key board but to which transfers may be made, thereby increasing the capacity of the machine without increasing the number of banks of keys; (11) to place all operation predetermining control levers on top of the keyboard; (12) to provide in a calculating machine a timing mechanism; (13) to improve upon the driving mechanism; (14) to provide an interlock between the controls on the right and left sides of the machine; (15) to provide for returning of the repeat control by the operation of the total or subtotal control; (16) to provide an automatic means for returning the non-add control; (17) to provide a spring mechanism for transferring with more speed; (18) to improve upon the transfer mechanism; (19) to provide an automatic shifting mechanism for the carriage; (20) to provide for controlling the carriage shifting mechanism from the keyboard; (21) to provide a new type of platen clutch and release; (22) to improve upon existing carriages and to provide automatic control therefor; (23) to provide in a machine of this character an improved paper support; (24) to provide an improved paper guideway; (25) to improve upon the hammer section mechanism; (26) to improve upon the type holder; (27) to improve upon the friction mechanism used in the drive for the sectors; (28) to provide locking means to prevent dismantling of the machine; (29) to provide locking means to prevent unauthorized operation of the machine; and (30) such further objects, advantages, and capabilities as will later more fully appear.

My invention further resides in the combination, construction, and arrangement of parts illustrated in the accompanying drawings, and while I have shown therein preferred embodiments, I desire the same be understood as illustrative only and not as limiting my invention. The structure described and claimed in this application is an illustrative embodiment of the invention, the same being shown in the accompanying drawings, in which Fig. 1 is a side elevation of a ledger posting machine embodying my improvements mounted upon a supporting stand as usual.

Figs. 2 and 2ª constitute a plan view of my improved mechanism. Fig. 3 is a right side elevation with the casing in section taken along the line 3—3, Fig. 9, and showing part of the improved structure within the casing.

Fig. 4 is a fragmentary sectional elevation of the right side of the machine with part of the casing broken away.

Fig. 5 is a vertical section through the machine, taken in a plane indicated by the line 5—5, Fig. 14.

Fig. 6 is a view similar to Fig. 5 in substantially the same plane, but showing the position of the parts when the non-add key has been actuated.

Fig. 7 is a fragmentary vertical section through one side of the casing and frame, and some of the connected mechanism to show the available space between casing and frame to be utilized for control parts.

Fig. 8 is a fragmentary vertical section along the plane indicated by the line 8—8, Fig. 5.

Fig. 9 is a rear elevation of the machine with the carriage and paper carrier removed, and the casing in section.

Fig. 11 is a vertical section on the plane indicated by the line 11—11, Fig. 10, showing Babbitt kidneys on friction driven sectors.

Fig. 12 is a vertical section on the plane indicated by the line 12—12, Figs. 2 and 2ª, showing month keyboard section.

Fig. 13 is a vertical section along the plane indicated by the line 13—13, Figs. 2 and 2ª, showing accumulating segment device and mechanism for splitting hammer section and accumulator wheel mechanism.

Fig. 14 is a sectional plan along the plane indicated by the line 14—14, Figs. 5 and 15.

Fig. 15 is a vertical section along the plane indicated by the line 15—15, Fig. 14, showing complement mechanism, minus total and sub-minus total controls.

Figs. 16, 17, 18, 19 and 20 are sections along the planes indicated by the lines 16—16, 17—17, 18—18, 19—19, and 20—20, respectively, Fig. 15.

Fig. 21 is a vertical section along the plane indicated by line 21—21, Figs. 2, 2ª and 14.

Fig. 22 is a detail showing the position of the minus-total mechanism in one position thereof during the operation of finding the amount of an overdraft.

Fig. 23 is a plan view of the rear portion of the machine showing part of the keyboard and the dial and net credit or overdraft digit wheels.

Fig. 24 is a fragmentary sectional plan view showing parts of the rear of the machine with parts removed and various details of construction.

Fig. 25 is a section along the plane indicated by the line 25—25, Fig. 1, showing debit-credit control.

Fig. 26 is a broken section substantially along the plane indicated by the line 26—26, Fig. 29, showing time switch mechanism in normal position.

Fig. 27 is a vertical section along the plane indicated by the line 27—27, Fig. 26.

Fig. 28 is a vertical section along the plane indicated by the line 28—28, Fig. 27.

Fig. 29 is a plan section substantially along the plane indicated by the lines 29—29, Figs. 4 and 26, showing time switch and driving mechanism in normal position.

Fig. 30 is a side view of the time switch and drive with castings removed. (Machine in operation.)

Fig. 31 is a vertical section along the plane indicated by the line 31—31, Fig. 4, showing motor driven carriage mechanism.

Fig. 32 is a fragmentary elevation of the left side of the motor and some of the mechanism connected therewith.

Fig. 33 is the same as Fig. 32, omitting carriage clutch and carriage, and showing addition-subtraction control in subtracting position.

Fig. 34 is a sectional plan substantially along the plane indicated by the line 34—34, Fig. 33.

Fig. 35 is a vertical longitudinal detail section of the sub-minus total mechanism for causing machine to make a half revolution and stop.

Fig. 36 is a perspective view of a part of the mechanism shown in Fig. 35, and showing the connection therewith of the sub-minus total mechanism.

Fig. 37 is a vertical longitudinal detail section substantially along the plane indicated by the line 37—37, Fig. 2.

Fig. 38 is a left end elevation of the carriage showing the hammer section and means for locking it by raising the carriage platen.

Fig. 39 is a transverse section on the line 39—39 of Fig. 37, showing the ribbon and carriage mechanism.

Fig. 40 is a sectional plan showing the relative position of the type, ribbon, parts of the mechanism for actuating the latter, and part of the hammer splitting mechanism.

Fig. 41 is a right end elevation of the carriage, showing controls for same.

Fig. 42 is a fragmentary elevation along the plane indicated by the line 42—42, Fig. 41, showing clutch mechanism for operating platen.

Figure 43:
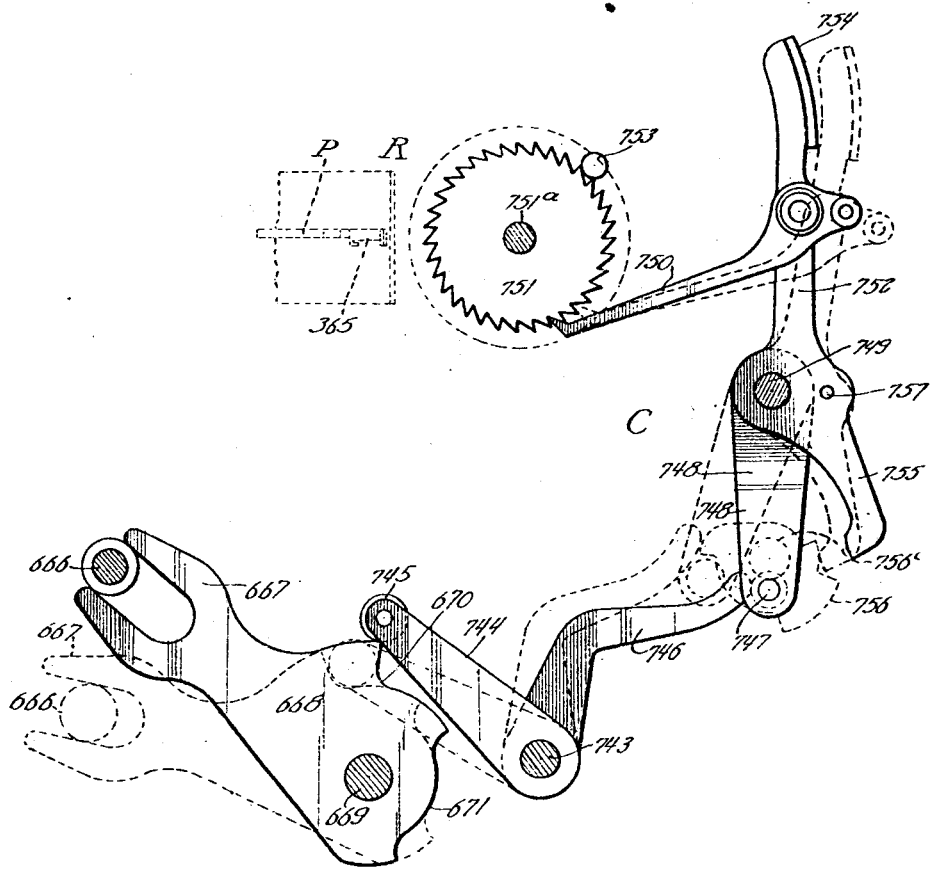

Fig. 43 is a detail of the line spacing mechanism.

Fig. 44 is a transverse section of the carriage and some controls connected therewith, with platen raised position, and showing how to determine printing position.

Fig. 45 is a fragmentary view looking in the direction of the arrow, Fig. 44.

Fig. 46 is a view similar to Fig. 44, but showing controls in position for inserting paper.

Figure 47:
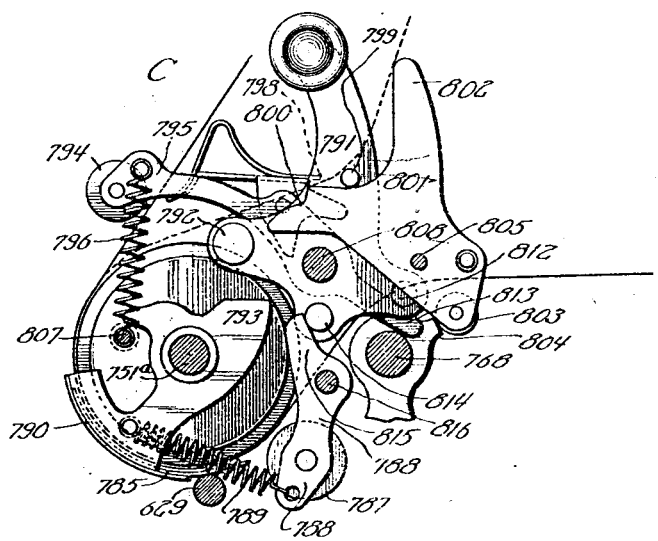

Fig. 47 is similar to Figs. 44 and 46 with the parts in different positions, the friction rollers being removed from the paper.

Figure 48:
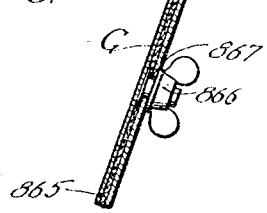
Figure 49:
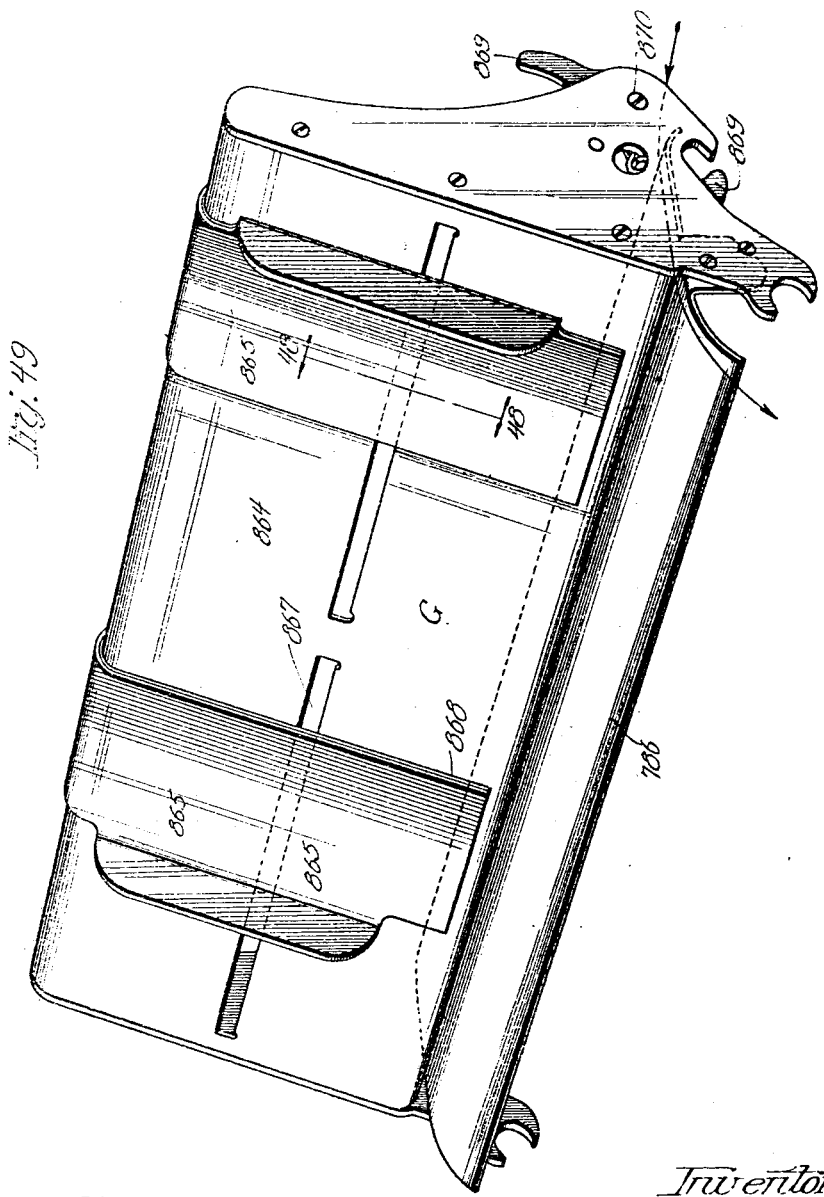

Fig. 48 is a section along the plane indicated by the line 48—48, Fig. 49, showing paper guide locking means.

Fig. 49 is a perspective view of the paper support and its connected guides.

Fig. 50 is a vertical longitudinal section in detail of the transfer and overdraft mechanism.

Fig. 50ª is similar to Fig. 50, showing the mechanism in a different part of the operative cycle, and also showing the fractional sector.

Fig. 51 is a detail sectional perspective view of a portion of the hammer section, showing means for locking hammer by lifting the platen.

Fig. 52 is a transverse sectional elevation of a portion of the mechanism shown in Fig. 51.

Figure 10:
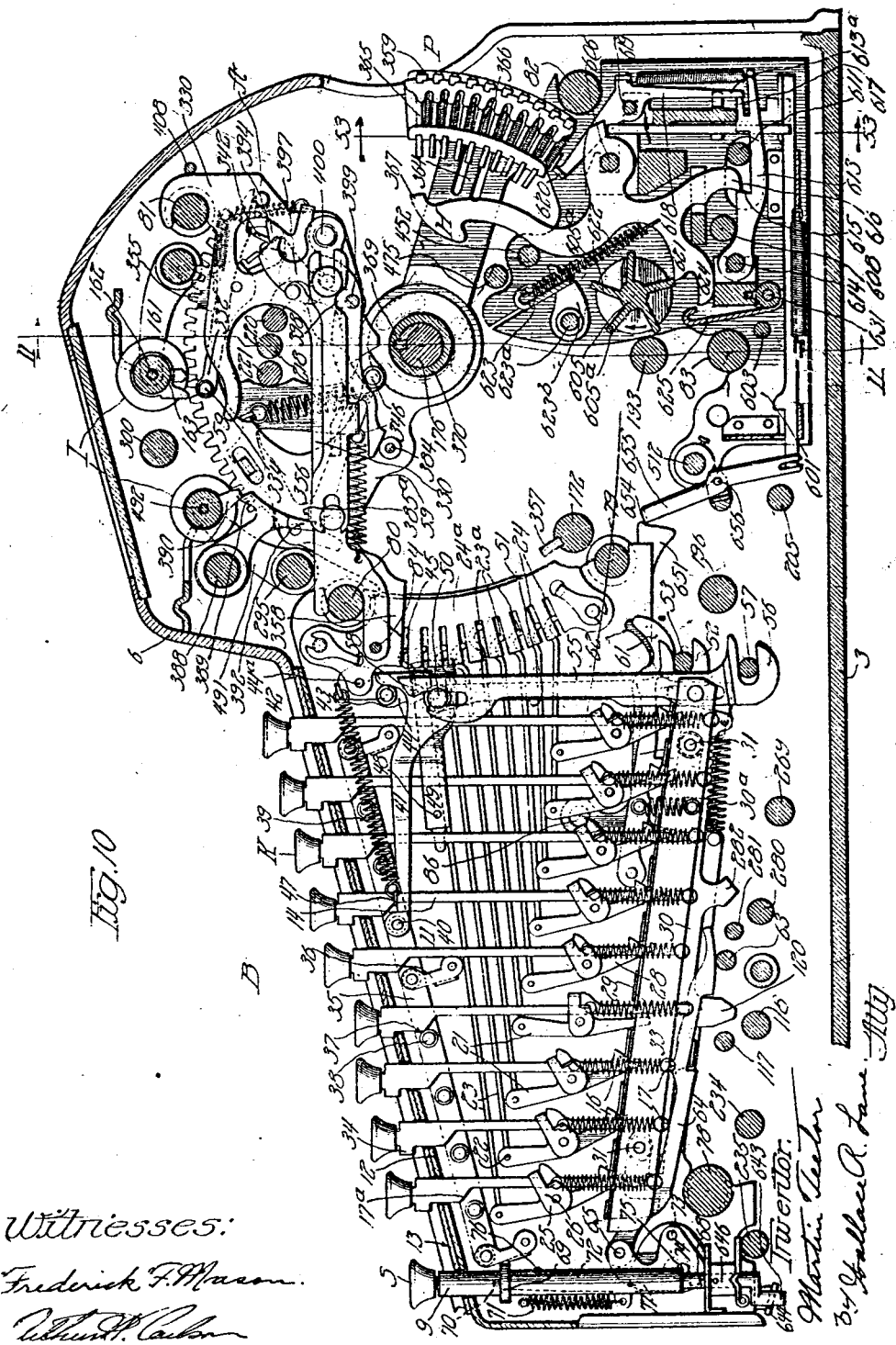
Fig. 10 is a vertical section on the plane indicated by the line 10—10, Figs. 2 and 2ª, showing the hammer mechanism in section.

Fig. 53 is a sectional elevation substantially along the plane indicated by the line 53—53, Fig. 10, showing splitting and hammer releasing mechanism.

Fig. 54 is a perspective view of the type used to indicate a number which has caused an overdraft.

Fig. 55 is a fragmentary rear sectional elevation of the machine with the casing removed, showing the overdraft mechanism connection with the numeral digit wheels and the construction of the transfer section.

Fig. 56 is a detail perspective of a transfer section.

Fig. 57 is a detail perspective of digit wheel trip on transfer section.

Fig. 58 is a detail perspective of the complement locking control mechanism during first and third operations.

Fig. 59 is an elevation of the structure shown in Fig. 58.

Fig. 60 is a detail perspective of minus total and addition-subtraction control locking device.

Fig. 61 is an elevation of the mechanism shown in Fig. 60, together with one of the parts cooperating therewith.

Figs. 62, 63, and 64 are views similar to Fig. 61 with the parts in different relative positions.

Fig. 65 is a detail of one of the individual correction keys showing the connection therewith of the splitting mechanism.

Fig. 66 is a sectional elevation substantially along the plane indicated by the line 66—66, Fig. 65.

Fig. 67 is a plan section along a plane indicated by the line 67—67, Fig. 65.

Fig. 68 is a plan view of two correction keys showing one key in splitting position as indicated by line on key.

Fig. 69 is a fragmentary vertical longitudinal section of keyboard, showing flexible keyboard mechanism.

Fig. 70 is a sectional elevation along the plane indicated by the line 70—70, Fig. 69.

Fig. 71 is a perspective view of one of the stop actuating yoke members.

Fig. 72 is an end view of the fractional digit wheel.

Fig. 73 is a front view of this wheel.

Fig. 74 is a plan view similar to Fig. 73, showing the adjacent units digit wheel and part of the machine.

Fig. 75 is a perspective view of a portion of a printed sheet showing the addition of fractions.

Fig. 75$^a$ is a view similar to Fig. 72 but showing a device having two transfer actuating projections and stops and corresponding to a keyboard having fifths keys instead of tenths or some other value.

Fig. 75$^b$ is a sectional elevation showing the digit wheel divided into 12ths.

Fig. 76 is an elevation of one of the racks showing the mechanism for increasing the speed in transferring.

Fig. 77 is a view similar to Fig. 76 showing the actuating of the mechanism during the transfer operation.

Fig. 78 is a transverse section substantially on the plane indicated by the line 78—78, Fig. 79.

Fig. 79 is a plan section substantially along the plane indicated by the line 79—79 Fig. 76.

Fig. 80 is a transverse section substantially along the plane indicated by the line 80—80, Fig. 81, and showing the means for preventing the carriage from relocking when control on keyboard is operated.

Fig. 81 is a sectional elevation substantially along a plane indicated by the line 81—81, Fig. 80.

Fig. 82 is a view similar to Fig. 81, but showing the parts in full actuated position.

Fig. 83 is a vertical section substantially along the line 83—83 of Figs. 2 and 2$^a$, showing the mechanism controlled by the year dating key.

Fig. 84 is substantially the same as Fig. 6, but includes interlock mechanism and mechanism for returning the non-add control.

Fig. 85 is a fragmentary view of part of Fig. 84, showing total and sub-total controls locked, and the return of the repeat key by the total or sub-total control.

Fig. 86 is a perspective view of the locking device between the addition-subtraction control and the minus total control.

Fig. 87 is an elevation of the improved type holder.

Fig. 88 is a section along line 88—88, Fig. 87.

Fig. 89 is a perspective view of the typebar.

In the accompanying drawings, forming a part of this specification, certain groups of elements will be referred to in general by certain letters, and then, together with other elements, will be described in detail. In these drawings, A refers to the accumulating mechanism, B the body of the machine in general, C the carriage, D the driving mechanism, E the electrical switch, F the fraction mechanism, G the guides, H the hammer section, I the indicating or dial wheels, K the keyboard, L the locking mechanism, M the motor, O the overdraft mechanism, P the printing mechanism, R the ribbon mechanism, S the splitting mechanism, T the timing mechanism, and Y the year dater.

In the present structure, numeral 1 refers to any ordinary supporting stand upon which is supported the body B, carrying and supporting the various other elements of the mechanism. Hinged to the left side of the body B, as is customary, is a table 2 for supporting books or papers in connection with which work is being done.

*The frame of the machine.*

The body of the machine comprises a base 3 and right and left supporting frames 4 and 5 respectively, upon which are supported the other parts of the machine. As shown in Fig. 4, the base 3 is supported on the frame 1 and has fitted closely therearound a casing 6 to enclose the major part of the operative parts of the machine.

Resting upon the base 3 are the side frames 4 and 5, heretofore referred to, which are secured together by various transverse bars and shafts, the specific use of each of which will hereinafter appear. To the bottom 3 of the frame are secured castings 7 and 8, which support the timing mechanism and the drive mechanism. Secured to the rear portion of the frame and extending through an aperture in the cover 6 is the carriage mechanism C to be described in detail later. Besides the frame the body B includes various interlocks to be mentioned more specifically in their appropriate places. Carried by the casting 8 is the motor M having a drive shaft $M^1$, upon which is secured a worm $M^2$ in driving engagement with a worm wheel $M^3$, whereby the mechanism of this machine is driven.

*Flexible key-controlling mechanism.*

Aside from the year-dater key hereinafter specifically described, this is a 12 column machine in which each bank of keys is separately and independently removable from the frame, and since the mechanism of the banks is similar, a description of one may be taken as describing the mechanism of all. It may be noted in passing that counting from right to left each of columns 2-9 inclusive, consists of nine keys, numbered successively from one to nine, the zero being automatically printed in all columns to the right of any operated key, in which no key is depressed, unless the splitting mechanism is operated. At the forward end of each column is located a combined correction and splitting key 9, which carries an indicating mark 10, the purpose of which will later appear.

Referring to Figs. 10 and 65-71, 11 indicates the supporting plate of a bank of keys, to which is secured a cap plate 12, covered by some suitable soft covering substance such as felt, 13, whereby the spaces between the banks of keys are entirely closed against the entrance of dust and like substances. Upon the supporting plate 11 are secured the operating keys and the various operating means connected therewith. In Figs. 69 and 70, the structure of the operating keys is shown in detail. As here shown, the shank 14 of the key is provided on its rearward face with projections 15 and 16, and on one lateral face with a projection 17, preferably formed by bending over the lower end of the shank, while upon the forward edge near the top are provided a cam face $17^a$ and a stop member 34. As shown in Fig. 70, projection 17 is preferably, though not necessarily, provided with a groove for the reception of one end of the spring member 18, which is at its other end secured to a perforated projection 19, integral with or secured to a yoke member 20, having at one of its ends a transverse bar 21, the upper end of which is perforated for the reception of the bent-over end 22 of the stop wire 23, the opposite end of which is bent and rides in a slot 24 in a plate $24^a$, as shown in Fig. 10. As shown in Fig. 71, the ends of the yoke are perforated for the reception of a pin 25, upon which the yoke is pivoted to the supporting plate 11. On this pin 25 and between the ends of the yoke is mounted a roller bearing 26, against which rests one edge of the shank 14, while between the yoke and the supporting plate is mounted a spacing member 27. The central portion of the yoke 20 rests upon and is tensioned against the projection 15 by the spring 18, but the shank is biased upwardly by said spring 18 by reason of the fact that the force of the spring applied to the lower end of the key bar or shank is transmitted to a point on the yoke farther away from the pivotal point than the projection 19. The lower end 28 of the crosshead 21 projects downwardly through slots in the flange 29 of a reciprocatively mounted plate or bar 30. Flange 29 performs the following functions; to wit, it acts on ends 28 to release any key in its column; it serves as a stop member to prevent keys from being depressed; it serves, when one key is depressed, to release any other key in the same column; it serves as a locking means to hold a depressed key in its lowered position until released.

Plate 30 is provided with a pair of keyhole slots for the reception of pins 31, carrying roller bearings 32, which act as supports for the plate and enable the same to be easily acuated. The keyhole slots make it possible in dismantling the machine to remove the bars 30 from their supports. This construction also makes possible the easy assembling of this part of the machine. As shown in Figs. 69 and 70, the flange of flanged plate 33 is provided with slots in which the lower ends of shanks 14 slide, and by which said shanks are held from undue motion forwardly or rearwardly. The opposite end of the shank 14 passes through a slot in plate 12, in which it fits closely but yet slides freely. At its upper end, the key shank 14 is provided with a stop member 34, which engages the top of plate 12 or its covering member 13 to prevent the key from being depressed too far.

A reciprocatively mounted bar 35 is pivotally connected at intervals with supporting members 36, which permit the bar to have forward and backward motion when actuated by the cam surface 17$^a$ acting on the roller bearings 37 mounted on supporting pins 38 or under the influence of a spring 39 (see Fig. 10). Connected to bar 35, as at 40, is a link member 41, having at one end a cam face 42 engaging a roller bearing 43, carried by a lever 44, which is pivoted at 44$^a$ and is connected to the first stop wire 45. On the opposite side of the pivot 44$^a$ and forming part of the lever 44 is a projection 46, to which one end of spring 39 is attached, while its opposite end is attached to a projection 47 on bar 41.

Pivoted to plate 11 by a pin 48 is a bar 49, (Fig. 10) which carries a pin 50 to which is connected near one of its ends a bar 51, which bar has at its opposite end fork arms 52 engaging a rod 53. When rod 53 is held in its uppermost position, the first stop wire 45 is withdrawn from it position as a stop member upon the actuation of any key in its column. Rod or link 51 is provided near its lower end with a slot, engaging pin 54, which serves to guide the link in its vertical motion. Slidably mounted on pins 50 and 54 by means of slots is a rod or link member 55, which has at its lower end fork arms 56, which engage a rod 57. This link member 55 carries at its upper end a cam-shaped member 58, which is normally in its lowered position, so that it does not engage the roller bearing 43, but which is actuated upwardly by rod 57, during the operations of taking a total, sub-total, minus total, or sub-minus total, with the result that wire 45 is drawn out of the path of sector arm 59 or rocker arm 60, as the case may be.

When touch bar TB (Fig. 2$^a$) is actuated to cause the operation of the machine, rod 53, which is normally in an elevated position, is lowered to permit levers 61 and 62 to be depressed. At the same time, rod 63 is elevated, which elevates pawl 64, pivoted at 65, so that shoulder 66 is raised to such a height that it cannot engage lug 67 on flanged plate 30. Because of this relative location of parts, if correction key 9 should be depressed while the machine is in operation, pawl 64 will not actuate plate 30 to release any key which is depressed.

Referring to Figs. 10, 12, 65 and 66, it will be seen that correction key 9, having a reduced lower extremity 68, is provided near its upper end with a shoulder 69, which abuts against the pin 70, mounted on plate 11, to limit the upward motion of the key under the influence of spring 71, attached at one end to the plate 11 and at its opposite end to a perforated lug on a reciprocatory bar 72, whose upper end abuts against the shoulder 69 and whose lower ends is pivoted at 73 to a bell crank lever 74, which is pivotally connected at 75 with plate 11, and at 65 with pawl 64, as heretofore stated. Bar 72 is guided in its reciprocating motion by a pin 76 on plate 11 and has a shoulder 77 to engage pin 75 to limit the downward motion of the key, which slides loosely in plate 12.

Castings 4 and 5 are secured together and held in proper assembled relation by bars 78, 79, 80, 81, 82, and 83, which pass transversely through the machine and are secured in position therein. Besides acting as tie members for the frame, these bars act as supports for various elements of the machine, as will be hereinafter set forth more fully. It will be seen by referring to Figs. 10, 12, 13, 14, 20 and 65, that bars 78, 79, and 80 are provided with grooves which encircle the same, to provide lateral supporting means for plates 11, which are suitably notched to fit around the bars and within the grooves. The plates 11 are locked in position by a key rod 84, which passes transversely through the plates and through suitable apertures in frame members 4 and 5.

Lever 61, as will be seen most clearly in Fig. 12 is provided with a shoulder 85 which may engage in a notch in flange 29 on plate 30 when, during the actuation of the machine, rod 53 is in depressed position, provided plate 30 has been forced backward during the clearing operation. Plate 30 will, therefore, be held in its actuated position so that no key may be depressed and then held in lowered position by the plate during the actuation of the mechanism. Also the faces of the flange slots abut against the extensions 28 to prevent stop wires 23 from entering slots 24 far enough to prevent the complete actuation of the sector arms 59 and rocker arms 60. It will be seen in Fig. 12 that lever 62 is pivoted at 86 to the plate 11 and that it has projecting from one end thereof a finger 87, which engages the flange 29 to actuate plate 30 against the tension of spring 30$^a$.

Special keys.

At the right of the banks or columns of ordinary numeral keys above described is a bank of fraction keys F to be hereinafter specifically described, while at the left of the keyboard are three other columns of special keys, the one at the right including numerals from 1 to 9, the one at the left including months, and the middle one including three keys for printing numbers from 10 to 39, and six special character keys shown in the drawing as referring to "Invoice", "Balance", "Discount", "Due", "Credit" and "Debit". At the left of the December key is a year key YK, bearing the symbol 19, which may be used to print the first two numerals of the year, the other two numerals being printed by means of the figures indicated by the letters DK. It should be noted in this connection that the printing of any character or numeral in the first or third of these three columns does not result in the printing of any character to the right thereof, but that zero or any significant figure may be printed in the right hand column with 1, 2, or 3 in the middle column. It is noted that the keyboard mechanism of these three banks of keys has the same flexible construction as heretofore described in connection with the eight columns before described.

By referring to Fig. 9, it will be seen that the year-type is carried by the same carrier which carries the month-type. The year-key has certain special mechanism for locking the same in depressed position, for stopping the rocker arm 60 to the left of the machine in proper printing position, and for getting the first stop wire in the month-key mechanism out of the way of the rocker arm so that the type may be gotten into printing position opposite the hammer and for releasing the hammer mechanism so that printing may be effected.

The year-key shank 100 (see Fig. 83) is provided with lugs 101 at its lower end and 102 near its middle, which serve as stops to limit the upward movement of this key, which is guided in its vertical reciprocating motion by lugs 104 stamped out of plate 11, or by other suitable mechanism. This key shank also carries a cam 103, which engages a roller bearing 105, mounted on a lever 106, pivoted at one end to the plate 11 and provided at its opposite end with a fork 107, which engages a pin 108 extending through a slot in plate 11 and engaging bar 35 and carrying upon its opposite end a roller bearing 37 adapted to be engaged by cam 17ª.

Attached to the lug 102 is a spring, which is suitably supported and which acts to hold key shank 100 in elevated position when not otherwise held in a depressed position. Also connected to this lug by means of a pivoted link 109 is a lever 110, mounted at one end upon plate 11, and having at or near its opposite end a recess to engage a stop pin 111 mounted upon the left-hand rocker arm 60. Pivoted to the plate and having on one edge a lug 113 in a suitable position to be engaged by lug 101 is a lever 112, which is normally pulled forward by means of spring 114. Connected to the free end of this lever and adapted to be actuated thereby is the pawl 115, provided with a detent 116 adapted to be engaged by a bar 117 pivotally connected to a bar 118. This pawl also carries a lug 119 bent inwardly into position to be engaged by the back face of the lug 120 on bar 30.

When key 100 is depressed, lug 101 will be lowered beyond lug 113 and lever 112 will then be pulled forward by spring 114 into a position to lock key 100 in depressed position. When this key is depressed, lever 110 is naturally forced backward until its notched end comes into the path of stop pin 111 so that rocker arm 60 may rock a short distance before it will be stopped by the pin striking the lever 110 as indicated. By this motion, the hammer section is released so that the hammer may strike the year type 121 to accomplish the printing. The pressing of key 100 also retracts the first stop wire 45 of the left hand bank through the action of lever 106 and pin 108. During the actuation of the machine, bar 117, rocked about 118, strikes against lug 116 and pushes pawl 115 backward so as to release lug 101 from lug 113, in order to release key 100. In the event that the repeat mechanism has been actuated to prevent the clearing of the keyboard and cause the repetition of the item, the action just described will not take place and the year-key will not be released as indicated. The function of lug 119 is to serve as means for releasing key 100 by actuation of correction key 9 in the month column.

The fraction mechanism shown in Figs. 72–75ᵇ is the same as that heretofore described except that the number of keys in the fraction column, the number of cogs in the dial wheel, and the number of teeth in the sector differ from that of the structure above described.

The location of the addition-subtraction, total, sub-total, repeat, and non-add controls is shown in Figs. 2 and 2ª to be at the right side of the machine, while the minus total and sub-minus total controls are shown in Fig. 2ª to be at the left side of the machine. The use of each of these controls will be briefly stated and then the structure will be recited in detail.

At the right of the machine, as shown in Fig. 2, is a carriage clutch control CC used to control the shifting of the carriage from right to left or left to right, and at the front of the machine to the left of the middle, as shown in Figs. 1 and 2ª, is a debit printing location control DC.

*Controls to the right of the machine.*

In the normal operation of the machine, it is customary to actuate the total control lever TC and strike the touch bar TB so that one may be certain that no numbers are being carried by the dial wheels. The addition-subtraction control ASC is then actuated, which action returns the total control to its normal position and places the ASC lever in its adding position. Any desired date, character, or number may then be set up on the machine and the actuation of the touch bar will result in the placing of the numbers at the right of the date in the dial wheels and the printing of anything which has been set up, assuming that the non-add key NAC is in normal position. Other items may be added in the customary manner. If it is desired to subtract an item from something which is already in the machine, the item may be set up on the keyboard and the ASC lever pulled to its subtraction position, or vice versa. Pressing the touch bar TB will then cause actuation of the machine and the subtraction of the item set up from the sum previously in the machine. The number set up will be printed and the appropriate minus character will be printed adjacent thereto to indicate that this is a subtracted item. If the amount subtracted is greater than the amount already in the machine, or if an amount is subtracted when there is nothing already in the machine, the amount so subtracted will be printed as a minus item and the difference will be carried into the dial wheels as a complement, the overdraft sign shown in Fig. 54 and the subtraction sign being printed at the right of the number.

Assuming now that it is desired to print an item without adding it; this may be accomplished by pulling the non-add control NAC toward the operator and causing actuation of the machine by the use of the touch bar. As will be apparent, this will cause the printing of this item without adding it to or subtracting it from the amount already accumulated in the machine. At the time this item is printed, an appropriate symbol will also be printed to indicate that this quantity is a non-add item.

Adjacent the non-add control, shown also in Fig. 2, is the repeat control RC, the function of which is to cause the operation of the mechanism of the machine so that the clearing mechanism of the keyboard is not actuated to release the keys depressed. As is understood, the item set up on the keyboard will be retained so long as the repeat control is kept pulled toward the operator. It will be understood that in the matter of operation, the non-add and repeat controls are independent so that, if it is desired to repeat the printing of an item without adding it, this may be done by actuating both the repeat an non-add controls. It should probably also be stated that the repeat control may be actuated with the addition-subtraction control in either of its positions, but that for the use of the non-add control the addition-subtraction control must be in adding position.

Referring now to Fig. 2ᵃ, if it be assumed that one or more items have been accumulated in the machine and it is desired to find the accumulated total, it is merely necessary to pull the total control TC toward the operator, which action automatically sets the ASC control in subtraction position. If now the touch bar be actuated, the machine will print the accumulated total, and the dial wheels will be re-set to zero. If, however, it is desired to print the total without changing the setting of the dial wheels, the sub-total control STC should be actuated before actuating the touch bar. This will result in the printing of the accumulated total without clearing the dial wheels.

If it should happen that an item subtracted is greater than the accumulated total in the machine, and it is desired to find out by how much the machine has passed zero, this can be accomplished by actuating either the minus total or the sub-minus total and then actuating the touch bar. If the minus total control be actuated, the amount by which the machine has passed zero will appear in the set of dial wheels nearer the operator, (see Fig. 2), while the farther set of dial wheels will show zero. Touching the touch bar TB again will result in clearing the dial wheels nearer the operator, which show the net credit or overdraft (the amount by which the machine has passed zero).

If, instead of operating the minus total control, the sub-minus total control SMC had been operated, the setting of the dial wheels in the first operation would be the same as in the first operation of the preceding illustration, but upon touching the touch bar again, the overdraft or net credit dial wheels would be returned to zero and the dial wheels remote from the operator would again be set to show the amount carried by them before the first actuation of the machine for the purpose of determining the overdraft or net credit.

If it is desired to separate debit and credit items, or subtracted and added items, printing the same in separate columns, the control on the front of the machine, marked DC, will be moved either to the left or right, as shown by the dotted lines in Fig. 2ᵃ. This will then determine whether the subtracted items are to be printed at the left or the right and the added items at the right or the left. To accomplish this separation of items, it is necessary to actuate the carriage clutch control CC to one end of its path of travel or the other so that the clutch will be thrown in and the motor which actuates the carriage may cause it to be moved in the appropriate direction, provided pawl 907 is released to engage ratchet 908. The ASC lever will be placed in the appropriate position for adding or subtracting and the shifting of this lever will release the carriage for reciprocations, as will be explained later in connection with the detail description of the "Shifting mechanism for the carriage". The shifting also releases pawl 907 to engage ratchet 908. When the proper item has been set up on the keyboard, the touch bar will be actuated and the item will be printed in its appropriate place and with the appropriate sign, if it is a subtracted item.

*Detail of addition and subtraction mechanisms and operation.*

Assuming the addition-subtraction control lever to be set in the position shown in Figs. 5 and 6 for the addition of a number, the parts are connected as shown. The ASC lever is provided on its lower side with a projection 122 carrying a roller bearing 123, which may operate in the Y-shaped fork 124 of the elongated lever 125, pivoted at 126. The ASC lever also has on its lower end a cam 127, which is engaged by a roller bearing 128 carried by a lever 129, pivoted at 130. The purpose of this lever 129 is to act as part of an interlock mechanism to prevent the actuation of the machine by the touch bar before the ASC lever reaches its extreme position for addition or subtraction and to prevent the ASC lever from being actuated while the touch bar is in depressed position. This is accomplished by the lower end of lever 129, which has a flat face 131, engaging a roller bearing 132 on lever 133, pivoted at 126, (see Figs. 3, 5, and 6).

This lever 133 has secured to its forward end by rivets or equivalent means 134, a stop 135 (Fig. 4) adapted to interlock with bell crank lever 136 pivoted at 130, one of whose ends is connected to link 137 and whose other end is engaged by the bar 138 connected with the touch bar TB. The opposite end of link 137 is connected to one end of a similar bell crank lever 139 pivoted at 140, and whose free end is engaged by another bar 138ª connected with the touch bar. When the ASC lever is actuated, cam 127, acting on roller 128, rocks lever 129 on its pivot 130, which in turn rocks lever 133, lifting interlock bar 135 into position opposite bell crank 136, whereby to prevent the rocking of this lever and consequently prevent actuation of the tripping mechanism. When the actuation of the ASC lever has been completed, lever 133 again resumes its lowered position so that stop 135 cannot prevent the actuation of the touch bar. Similarly, if the touch bar is depressed, the lug on bell crank lever 136 will rest above interlock bar 135, so that it will be impossible to actuate the ASC lever.

The connection from the mechanism just described to the tripping lever will be later described. (See "Driving mechanism.")

Lever 125, pivoted at 126 as previously indicated, has at its back end a pivotal connection 141 with one end of the link 142, whose other end is pivoted at 143 to link 144, the opposite end of which is pivoted at 145 to a spring actuated member 146, pivoted at 147 to the frame casting 4. (Figs. 3, 5 and 6.) Carried by this same pivot 147 are three other pivoted members 148, 149 and 150, (Fig. 3) the first of which has a lug 151 adapted to engage the other two alternately. These latter are biased toward each other by the coiled spring 152, whose ends extend away from the coil and engage lugs on the ends of members 149 and 150 respectively.

It will therefore be seen that when member 148 is oscillated about its pivot 147, the lug 151 will alternately engage members 149 and 150 to put the spring under tension so that the ends of said members will force pivot member 145 to move in one or the other direction, carrying with it link 144 and any mechanism connected therewith, (Fig. 6). This results in rocking member 153 about its pivotal point 154, which motion carries member 155 upwardly or downwardly against the face of the cushioning stop member 156. Member 155 has in its body portion a slightly S-shaped slot 157, in which rides a roller bearing 158 on lever 159, which is secured to shaft 160. This shaft 160 has secured thereto arms 161 carrying at one end a rod 162 (Fig. 5) on which is mounted the dial wheel mechanism 163. The object of this rocking of parts 159 and 161 is to carry the dial wheels alternately into engagement with the sectors 355 and stop fingers 164. The operation of the dial wheel mechanism will be described in detail later.

The oscillation of member 153 and of the mechanism connected with it and with the dial wheels is only possible when the relative arrangement of rocking member 146 and parts cooperating therewith is such that rocking of this member may take place. At the lower end of member 146 is a roller bearing 165 which cooperates with an arcuate stop member 166, which prevents the actuation of this member by the spring 152 until one end or the other of the stop member has passed the roller bearing 165. This stop member 166 is carried by a plate 167, which is connected thru a train of gears and link mechanism with the main driving mechanism.

When the ASC lever is rocked from the adding position, shown in Fig. 6, to the subtracting position shown in Figs. 3 and 33, roller bearing 123 will engage the upper arm of fork 124 and rock lever 125 into its other operative position, in which its rear end is lowered, carrying with it link 142 and pivotal member 143. When the roller bearing carried by pivotal member 143 passes the pivotal point 154 it causes members 153 and 155 to move with a snap action into the other position assumed thereby. This snap action therefore naturally results in a quick movement of the dial wheels from engagement with the stop fingers 164 into engagement with sectors 159 or vice versa.

When member 125 provided with cam face 168 (Figs. 5 and 6) is rocked so that face 168 comes into engagement with pin 169, rack member 170, provided on one edge with teeth 171, is rocked slightly about its pivot 172, on which it is loosely mounted. A stop member 173 is carried at one end of arm 174, at the opposite end of which is mounted the type holder 175 for the indicator type used to print symbols indicating what operation has been performed. This arm is loosely mounted upon shaft 176, upon which are splined various spools and other members to be later described in detail (see "Friction drive mechanism"). It will be seen from the above description that when member 170 is rocked about its pivot slightly, lug 173 will be permitted to drop into the next notch, and if rocked further, it will be permitted to drop into other notches lower down, thereby permitting the type holder 175 to rise and place the appropriate type bar in position before the hammer to print the appropriate symbol. Arm 174 is provided at its inner end with a stop finger 177, which engages rod 80 to limit the upward motion of this arm.

On lever 125 are two stop members 178 and 179, which respectively engage shaft 172 and pivot pin 180 to limit the downward and upward motion of the arm. Carried by arm 125 is a pin 181 (Figs. 5, 6, and 33), which normally engages a projection 182 on a locking member 183, which is provided with a downwardly extending finger 184, having stop member 185 to engage with a lug 186 on pivoted member 146. When arm 125 is lowered by the shifting of the ASC lever, projection 182 will follow the pin for a short distance, thereby throwing finger 184 forwardly until its lower end engages a pin 187, carried by member 167. During a subtraction operation, the top portion of member 167 rocks forwardly, taking pin 187 out of engagement with finger 184, thereby permitting stop lug 185 to engage lug 186 when same is lowered and hold same in depressed position until pin 187 comes back and pushes finger 184 rearwardly to release lug 186 from 185, it being understood that member 183 is pivoted on stop pin 180.

Carried by arm 125 is a pin 188, which is moved upwardly beyond the point of lug 189 on arm 190, by throwing the ASC lever into the subtracting position. This makes possible the operation of the overdraft controls when the machine has passed zero by a subtraction operation. (See "Detail of the minus totaling mechanism.")

Assuming the ASC lever to be pulled into subtraction position, the forward end of lever 125 will be rocked upwardly, and its rear end downwardly, whereby the parts will be set for a subtracting operation, as indicated heretofore. Having now set up an item on the keyboard to be subtracted from the accumulated total in the machine, the touch bar is actuated to cause the operation of the machine. This releases the trip mechanism and permits the actuation of link 191 by the main drive mechanism. The reciprocation of this link oscillates the geared sector 192 upon its pivot 193. Sector 192 is geared to sectors 194 and 195, which results in the actuation of these sectors to operate sector arms 59, rocker arms 60, and arm 174 on shaft 176, in the event that these members should be released for operation. Member 167 is secured to and oscillated with sector 195, and carries with it shaft 196, to which is secured cam member 197. This cam member 197 has mounted upon it roller bearing 198 (Figs. 5 and 6), which engages finger 199 on rocker arm 200, carrying at its ends shafts 53 and 63. Rocker arm 200 has another finger 201, to which is secured one end of a coiled spring to rock same in one direction about pivot 126, the other end of the coiled spring being secured to member 202, which rocks keyboard clearing shaft 117 about shaft 118.

The rocking of member 197 about its pivot causes the raising and lowering of finger 199 and with this the raising and lowering of shafts 53 and 63. The purpose of this is set forth in connection with the description of the keyboard mechanism shown in Figs. 10 and 12. With the ASC lever in subtracting position, the dial wheels are in mesh with sectors 355 and the downward motion of these sectors will rotate the dial wheels backwardly to subtract from the accumulated total in the machine the amount set up on the keyboard.

As link 191 starts downwardly, pulling with it the operating member 209 of sector 192, it also pulls downwardly pin 210, which is engaged by one end of a bell crank lever 211, pivotally connected at 212 with a link 213 and oscillating upon shaft 193. Link 213 has a pair of lugs 214 which engage a stop pin 215 in order that the motion of the link may be limited to the appropriate amount. The opposite end of link 213 is pivotally connected at 216 to a plate 217, fixedly connected with a shaft 218, upon which is mounted a lantern 219, (Figs. 10, 13 and 15) comprising rods 220 and 221. The oscillation of lantern 219 in one direction unlocks the transfer mechanism and releases sectors 355 from the lantern so as to permit a transfer to the dial wheels. Oscillation of this lantern in the opposite direction restores the sectors to normal position, and sets up the transfer mechanism for the next actuation thereof.

When the sector arms 59 and rocker arms 60 and 174 reach their lowermost position as determined by the position of their respective stops, the hammer mechanism will be released to strike respective type bars to cause the printing of the appropriate numerals and characters. Actuation of the hammers is caused by the oscillation of cam 197, the cam face of which strikes the roller bearing 203 to cause the rocking of member 204 about its pivot 205. By the rocking of member 204, pawl 206 is pushed rearwardly and its lug 207 engages pins 208 (Fig. 5). The construction and operation of the hammer section will be given later. (See "Hammer section.")

Plate 167 carries a roller bearing 222, which is engaged by a fork 223, forming a part of arm 148. The oscillation of plate 167 therefore rocks arm 148 so that lug 151 tensions spring 152. As plate 167 oscillates, flange 166 rides down one side of roller bearing 165 and prevents the rocking of arm 146 until the opposite end of flange 166 has passed roller bearing 165, whereupon the tension of spring 152 causes arm 146 to rock, with the result that the dial wheels are taken out of mesh with the sectors 355 at the completion of their downward stroke, as heretofore set forth. At this point in the operation of the machine, the printing takes place. Substantially coincident with the completion of the printing operation, link 191 reverses its direction of travel and consequently reverses the direction of rotation of sectors 192, 194 and 195.

The operation of the mechanism during addition is similar to that described for subtraction, except that, owing to the change in position of certain of the elements, as heretofore indicated, the dial wheels are out of mesh with the sectors 355 during their downward stroke and in mesh during their upward stroke, whereby the dial wheels are actuated positively instead of negatively.

*Repeat mechanism.*

When the repeat control RC (see Figs. 5, 6, and 14) is pulled forwardly, oscillating about its pivot 224, the finger 225 will be moved backwardly and will take with it link 226, pivotally connected at 227 to the finger. The opposite end of this link 226 being pivotally connected at 228 to lever 229, causes it to be rocked about its pivot 230, throwing cam 231 to the opposite side of roller bearing 232. This operation forces roller bearing 232 and rocker arm 233, which carried it, (Fig. 3) downwardly, oscillating the arm about pivot 234. The bottom face of this arm rests upon and presses downwardly the shaft 235, connected to a pair of levers 236 and 237, pivoted on shaft 234. The lever 236 has an arm 238 extending rearwardly to engage roller bearing 132, to cause an interlock, as explained. The rocking motion of lever 229 is limited by a stop lug 229ª.

Projecting rearwardly from lever 229 is an arm 239, which is bent intermediate its ends and provided at its free extremity with a bent over portion 240, forming a flange which engages spring held pawl 241, so that the same may be depressed (Fig. 5). This causes the lug 242 to be freed from pin 243. As a result of this, rod 117 is not caused to be actuated about shaft 118 to clear the keyboard and, since the keyboard is not cleared, the previous setting is retained and is repeated by the actuation of the touch bar.

*Non-add mechanism.*

When the non-add control (see Figs. 5, 6, and 14) is pulled forwardly about its pivot 224, the pin 244, to which are connected links 245 and 246, is oscillated rearwardly and actuates correspondingly the links. This pin 244 is carried by lever 253. Link 246 is connected at 247 to lever 248 and consequently rocks it about its pivot 230. This lever has projecting upwardly therefrom a pair of yoke arms 249, which cooperate with lug 229ª to limit the rocking motion of the lever, the rearward yoke arm being extended to such a point that when the lever NAC is rocked forwardly, it will serve as a stop to prevent the actuation of the ASC lever to subtracting position. This projection also cooperates with the ASC lever to prevent the non-add control NAC from being pulled forwardly when the ASC lever is in subtracting position.

At its lower end, lever 248 is provided with arrowhead cam member 250, which cooperates with a roller bearing 251, corresponding to roller bearing 232, and carried by an arm 252, corresponding to arm 233. These arms are held in their upward positions by suitable means, such as coiled springs. The action of these members 252 and rod 235 and the connected mechanism is described heretofore in connection with rocker arms 233.

Pin 244, carried by lever 253, has one end projecting into engagement with yoke arms on the non-add control lever. Link 245 has in its free end a slot 254, which surrounds a pin 255 carried near the upper end of rack 170. When link 245 is actuated rearwardly, it pushes rack 170 slightly backward to permit rocker arm 174 to be carried into a lower notch on the rack. This results in the setting of indicator type in position to be struck by the printing hammer.

When lever 253 is rocked rearwardly, its rearward extension or arm 256, carrying hook 257, moves downwardly so that said hook engages pin 258 on bell crank lever 211 to prevent the same from oscillating about shaft 193, when the main drive mechanism is being actuated. This prevents the operation of link 213 and thereby prevents the oscillation of lantern 219.

On the side of pivot 180, opposite from pin 244, is a hook 259 forming part of lever 253. When the non-add control lever is actuated, this hook 259 is moved forwardly into a position in the path of flange 186, to prevent the actuation of lever 146, thereby preventing the dial wheels from being thrown into engagement with sectors 355.

Totaling mechanism.

When the total control TC is pulled forwardly about its pivot 260, it actuates both the totaling mechanism and the subtraction mechanism, this latter being caused by pin 261 pulling link 262 backwardly. This link is pivoted at its forward end to the ASC lever, and has in its rearward end a slot 263, which rides over pin 261 when the total control is returned to normal position as well as when the ASC lever is itself pulled into subtracting position. Projecting from a forward edge of the total control lever is an arm 264, having an S-shaped slot 265 and carrying a pin 266 in its extremity. The purpose of this pin will be explained later.

Riding in the slot 265 is a roller bearing 267, carried on a pivoted lever 268 on shaft 269. The opposite end, 270, of this lever engages a pin 271 fixed in the rocker arm 272, rigid with shaft 269 (Figs. 5, 6, and 14.) When this rocker arm is raised it carries with it rod 57, engaging yoke arms 56 (see Fig. 10). When rod 57 is actuated upwardly, it causes cam 58 on bar 55 to engage roller bearing 42 on lever 44, thereby withdrawing the first stop wire from a position in which it would obstruct the motion of sector arms 59 and rocker arms 60.

The end of rocker arm 272, extends upwardly and rearwardly, and near its extremity carries a pin 273. When this pin is carried upwardly with the rocker arm it engages a cam face 274 on an extension 275 of rack 170, thereby rocking the rack about its pivot 172. This actuates the rack backwardly to an extent which permits arm 174 to come down until the flange 173 engages one of the notches of the rack, thereby stopping the type carrier 175 in such a position before the hammer section that the appropriate indication will be printed to indicate that a total has been taken.

Carried by the total control lever TC near the slot 265 is a pin 276. This pin is straddled by a yoke on link 277, which is pushed downwardly by pulling the total control lever forwardly. At its lower end, this link 277 is pivoted at 278 to a member 279, pivoted at 280, which carries rearwardly the transversely-extending bar 281 when the total control is pulled forwardly. This rod 281, in its backward motion, strikes a lug 282, carried by reciprocating bar (Fig. 10), thereby pushing the same rearwardly and causing the apertured flange 29 to engage the lower extensions 28 of crossheads 21, thereby preventing any of the stop wires from interfering with the downward progress of the sector arms 59 and rocker arms 60.

Referring now to Fig. 13, it will be seen that when rod 57 is actuated upwardly, during the taking of a total, it comes into contact with a cam 283, carried by a lever 284, pivoted at 285 and having at its opposite end a stop lug 286, which is normally in the path of a pin 287, carried by left-hand sector arm 59. However, when a total is being taken, this lever is rocked on its pivot so that lug 286 is moved out of the path of pin 287, allowing the sector referred to to move downwardly as far as the dial wheels will permit. This sector arm 59 and its associated dial wheel do not correspond to any of the banks of keys, and the function thereof is to accumulate and print as part of the total any amounts transferred from the dial wheel corresponding to the last one of the banks of keys. This dial wheel will be hereinafter referred to as the accumulating dial wheel. Lever 284 is held in its normal position by any suitable means such as spring 288. Pivotally connected at 289 with the total control lever is a link 290, having in its opposite end a slot 291, which rides over a pin 292 mounted in lever 293 (see Figs. 3, 5, 6, and 22). This lever 293 carries on one side a pair of stop members 294, adapted to engage a shaft 295 to limit the rocking motion of the lever. The upper extremity of this lever has a plurality of cam faces 296 and 297, and roller bearing 298 mounted on rocker arm 299 cooperates with these cam faces to cause oscillation of shaft 300. Loosely mounted upon this shaft is a bell crank lever, comprising arms 301 and 303, adapted to swing with rocker arm 299 into a position with arm 301 above pin 302, on plate 217, thereby preventing the oscillation of the lantern 219. Arm 303 has at its outer extremity a lug 304, the purpose of which will be explained in connection with the complement mechanism. Members 299 and 301 are connected by a spring 305, the purpose of which is to cause arm 301 to follow roller bearing 298 when the same is actuated rearwardly by the cam faces on lever 293.

Opposite each one of the dial wheels is a stop member 306, (Fig. 5) rigidly connected with shaft 300, which is, by actuation of said shaft, caused to assume a position in front of a stop member 307 (Figs. 9 and 22) forming a part of each dial wheel mechanism. The purpose of this is to cause the dial wheels to stop at zero during the operations of taking a total, minus total, sub-total, or sub-minus total. Since, in taking a total, the subtraction lever is pulled and the dial wheels are returned to zero, the operation of taking a total may be considered in part a subtraction operation, and in both of these operations, the stops 306 and 307 cooperate to set the dial wheels at zero. At this time the hammer section is operated to print whatever number was carried by the dial wheels.

Sub-totaling mechanism.

When the sub-total control STC is pulled forwardly above its pivot 260, the roller bearing mounted on pin 308, carried by the lower extremity of this control, engages cam member 309 on the rack 170 to rock same into such a position that an appropriate symbol will be printed to indicate that a subtotal has been taken. This roller bearing also reaches a position above a stop member 310, carried by member 146, whereby to prevent the dial wheels from being moved out of engagement with the racks as heretofore explained, thus preventing the clearing of the dial wheels. It will be noted that a pin 311, carried by the total control, projects laterally in front of the sub-total control lever, so that when the same is pulled forwardly it causes the actuation of the total control and the addition-subtraction control. The end 312 of the sub-total control lever, upon which pin 308 is mounted is provided with cam faces, which engage a pin 313 on arm 314 to cause an interlock of the mechanism whereby to prevent any actuation of the machine until the sub-total control reaches its extreme position.

Details of the minus totaling mechanism.

Figs. 60 and 64, inclusive, show various positions of certain interlock mechanism for controlling the operation of the minus total control MT. In Fig. 60, the parts are shown in normal position when the ASC lever is set for addition. Fig. 61 shows a side view of the same parts with the addition of certain parts mounted on and controlled by the ASC control, the parts being in addition position. Fig. 62 shows part of these same parts with the ASC lever in substraction position. Fig. 63 shows the same parts in the same position except that the minus total control has been pulled, causing the locking of certain parts. Fig. 64 shows the position of the parts of Fig. 60 which are not shown in Fig. 62 when a subtraction operation has caused the machine to pass zero; this is the position of these parts before the minus total control MT has been pulled. Assuming the machine to have passed zero by reason of the subtraction of one or more items, and assuming that the ASC lever is in subtraction position, which it must be in order to determine the minus total or net credit, the parts will be in the position shown in Fig. 62. As soon as the minus total control MT is pulled, the parts will assume the positions shown in Fig. 63 and the parts shown in Fig. 64 will occupy the positions there shown. The action of these interlock members will be later explained. (See "Actuation of negative interlocks".)

When the ASC lever (Figs. 5 and 6) is pulled to subtraction position (shown in Fig. 3), roller bearing 123 not only pushes the fork 124, as explained, but also engages a cam face on arm 190, secured to sleeve 315, causing the rotation thereof about shaft 316. (See also Figs. 60-63.) Secured to the opposite end of this sleeve is a member 317, which is caused to be moved in the same direction and to the same amount as member 190. This motion takes the flat end 318 of member 317 out of the path of pin 319 carried by the minus total control MT so that it is possible for this member to be pulled so soon as the operation of the machine pulls lever 320 out of the way of pin 319. This will happen when, by reason of a subtraction operation, the machine has passed zero, the actuation of lever 320 being caused by a link 321 connected through a pin 322 to the lever. (See also Fig. 15.) The connection of the other end of this link will be referred to later. (See "Actuation of negative interlocks".) Lever 320 is secured to shaft 316, which has secured to its opposite end a locking lever 323, provided with a flat end 324, adapted normally to occupy a position out of the line of movement of pin 266, but to get into this line of movement when the mechanism is actuated by link 321, thereby locking the total and sub-total controls so that the same may not be pulled. The movement of parts 317 and 320 is in part controlled by springs 325 and 326 respectively, the latter being connected to a finger 327 on a rocker arm 200ª at the left side of the machine, corresponding to 200 on the right side. This rocker arm is pivoted on a pin 328 mounted on the left frame member (Figs. 14, 15, and 18). It should be noted that when the ASC lever is pulled to subtraction position, pin 188 (Figs. 5, 6, and 62) is placed in a position above but out of line of shoulder 189 on locking lever 190, so that when this lever is actuated by the minus total control MT, the shoulder will come below pin 188 as shown in Fig. 63, thereby preventing the actuation of the ASC lever to addition position.

Transfer mechanism.

By referring to Fig. 5, it will be seen that the parts are in position for addition, and, as heretofore stated, when the ASC lever is pulled into subtraction position, the dial wheel mechanism having rod 162 mounted in arms 161 is pulled downwardly carrying with it the dial wheels 163. which engage the sectors 355 for the subtraction of any number set up on the keyboard, as heretofore pointed out. Assuming that when the parts are in this subtracting position, a greater amount is set up on the keyboard than has been accumulated in the dial wheels, and that a subtracting operation is performed, it will be seen that the number subtracted will be taken from the accumulated total, and that the dial wheel next to the left of the last one actuated because of the amount set up on the keyboard will be turned from zero to 9, and all dial wheels to the left of that one will also be turned to 9. The turning of these dial wheels to 9 is caused by the transfer mechanism to be now described. This transfer mechanism is denoted as a whole by reference numeral 329, and has a main supporting plate 330 (see Figs. 50, 56 and 57) upon which and by means of which the main part of the transfer mechanism is supported. The normal position of the parts of the transfer mechanism is shown in perspective in Figs. 56 and 57. It will be seen from these figures that the supporting plate 330 has secured to one side thereof a plate 331 and that between these plates are mounted several levers. Of these levers, 332 is pivoted at 333 and carries at one end a roller bearing 334, which, during the operation of the machine, is engaged by a tripping lug 335, carried by the dial wheel 336 of the dial wheel mechanism 163. When the lug 335 strikes the roller bearing 334, lever 332 is rocked about its pivot, whereby locking lug 337 is raised out of the path of projection 338 on a lever 339 pivoted at 340. Lever 332 is provided with a perforated projection 341 for the attachment of a spring. the purpose of which is to hold the end of the lever carrying roller bearing 334 normally in an elevated position and the lug 337 in a lowered position to enable it to engage and hold in locked position the projection 338 on the lever 339. Lever 332 is also provided with a projection 342, the operation of which will be later described. Also carried by this lever 332 is a projection 343, which serves in connection with a spacing pin 344 to limit the pivotal motion of the lever about its pivotal point. Lever 339 has a projection 345 adapted to be engaged by bar 220 of the lantern heretofore described. so that the lever may be rocked into position for projection 338 to engage 337. Lever 339 carries near its opposite end a roller bearing 346, which is engaged by a finger 347 of bell crank lever 348, pivoted at 349 (Fig. 50), the other arm 350 of this bell crank lever having in one edge thereof a notch 351, and at its extremity a perforated projection for the attachment of a spring 352, which has its other end secured at 353 to the sector arm 59. Roller bearing 346ª of the left hand transfer mechanism corresponds to 346 of the other transfer mechanisms, but has a different function. The spring 352 will normally hold finger 347 of the bell crank lever in engagement with the roller bearing 346, so that when this roller bearing is permitted to move toward shaft 176, notch 351 will be moved away from pin 354, permitting relative motion between racks 355 and 356. During subtraction, the downward motion of the sector arm 59 is limited by stop wire 45, stop wires 23ª, or feather 357 on shaft 172, and the motion of sector 355 is thereby limited unless a transfer is to take place, in which event, (pin 354 and notch 351 being out of engagement) relative motion between sectors 355 and 356 is permitted, so that a transfer is made, owing to the action of the friction drive mechanism in connection with shaft 176. During addition, the upward motion of sector arm 59 and its connected sector 356 is limited by the engagement of lug 358 with shaft 80. If a transfer is to take place, lug 354 and notch 351 will be out of engagement and the friction drive will carry sector 355 one notch farther than sector 356, thereby completing the addition. At the end of this motion of sector 355, the dial wheel 336 is thrown out of engagement with the sector which is thereupon returned to normal position so that lug 354 engages notch 351.

*Type-bar holder.*

Sector arm 59 has at the opposite end from that carrying sector 356 a widened head 359 (see Figs. 5, 6, 10, 50, 50ª and 87) constructed to carry the type carrier 360, which is similar in construction to the type carrier 175 heretofore referred to. Rocker arms 60 and arm 174 (Fig. 24) also have at their rearward ends a similar construction for supporting type bar carriers of the same form. These heads are provided with keyhole slots 361, adapted to engage rivets 362 secured to the type carriers which has mounted approximately centrally thereof a pin 363, which is engaged by a spring finger 364 carried by the sector arm, whereby the parts are held locked in assembled position. The type carrier is made from a punched sheet of metal bent over along parallel arcuate lines, the perforations in the metal occurring opposite each other in pairs and providing slideways for the type bars 365, which are actuated to retracted position by springs 366 and to extended position by the hammers 367 of the hammer section, the operation of which will be later explained (see "Hammer section"). As will be seen in Fig. 50, the type bars are provided with lugs on one face to limit the inward motion thereof under the tension of springs 366, which are secured at one end to the type carrier and at their opposite end to lugs on the type bars.

*Friction drive mechanism.*

By referring to Fig. 24, it will be seen that the sector arms 59 and rocker arms 60 and indicator arm 174 are at their rearward ends offset to bring them into as narrow a compass as is consistent with efficient construction. By referring to Figs. 5, 6, and 11 it will be seen that these various arms are provided with non-circular, preferably with kidney-shaped, friction drive elements 368 arranged substantially symmetrically about the driving shaft 176. Connected to this shaft 176 by a feather 369 are various spools 370 and flanged sleeves 371. The friction members 368 referred to above are mounted in apertures in the sectors 355 and sector arms 59, and engage the flanges of members 370 and 371. These members are therefore normally driven with shaft 176 but when they strike an obstruction, they may remain in position as stopped. In the event that there is not sufficient friction between these parts, owing to wear or other cause, they may be tightened up by the mechanism shown in Fig. 11. It will be seen that shaft 176 is provided with a groove 372 into which fits a washer 373, open at one side so that it may be slid into the groove to prevent a flanged sleeve 374 from moving outwardly on the shaft. This sleeve is externally threaded and is engaged by an internally threaded sleeve which is provided around its periphery with means whereby it may be raised on the inner sleeve and caused thereby to advance along the shaft so as to move grooved sleeve 376 longitudinally against the tension of spring 377, the inner end of which rests against a flanged sleeve 378. Increasing the tension on this spring therefore increases the pressure in the friction drive mechanism so that there shall not be undue looseness. Washer 373 is put into position by forcing sleeve 374 on the shaft 176 until the washer can be slid transversely along the end of the sleeve into groove 372.

*Transfer mechanism continued.*

Pivoted at 379 on plate 330 is a lever 380, provided at its forward end with a notch 381, having on one side thereof a cam face 382 (Figs. 50, 56). The arm of this lever which forms the opposite side of notch 381 is provided with a cam face 383, adapted to be engaged by roller bearing 384 mounted on the rocker arm 59, when the latter moves upwardly during the operation of the machine. This lifts lever 380 so that bar 385 carrying a lug, to which is attached spring 386, may more readily be pushed backward by the oscillation of stop member 387, oscillating about shaft 388 (Fig. 50). Member 387 has a stop lug 389 adapted to engage stop 390, carried by the overdraft or net credit dial wheel 391. Member 387 also has a finger 392, which engages a lug 385ª on bar 385 so as to push the same rearwardly when member 387 is oscillated.

Lever 380 is provided at its rearward end with a pair of lugs, one of which is turned over to furnish attachment for a spring 393, the purpose of which is to bias member 380 at its rearward end. This lever is also provided at its rearward end with a lug 394, which engages projection 342 on lever 332 to cause the release of the transfer locking mechanism.

Mounted in plate 330 and in oscillating member 397 respectively are pins 395 and 396, straddled by the forks at the opposite ends of bar 385. This construction permits of bar 385 being reciprocated longitudinally, as heretofore explained. The rear end of bar 385 is provided on its under edge with a recess 398, which normally rests above pin 399, carried by lever 339 on the adjacent transfer section. Normally the parts are in the position shown in Fig. 56, but when taking a minus total or sub-minus total, the parts are in the position shown in Fig. 50, in which the rear end of bar 385 is held upwardly by contact with pin 399. In this position of the parts, the rear end of lever 385 holds member 397 in the elevated position so as to prevent lug 337 from engaging finger 338 to lock the transfer mechanism. Plate 397 is pivoted at 400 and is limited in its oscillating motion by a pin 401, mounted on plate 330. This pin 401 also serves as a stop for member 380. It will be obvious from the drawing that plate 397 is provided with a cam face 402, which abuts lug 342 on the pivoted member 332. By reference to Figs. 50, 56, and 57, it will be seen that member 339 is provided at its forward end with an upwardly and forwardly extending projection 403, which is provided at its extreme end with a laterally offset finger 404, the purpose of which will be later explained in connection with the splitting mechanism.

By referring to Figs. 50 and 56, it will be seen that plate 330 is provided at its opposite ends with hooks adapted to engage shafts 80 and 81 respectively, and that it is provided with a perforation 405 adapted to receive wire or rod 84, which extends transversely through the machine to lock the parts to the frame. Also this wire 84 passes through perforations in the rear end of the key banks to hold them in place as heretofore set forth. At the opposite ends of shaft 81 are rotatably mounted plates 407 supporting the opposite ends of a wire 408, which may be brought down to the rear of plates 330 to assist in holding the same in position Figs. 3, 5, 6, 10, 13, 21, 50.

Actuation of negative interlocks.

In Fig. 15 the parts are shown in normal position, either with nothing in the dial wheels or with a positive quantity accumulated therein. When this condition exists, neither the minus total lever MT nor the sub-minus total control SMT can be pulled, and the major portion of the construction shown in this figure does not enter into the normal operation of the machine. If now we assume that substraction operations are performed until zero is passed, it is understood that the accumulator dial wheel at the left side of the machine is caused to rotate one notch to show the figure 9. In this position, figure 409, carried by lever 410, pivoted at 411, drops down off cam 412, which rotates with the accumulating dial wheel 413. When this happens, pin 414 carried by lever 410 falls below shoulder 415 of lever 416, owing to the fact that this lever is actuated forwardly by mechanism to be described (see "Minus totaling mechanism, continued"). At the lower end of lever 410 is a finger 417, which engages pin 418 on lever 419, rigidly connected to a sleeve mounted upon stud 420. This sleeve also has rigidly connected to it an arm 421, one end of which has secured thereto a spring 422 to actuate the same rearwardly when finger 417 moves rearwardly. Also secured to this sleeve and extending forwardly therefrom is an arcuate arm 423 having in its forward end a pin 424, which serves as a pivot point for link 425. This link has extending therethrough a pin 425, which pivotally connects it to a pivotally mounted arm (see Figs. 15, 16, and 21). It will thus be seen that when arm 419 is rocked backwardly, link 425 will be pulled upwardly and will carry with it lever 427 pivoted at one end at 428 and having at its opposite end a hook 429, which engages pin 430, mounted on frame plate 431, pivoted on the shaft 193. The position of this plate, when the hook 429 engages pin 430, is shown in dotted lines in Fig. 22. A spring 432 coiled about pivot pin 428 has one end engaging pivot pin 426, and its opposite end engaging a hook 433 on one fork of a link 434. This spring therefore tends to hold link 434 in a lowered position with relation to link 425, but permits relative reciprocating motion between these links. As lever 427 is raised by link 425, hook 429 comes into the path of pin 430, as stated above, so that when frame plate 431, carrying this pin, is rotated clockwise about shaft 193, lever 427 is pulled rearwardly and pulls with it link 321, heretofore referred to, whereby locking member 320 is pulled out of the path of pin 319. Pin 428 is pivotally connected with relation to shaft 205 by means of an oscillating arm 435, which holds pin 428 and shaft 205 at a fixed distance apart and permits the former to oscillate about the latter.

Minus totaling mechanism (continued).

A link 437 has intermediate its ends a projection which is connected by means of pin 436 to link 434 (Fig. 15). At its forward end, link 437 is pivotally connected by means of a pin 438 to an oscillating member 439, while at its rearward end it is provided with a slot open at one side so as to have hook members 440, which are adapted to engage a pin 441, comparable to pin 430 and carried by frame plate 431. It will therefore be seen that when frame plate 431 rocks to the dotted line position shown in Fig. 22, pin 441 will be in position to be engaged by one of the hook members 440, as the rearward end of link 437 is moved upwardly by links 425 and 434. It will thus be seen that when frame plate 431 is oscillated in the opposite direction, pin 441 will push link 437 forwardly, causing member 439 to put a tension on a spring 442, coiled about pin 443 and having its opposite ends engaging hook members formed on member 445 and member 446, corresponding thereto. Member 439 is provided at its upper end with a finger 444 bent over to form a sort of flange, which extends between members 445 and 446 to transmit motion thereto from link 437. The upper ends of members 445 and 446 engage a pin 447 mounted in a plate 448, pivoted at 443. It will thus be seen that when pin 447 is held stationary, lug 444 actuates plate 446 forwardly, and tension is put on spring 442 which will cause pin 447 to be moved rapidly forwardly if the member carrying it should be released.

As heretofore pointed out, when a subtracting operation carries the accumulated total past zero, arm 416 moves forwardly (Fig. 21) and substantially simultaneously therewith, pin 414 moves downwardly. When lug 335 of the accumulator dial wheel strikes roller bearing 334 of the left hand transfer section (Fig. 50) roller bearing 346ª, corresponding to roller bearing 346, is permitted to move downwardly toward shaft 176. This roller bearing has resting up against it an arm 449ª (Fig. 21), pivoted to pin 449. This member 449ª has projecting therefrom a short arm carrying a pin 450, which engages a finger 451 secured to a shaft 452. Secured to the right hand end of this shaft is a member provided with a hook 453, adapted to engage a pin 454, carried by a plate 455. Held in spaced relation to this plate by means of rivets is another plate of the same form, and between these plates and pivotally secured thereto at 456 is a hammer 457, having at its upper end a head adapted to strike a special indicating type which prints the sign used to indicate that the amount opposite which the sign is printed has carried the accumulated total below zero. This special type is carried by a type-bar carrier or magazine mounted on an auxiliary arm which has an end bent over and secured to arm 174 as shown in Fig. 24.

Upon member 448 is mounted a roller bearing 458 normally resting against the cam face 459 on the forward end of arm 460 integral with arm 416, pivoted at 420 (see Figs. 15, 21, and 55). It will therefore be seen that when roller bearing 346ª drops to the dotted position shown in Fig. 21, arm 449ª will also move to the dotted line position and carry roller bearing 458 rearwardly to throw arm 416 out of the path of pin 414 thus permitting arm 410 to descend, thereby actuating the mechanism whereby the overdraft dial wheels are permitted to engage their racks. Secured to arm 449ª at 461 is a spring 462, which keeps the arm tensioned against roller bearing 346ª. Secured to plate 448 is a sleeve 463 to give lateral support to this plate to prevent same from undue play. Also secured to this sleeve 463 is an arm 464, having at one of its extremities a roller bearing 465, which engages link 437 when arm 464 is raised by the backward oscillation of plate 448. This insures that hook members 440 will be raised to and held in position to engage pin 441, and will be retained in engagement with this pin until the transfer mechanism has been re-set.

Assuming now that minus total control MTC is pulled from the position shown in Fig. 15 to that shown in Figs. 21 and 22, we see that link 466, which is pivoted to the control lever at 467, is pulled forwardly, and as it moves it carries with it its rearward pivot pin 468 out of the path of locking lug 469, which drops into position back of the pin 468 to thereby prevent the control lever from being restored to normal position until the operation of finding the minus total is completed. The form and operation of this locking lug will be seen by reference to Figs. 58 and 59, in which it is seen that the locking lug is connected to a plate 470 pivoted to pin 471. This plate is rocked forwardly by means of a spring 472, secured at its respective ends to pin 473 and hook 474, which latter is pivoted on shaft 475. Extending forwardly from the pivotal point of hook 474 is an arm 476 having on one edge thereof a cam face 477, adapted to be engaged by pin 468, heretofore referred to. It will be seen that when the pin moves forwardly, it will ride over cam 477, raising arm 476 and taking hook 474 out of engagement with the flanges 478 and 479, projecting laterally from plate 470.

Referring again to Fig. 15, it will be seen that the minus total control lever has extending from one side thereof a projection upon which is mounted a roller bearing 480 (shown also in Fig. 21). This roller bearing rests against a cam face 481 on member 448. When the minus total control is rocked about its pivot 482, the roller bearing rides over cam face 481 and permits lever 448 to be oscillated about its pivot 443 under the influence of spring 442. When this member moves forwardly, it carries with it pivot 447 and link 483, secured thereto. The rearward end of this link is pivotally connected at 484 to a lever 485, pivoted at 485ª and having upwardly and rearwardly extending arms 486 and 487, respectively. The upper arm 486 has an elongated, slightly S-shaped slot 488, in which rides a roller bearing 489 carried on the rearward end of a rocking arm 490, rigidly attached to shaft 295 to rock same, whereby arms 491, also rigidly attached to 295 at one end and having mounted therein at their opposite ends a shaft 492, carrying overdraft or net credit dial wheels 391, are caused to place the latter in mesh with or remove same from sectors 356. It will therefore be seen that pulling the minus total lever forwardly results in link 483 being pulled forwardly and roller bearing 489 being moved downwardly. This causes dial wheels 391 carried by shaft 492 to be moved down into mesh with sector 356 before the machine is turned over to determine the overdraft or net credit. On this side of the machine is a link 156ª, corresponding to link 156 on the right side of the machine and having shoulders against which arm 487 may strike and be cushioned in its movement up and down. The construction will be more evident by referring to Figs. 21 and 55, in which the link 156ª is shown provided with slots at its upper and lower ends, which may slide on pins 411 and 493 as arm 487 strikes the upper or lower shoulder. It will be seen in Fig. 55 that a thin leaf spring overlies the body member of this link and furnishes friction to retard the sliding of this member under the influence of arm 487.

The pulling forward of the minus total control MT also pulls forward a link 494 (see Figs. 15, 21, and 22), provided at its forward end with a pair of lugs 495 and 496, by reason of the engagement of these lugs with pin 467. Just slightly before the lever MT reaches the limit of its motion, roller bearing 480, carried by a projection on this lever, engages link 494 and moves the same upwardly about its pivot 497 to cause disengagement of the lug 496 from pin 467, so that the link may be returned to its rearward position during the operation of the machine without shifting the control MT rearwardly. The pivot pin 497 is mounted in a bell crank lever 498, pivoted on a pin 499, mounted in the frame member 5. The other arm of this bell crank lever extends rearwardly and has at its extremity a cam face 500, and between this cam face and the pivot pin 499 a pair of pins 501 and 502, to which are secured the upper ends of a hook link 503 and a link 504 respectively. As pivot pin 497 is pulled forwardly, cam face 500 moves upwardly and is engaged by roller bearing 505 carried on the lower arm 506 of a bell crank lever rigidly connected to shaft 388 and having secured at its rearward end a spring to cause the actuation thereof. It will thus be seen that shaft 388 will be oscillated by reason of the co-action of the cam and roller bearing and that by reason of this, stop members 389 and fingers 392 are oscillated about their pivotal points, as heretofore explained. (See Figs. 10 and 22.)

It will be seen from the above that as the minus total control is pulled forwardly, link 504 is raised, carrying with it the pivot pin 507 at its lower end, which is connected to a rocker arm 508, rigidly connected to shaft 172, and causes the rocking thereof. This carries feather 357 out of the path of projection 358 on sector arm 59, so that the same may move down an additional distance equivalent to one notch of the sector. This is necessary in finding the overdraft or net credit in order to clear the overdraft or net credit dial wheels at the left of those in which appears the complement of the number in the dial wheels. It is also necessary in order to prevent getting in the overdraft or net credit dial wheels to the left of the first wheel a number in which the digits are one unit too large.

Rigidly connected to the right hand end of shaft 172 is a rocker arm 509 (Figs. 3, 5, 6) having at its lower rearward end a roller bearing 510, adapted to engage a cam face on an arm 511, rigidly connected at its lower end to a shaft 512, which carries an arm 513 provided at its end with a pin 514, which engages pawl 206 to move lug 207 from pins 208. The purpose of this is to prevent the actuation of the hammer section during the first turn over of the machine after the pulling of the minus total lever. Pivotally connected to the opposite end of this rocker arm 509 is one end of a link 515, the opposite end of which is pivotally connected at 516 to a lever 517 carrying stop member 518 and a cam 519. This latter engages roller bearing 298 and actuates the same, together with its supporting arm 299 and the stop members 306 (see Figs. 3, 22, 23, and 50). It will be seen that when the stop members 306 are raised to the position shown in Fig. 22, the stop members 307 on the dial wheels will be stopped when they strike against the end faces of stop members 306, whereby the dial wheels will be set at zero. The stop member 518, as will be seen from Figs. 3, 6, 23 and 37, is carried rearwardly to a position below the bent over end 304 of finger or arm 303 and prevents oscillation of the bell crank lever, of which this forms one arm. This therefore prevents arm 301 of this lever from getting in the path of pin 302, mounted in plate 217, which oscillates about shaft 218, thereby permitting the lantern to oscillate about its pivot. Shaft 300, carrying arm 299, has secured thereto a pin 520, to which one end of a spring 521 is attached. The other end of this spring is attached to link 159 and therefore tensions both arm 299 and link 159 forwardly. It is of course understood that the tendency of this tension is to hold stop members 306 out of the path of stops 307 and to hold dial wheels 163 out of engagement with sectors 355.

By referring to Figs. 15, 16, 21, and 22 it will be seen that hook link 503 is pulled forwardly when member 498 is rocked about its pivot 499. At the same time that this hook member is being pulled forwardly, lever 522 (Fig. 22) is oscillated about its pivot 449, by reason of the fact that pin 468, passing through link 466, is connected to lever 522. The forward end of this lever passes downwardly forcing hook 523 out of the way of pin 430, by reason of a connecting and spacing member 524, between member 522 and the plate 525, corresponding in contour to the forward end of lever 522, striking against a cam face 526 on member 503. After member 524 passes cam face 526, the hook is permitted to again move backwardly under the influence of spring 527 (Fig. 21).

The rearward end of lever 522 is formed with a cam face 528. Rigid with shaft 529 is a crank arm 530, having at one end thereof a stop member 531 to limit the pivotal motion thereof by reason of contact of the stop member with shaft 82, while at the opposite end is a roller bearing 532 (Fig. 21), which is forced upwardly by the top of lever 522, when the same is actuated about stub shaft 449. As will be seen in Fig. 21, this roller bearing at such time rides part way down cam face 528. The raising of lever 530 causes the shifting of the ribbon so that the amount of the net credit or overdraft will be printed in a distinctive color. The mechanism for accomplishing this will be described later.

Carried by plate 522 on its upper edge is a cam member 533 (Figs. 21, 22, 55, 58) adapted in the normal position of the machine to occupy a position below pin 534, carried by rocking arm 535, secured to shaft 475. Also secured to this shaft is a locking member 536, at the right hand side of the machine, having at its upper end a shoulder 537 adapted to support a pin 538 on plate 155. The purpose of this locking of member 155 is to prevent said member from lowering and thereby causing dial wheels 163 to engage sectors 355. This operation takes place at the end of the first half of the first cycle of finding the overdraft or net credit. With pin 538 resting on the shoulder 537 and plate 155 locked thereby in raised position, the dial wheels will be held out of mesh with sector 355 until the minus total control is pushed back so that cam 533 rides under and raises pin 534 to its elevated position, thereby throwing shoulder 537 out from under pin 538, permitting same to drop to the solid line position, Fig. 22.

By referring to Fig. 22, it will be seen that minus total control MT is provided on its forward side with a projection which carries a pin 539 and is provided with an S-shaped slot 540. When the minus total control is pulled forwardly, this pin pushes downwardly on the inner end of the slot in link 541, and forces member 542, pivoted to link 541 at 543, to oscillate shaft 280, as explained in connection with the parts on the right side of the machine, whereby to prevent the setting up of anything on the keyboard. Member 542 is normally held in raised position by spring 544, one end of which is secured to a pin 545, which serves as a stop to limit the motion of the minus total control.

Riding in the slot 540 is a roller bearing 546, carried by a lever 547, loosely mounted on the shaft 269. The opposite end of this lever engages a pin 548, secured to an arm 549 supporting one end of rod 57 resting between the fork members 56 on the end of link 55, the purpose of this being explained in connection with the key board mechanism. It will be seen from Figs. 13 and 22 that when the minus total control MT or the sub-minus total control to be hereinafter referred to is pulled forwardly, shaft 57, in being moved upwardly, forces member 283 rearwardly, whereby projection 286 is taken out of the path of pin 287, thereby permitting the sector of the accumulating wheel to move downwardly. Reference is again made to the fact that the operations of totalling and sub-totalling actuate this mechanism to release the sector of the accumulating dial wheel. It will be seen from Figs. 15 and 22 that cam 550 on the lower edge of the minus total control actuates a roller bearing 551 mounted on the rear end of a lever 552, pivoted at 553 to cause the actuation of interlock mechanism heretofore referred to, one edge of the lever striking against roller bearing 554, carried by bell crank lever 237.

*Subminus total control mechanism.*

The sub-minus total control mechanism will be described with particular reference to Figs. 15, 19, 21, 35, and 36. It will be seen that when the sub-minus total control SMT is pulled forwardly to actuate this mechanism, it will be turned about its pivot 555 and will actuate links 556 and 557 and bell crank levers 558 and 559, being limited in its oscillating motion by stop 560. When link 556, having a slot 561, is actuated forwardly it will pull with it pin 467, carried by the minus total control, and will actuate this and the mechanism connected therewith as described above. When this sub-minus total control is actuated rearwardly the slot 561 will slide on the pin 467 without actuating the minus total control, as will be later referred to.

When link 557 is pulled forwardly, the slot 562 in the rear end of this link will slide over pins 563 and 564 mounted respectively on stop pawl 565 and the left frame member 5. Pin 564 serves as a guide for this link, and when the rearward end of the slot passes over this pin, the link will be forced downwardly carrying with it pawl 565. As this pawl is moved downwardly, its lower end is carried into the path of pin 447 to prevent rearward movement thereof, whereby actuation of lever 485 is prevented, thus preventing the overdraft or net credit dial wheels from being thrown out of engagement with sectors 356. This pawl 565 remains in this position until the lever SMT is restored, when it will be again thrown out of its locking position. On the right side of the machine is also a stop pawl 565ª, corresponding in shape to the pawl 565 but not being provided with a pin comparable with 563. These pawls are fixedly secured to a shaft 566 so that the rocking of shaft 566 by pawl 565 also rocks 565ª. This pawl when rocked downwardly, serves as a stop member for pin 145, whereby this pin and its connected link 144 are prevented from rearward motion. This prevents shifting the dial wheel mechanism 163 and consequently holds these dial wheels in engagement with sectors 355.

At the lower end of lever SMC is a cam 568, which rides over roller 569, forcing the rearward end of the horizontal arm of bell crank lever 559 downwardly so that the stop member 571 rides under the cam. When the limit of motion of the control lever has been reached, roller bearing 569 will enter notch 570, but the end of stop member 571 will strike the edge of this cam, thereby preventing this bell crank lever from assuming normal position. Levers 558 and 559 are pivoted on stub shaft 572, mounted in the left side of the frame. The lower end of bell crank 559 is pivotally connected to a link 573, normally actuated rearwardly by spring 574. At its rearward end, this link is provided with a slot which straddles shaft 205 and serves as a guide for this end of the link, which is provided with a pin 575, co-acting with a finger 576, secured to a shaft 577. At its opposite end, on the right side of the machine, this shaft has secured to it a stop member 578, which in normal position holds pin 579 downwardly, causing pawl 580 to be rocked about its pivot shaft 581 and to thereby be held disengaged from stop member 582, carried by disk 584, mounted on main driving shaft 585. Stop member 578 is biased rearwardly by a spring so that when link 573 is moved forwardly, the spring will cause the stop member to move rearwardly. Pawl 580 when released by the oscillation of stop member 578, rocks about its pivot 581 under the tension of a spring 583, as shown. Keyed to the main driving shaft 585 is a ratchet disk 586, which may be clutched to disk 584 upon the release of the spring held pawl 587 mounted on the disk 584. This pawl is rocked about its pivot 588 by engagement with the hook on the end of pawl 580 so as to unclutch the main driving shaft from the disk before the latter is stopped by the engagement of stop member 582 with pawl 580. As seen in Fig. 4, the normal position of stop member 582 when the machine is not in operation is in engagement with the lower end of the stop member 589. The function of pawl 580 is to stop the rotation of disk 584 and its connected mechanism at the end of a half cycle so that the numbers on the overdraft dial wheels may be read.

Pivotally connected to link 573 at 590 is a link 591 (see Figs. 15 and 35), having in one end a slot adapted to slide over a pin 592, carried by hook carrying member 503. This slot permits the movement of the hook carrying member, under the influence of member 522 out of position to engage pin 430 as previously pointed out. When link 573 is moved forwardly it carries with it link 591 which pulls on pin 592 and takes hook 523 out of the path of pin 430, whereby to prevent actuation of member 503 by the oscillation of this pin about pivot shaft 193.

*Unlocking minus total control.*

As shaft 193 is oscillated during the operation of the machine, member 431, carrying a pin 593, is caused to oscillate, thereby reciprocating pawl 594, which is carried by pin 593 (see Figs. 15, 22, 58 and 59). This pawl has, near its upper end, a projection 595 adapted to engage pins 596 and 597 mounted in member 470. At the first upward movement, this projection 595 engages under the upper pin 597, forcing the same upwardly until hook 474 engages upper lug 478. At this time, projection 598 on the lower end of pawl 594 strikes a projecting part of member 431 (Fig. 59) causing the upper end of the pawl to be thrown forwardly so that lug 595 disengages pin 597. As the pawl is returned by the oscillation of shaft 193, lug 595 rides over pin 596 and gets below same, so that upon the next reciprocation of pawl 594, member 470 is again moved upwardly until hook 474 gets below projection 479 when projection 598 causes the disengagement of 595 from 596. At this time locking member 469 is above pin 468 so that link 466 may be returned to its rearward position. A spring 599, attached at one end to pin 473, is attached at its opposite end by means of a pin 600 to pawl 594, whereby this pawl is normally biased so as to engage pins 596 and 597.

*Hammer section.*

In the description of the hammer section mechanism, reference will be made in particular to Figs. 5, 6, 9, 10, 12, 37, 38, 51 and 53, the latter being a section along the plane indicated by the line 53—53, Fig. 10. This section has a pair of supporting plates 601 and 602, provided with notches adapted to engage shafts 82 and 83. These plates are also perforated for the reception of a rod 603, which passes through means on the shaft 83, outside of plates 601 and 602 so that these plates are locked to shaft 83.

As heretofore stated, pawl 206 is provided with a lug 207 which engages pins 208. These pins are mounted on a plate 604, carried on a rotatable winged shaft 605. As pawl 206 is reciprocated it causes the rotation of this plate and the shaft 605. Inside of the hammer section, this shaft is provided with a plurality of wings 605$^a$, the function of which is set forth in the next paragraph. Passing through the hammer section is a rod 606, upon which the hammers 367 are mounted for oscillation. At its right end, this rod has secured a locking pawl 607 having a projection adapted to engage the pins 208 to prevent this mechanism from being rotated backwardly. This pawl engages the pins after the device has been carried forward its full distance and before pawl 206 starts on its return. Extending through the hammer section is a shaft 608, upon the right end of which is secured a lever 609, having a detent 610 adapted to engage pins 208 as the shaft 605 is rotated. This lever has mounted in its opposite end one end of a rod 611, extending through the hammer section and being mounted at its opposite end in a plate 612, also secured to shaft 608. As this shaft is rotated, rod 611 is forced downwardly against the lever 613 secured at one end to a rod 614 mounted in the hammer section supporting plates. These levers have each a shoulder 615 adapted to engage a shoulder 616 on each hammer element 367 in order to prevent the hammer from being actuated. It will therefore be seen that when rod 611 is depressed, shoulder 615 will be taken out of the path of 616, thereby permitting the hammer to be actuated if otherwise free to move. Lever 613 has secured to its rearward end a spring which normally biases it upward, and projecting from its upper edge near the rearward end is a stop member 617, which is engaged by one end 618ᵃ of a lever 618, pivoted at 619. This lever is biased about its pivot by the same spring used for the actuation of lever 613. It will therefore be seen that when rod 611 is forced downwardly, the end 618ᵃ of lever 618 will move forwardly to take a position above the stop member 617 and prevent lever 613 from rising again, provided that lever 618 has been released for movement about its pivot 619. This release takes place when members 359 are moved upwardly with the downward motion of sectors 356 and rocker arms 60 and 174. End 618ᵃ of lever 618 is normally held in a rearward position by members 620 on the ends of the levers, which will be permitted to rock about their pivots when members 359 are raised.

As shaft 605 is rotated, wings 605ᵃ engage a cam face 621 of hammer element 367 and cause the hammer to be oscillated about its pivot 606 against the tension of spring 622, the upper end of which spring is secured to a plate 623 by means of which the tension of the spring may be adjusted. Pivoted in plates 601 and 602 is a shaft 623ᵃ (Figs. 10, 12, 37, 38) to which are secured crank arms 623ᵇ, the ends of which engage the under side of plate 623 and force the same upwardly or let it ride downwardly as shaft 623ᵃ, is rotated. Secured to one end of this shaft is an arm 623ᶜ, which is pivotally connected to a link 623ᵈ, coacting with the internally threaded collar 623ᵉ, mounted to move on a bolt 623ᶠ, rotatably secured in a frame 623ᵍ. It will be seen that as the bolt is rotated, it causes collar 623ᵉ to move longitudinally thereof and therefore causes link 623ᵈ to reciprocate. This results in fingers 623ᵇ actuating plate 623 as above set forth.

As wing 605ᵃ is moved forwardly past the extremity of cam face 621, spring 622 causes the hammer element to move quickly about its pivot 606 so that the hammer head strikes a sharp blow on the end of the type bar 365. Adjacent cam face 621 is a projecting lug 624, adapted to be engaged by a locking member 625, pulled rearwardly by a link 626, provided with a slot 627. This link is actuated forwardly by means of a bell crank lever 628, pivoted on shaft 529 and rocked about this shaft by a rod 629, rigidly connected with the platen-carrying mechanism. It will therefore be seen that when the platen is elevated, rod 629 will be lifted to permit the actuation of bell crank lever 628 about its pivot under pressure from link 626, tensioned by spring 630. Pivoted in plates 601 and 602 is a shaft 631, to which is rigidly secured locking member 625 and a crank arm 632, the free end of which carries a pin 633 passing through slot 627. Passing through this slot is one end of a spring 634, coiled about shaft 631 and having its other end abutting against pin 633 to normally bias crank arm 632 to its forward position with relation to link 626.

Hammer elements 367, adapted when they are actuated, to strike the type bars are provided at one side with lugs 635, to engage the end of a reciprocable link 636 provided on opposite edges with notches 637 and 638. The lower one of these, 638, has resting in it the stop lug 617 of the bar 613 of the next hammer mechanism to the right, so that when bar 636 is forced downwardly, it carries with it bar 613 belonging to the next adjacent hammer, releasing same to strike the type bar. This functions only to cause the printing of zero to the right of any significant digit printed because of the setting of the machine.

In the ordinary operation of the machine, all of the hammers corresponding to the different accumulating dial wheels may be actuated, but hammer 457, corresponding to the special character type carrier, is by reason of hook 453 and pin 454, actuated only to print the sign indicating that the number opposite which it occurs has caused the accumulated total to pass zero in a subtracting operation (see Fig. 21). It should perhaps be noted in this connection that the depression of a month key does not result in the printing of any other character to the right thereof, and that in order to prevent the printing of a zero in the third column with the special characters in the second column, it is necessary to use the splitting key of the third column.

*Splitting mechanism.*

Below the mechanism just described is a series of reciprocable bars 639, biased backwardly by springs 640, each carrying a forked lug 641 (Figs. 10, 12, 51, 53). The arms of these forks engage the lower end of members 636 to force the shoulder of notch 638 forwardly so that it will disengage stop lug 617. Any one or more of bars 639 may be actuated forwardly by rotation of keys 9 to such a position that the indicating mark 10 extends transversely of the keyboard as shown in the lower part of Fig. 68. Referring now to Figs. 10, 12, 13, 40, 65 and 66, it will be seen that the extremity 68 of correction key 9 is offset at 642 and is then extended at at 643. This portion 643 is engaged by the arms of a yoke 644, which is actuated by the rotation of the correction key, as will be evident. Secured to the flange of a plate 11 of the keyboard is a supporting member 645, which rests upon and serves as an abutment for a collar 646, secured to shaft 68 (Fig. 65). The free end of plate 645 has secured to it one end of a spring, the other end of which engages a plate 647, bent at 648 to provide means to engage a series of notches in the collar 646, whereby key 9 may be firmly held in any selected position. Upon rotation of key 9, plate 647 will be forced to yield downwardly, as will also shaft 235, which is spring tensioned.

As correction key 9 is rotated, yoke 644 is forced rearwardly and causes the rocking of lever 649 about its pivot 650 to cause the reciprocation of bar 651 and link 652 (Fig. 13). The first of these has a pin 653, which slides in a slot in the lever 649 and abuts at its opposite end the turned over end 654 of lever 655 pivoted at 656. The lower end of this engages the turned over end 657 of bar 639 to cause the pulling forward thereof. When link 652 is pulled forwardly, it rocks lever 658 about its pivot 659 to cause the upper end 660 to engage the laterally bent end 661 of bar 662 and force this bar to slide longitudinally on pins 395 and 663. Bar 662 is biased forwardly by a spring 664 and has at its rearward end a lug 665, which is forced into the path of lug 404 on the transfer mechanism, thereby preventing the actuation of this transfer section. This causes the splitting of the dial wheels as the previously described mechanism causes the splitting of the hammer section.

*Ribbon actuating mechanism.*

In connection with the following description reference should be made to Figs. 2, 5, and 37–43.

Carried by section 192 which is secured to the right end of shaft 193 is a projection 209, and secured to this is a projection 209ª. Mounted upon one of the pins by means of which these parts are secured together is a roller bearing 666, which is engaged by the arms of a fork 667, which is caused to oscillate by the oscillating movement of shaft 193 and sector 192. Fork 667 is carried by an arm 668 pivoted at 669 and carrying cams 670 and 671. Pivoted in the side castings of the carriage is a shaft 672 (Figs. 37, 39, 41) which carries at its right end a cross arm 673 provided near its ends with roller bearings 674 and 675, which engage cams 671. It will therefore be seen that as arm 668 is oscillated about its pivot, the roller bearings 674 and 675, engaging cams 671, will be rocked thereby and will cause the rocking of shaft 672, which has secured to it an arm 676 near the left side of the machine. This arm carries a pin 677 which engages in the forked end of a lever 678 pivoted at 679 (Figs. 37, 39). The upper end of this arm is pivotally connected to a link 680. On the right side of the machine there is a pin 677ª, carried at one end of arm 673 and corresponding to pin 677, referred to above. Engaging the pin is a forked lever 678, pivoted at 679ª and connected at its upper end to a link 680.

Carried by the carriage runway is a casting 681, having a pair of rearwardly projecting arms 682 and 683, upon which are mounted pins 684 and 685. These pins have mounted thereon the ribbon spools 686 and 687. Carried by the lower end of each of these spools is a ratchet plate 688, upon which is mounted a pawl 689, pivoted at 690 and actuated in one direction by a spring 691. These pawls are provided with projections 692, adapted to engage the teeth of a gear 693, formed on a sleeve 694. This sleeve has at its opposite end a similarly geared section 695, which meshes with a gear 696 carried on a pivot pin 697. This gear 696 engages the teeth of a rack 698 and causes reciprocation thereof. Rack 698 has secured substantially centrally thereof a link 699, which is connected to another rack 700. The reciprocation of rack 700 causes the rotation of gear 701, pivoted on the frame. Arm 702 is provided with a slot through which the pivot pin of gear 701 passes. This permits arm 702 to oscillate about its pivot 703. Pivoted on the same pivot as gear 701 is a cam member 704, which engages alternately roller bearings 706 and 707, carried by plate 702. Pivoted on the pin which carries gear 701 is a rocker member provided with a pair of stop shoulders 704ª (see Fig. 40) and a crank arm carrying a pin 705, which engages in a perforation in the end of the slotted spring actuated pawl 708. It will therefore be seen that, as gear 701 is rotated it causes pawl 708 to be pushed downwardly and rotated about its pivot member 709 until it has passed its center of oscillation. The pin 730 carried by gear 701 alternately engages the stop shoulders 729 on the rocker member and actuates same about its pivot to cause member 708 to be swung upon its center of oscillation. Pin 705 projects backwardly and rests between a pair of lugs on the opposite side of the rocker member from lugs 729. By this connection, member 708 is enabled to give the rocker arm a snap action, as heretofore described. When this happens, the tension of spring 710 causes pawl 708 to move forwardly with a snap action, whereby cam 704 actuates plate 702 quickly to cause the longitudinal reciprocation of links 711 and 712. This causes the rocking of levers 713 and 714 about their pivot pins 715 and 716, whereby arms 717 and 718 are respectively caused, one to engage and the other to disengage ratchets 688. These arms carry fingers 719 and 720, which engage corresponding fingers 721 and 722 on pawls 723 and 724, pivoted respectively at 725 and 726 on bell cranks 727 which in turn are pivoted on pins 684 and 685, carrying the spools, and actuated by links 680 connected to the bell cranks at 728. It will therefore be seen that as bell crank 727 is actuated about its pivot, either pawl 723 or 724, provided with a bent over or hook portion 729, will engage a ratchet 688 and cause the same to be rotated about its pivot. Since only one of the hooks 729 can engage a ratchet 688 at one time, it is evident that only one of these ratchets can be rotated thereby, and therefore that only one of the spools 686 can be actuated at a time, the ratchets being rigidly connected to a flange of the spools.

Each of the spools is provided with a member 731 projecting into a position where it is adapted to engage an end of pawl 689 so as to release projection 692 from gear 693. This is caused when the ribbon is tensioned about the spool as it is being wound thereon.

Supporting pins 684 and 685 are a pair of plates 732, capable of vertical oscillatory movement, which carry a pair of rollers 733, adapted to hold the ribbon close to the platen. The mechanism just described is that which is concerned in the horizontal motion of the ribbon from one spool to the other, and provides also for the reversal of the direction of the ribbon. The mechanism now to be described is that which provides for the raising and lowering of the ribbon, whereby the entire width thereof may be utilized in the printing operations.

In connection with this description, reference should be had to Figs. 21, 37, and 39. Connected to arm 530 by a pin 734 is a link 735, having a forked end which engages a pin 736 on a ratchet wheel 737 mounted on the carriage runway. In the position shown in Fig. 21, arm 530 is in its upper position and pin 736 cannot cause reciprocation thereof, but when this arm is in its lower or normal position, the rotation of ratchet 737 will cause pin 736 to engage in the closed end of the fork of member 735 and cause the lifting of arm 530. This arm being secured to shaft 529 causes the oscillation of this shaft in its bearings and thereby causes arms 738 to lift plates 732 carrying with them the ribbon spools and associated mechanism. By reason of this, the ribbon is caused to be raised relatively to the platen and type, and therefore the printing takes place at a different position with respect to the width of the ribbon.

Carried by shaft 672 is an arm upon which is mounted a pawl 739. As this shaft is oscillated, the pawl is caused to engage ratchet 737 and move the same forwardly about its pivot to cause the actuation of shaft 529, as stated above. Reverse motion on this ratchet is prevented by means of a spring actuated pawl 740. Pawls 739 and 740 are connected by means of a spring 741 tending to draw them toward each other.

In the printing of an overdraft, the ribbon is raised to its extreme elevated position in order to have the amount printed in a distinctive color. This is accomplished by cam 528 engaging roller 532 on arm 530 and raising the same, as heretofore set forth.

As will be seen in Fig. 37, the spools are held in place by fork-shaped clips 742 engaging the upper end of sleeves 694. These fork-shaped springs 742 may be removed and the ribbon spools readily taken off for replacement of a new ribbon.

*Carriage mechanism.*

(See Figs. 1, 2, 37, 38, 39, 41, 49 and 52.)

In order to feed the paper, mechanism is provided for actuating the platen, and this will now be described, with reference to Figs. 37, 39, 41, 42, and 43. Pivoted in the carriage and supporting frame is a shaft 743, carrying an arm 744 provided with a roller bearing 745, adapted to ride on the cams 670 and oscillated thereby as arm 668 is oscillated, as heretofore set forth. Secured to shaft 743 is an arm 746, one end of which is adapted to engage a shaft 747 (Fig. 37) supported by a pair of arms 748 secured to shaft 749. This shaft carries an arm 752, which has secured thereto a spring actuated pawl 750, the end of which engages a ratchet 751, loosely mounted on shaft 751ª carrying the platen (Fig. 42). A stop and positioning member 753 is provided to hold the platen in position so that the printing will be in proper alinement. The end of arm 752 is provided with a lateral extension 754, whereby the same may be manually actuated. Integral with arm 752 is a stop finger 755, adapted to engage an oscillatory stop member 756 carried by a pin 756ª, whereby to regulate the number of spaces which the platen will be moved forwardly by the actuation of the mechanism just described. On the outer end of this pin 756ª is a pointer 756ᵇ to indicate the number of spaces which the platen will be moved forwardly by the actuation of the above described mechanism. Arm 752 is provided with a perforation 757 for the reception of a pin to which may be attached a spring 758 adapted to pull arm 752 into retracted position (Figs. 41 and 43).

Mounted on the projecting end of shaft 751ª at the right side of the machine is a reciprocatory sleeve 759 (Fig. 42) which serves as a clutch member whereby to clutch the shaft 751ª and the ratchet 751 together. The sleeve 759 is provided in its interior with a space in which is mounted a spring 760 to cause the sleeve to move inwardly whereby its inwardly bevelled flange 761 engages a corresponding bevel on ratchet 751. The sleeve is provided with a flange 762 adapted to be engaged by the fingers of the operator so that it may be pulled outwardly at the time that the platen is being rolled forward or backward. If it is desired to move the paper forwardly or backwardly a part of a space so as to enable printing in proper alinement, it is only necessary to pull outwardly on flange 762 and rotate the handle 763 and then permit sleeve 759 again to engage the bevelled projection on ratchet 751.

The pin 754 passing through shaft 751ª and sleeve 765 causes the latter to rotate with the shaft when handle 763 is turned. Sleeve 765 is provided on one side, as shown at 766, with a slot in which engages a headed pin 767, extending into sleeve 759. This prevents relative rotation of the sleeves 759 and 765, when the handle is turned, and permits the longitudinal sliding of sleeve 759 with respect to sleeve 765.

Secured to a shaft 768 (Figs. 37 and 41) are a pair of plates 769 and 770 (Figs. 39, 41, 42) perforated to receive sleeve 771, surrounding shaft 751ª. It will therefore be seen that when finger piece 772 on plate 769 or plate 770 is pushed backwardly, the platen will be raised so as to render the printing on the paper visible, as shown in Figs. 44 and 45. Also carried by shaft 768 is a finger 773, which is engaged by a roller bearing 774 mounted on a spring actuated finger piece 775. As the platen is raised, finger 773 is moved upwardly about the shaft upon which it is carried and roller bearing 774 rides under this finger and holds the platen in elevated position. If desired finger piece 775 pivoted on shaft 779 may be depressed to release finger 773 and with it the platen so that the latter will return to normal position, shown in Fig. 41.

As will be seen from Figs. 38 and 41, the downward movement of the platen is limited by a screw 776, threaded into casting 777 and held in adjusted position by a set nut 778. By loosening nut 778 screw 776 may be adjusted so as to secure a proper positioning of the platen when in lowered position.

Lever 775 is pivoted upon pin 779 (Figs. 41 and 42) which is surrounded by a coil spring 780, shown in dotted lines in Fig. 42, the purpose of this spring being to furnish tension for lever 775 to cause the same to follow finger 773 in its forward motion. One end of spring 780 engages a tension adjusting means 781, surrounding pin 779 and by reason of this adjusting means the tension of spring 780 may be adjusted to any desired amount, or may be varied if rendered necessary because of the weakening of the spring.

Referring now to Figs. 38, 41, 42, 44, 45, 46 and 47, the connection and operation of controls 769 and 770 will be seen. These members are secured to shaft 768, pivoted in a pair of supporting arms 781, secured to shaft 782. It will be seen that as arms 769 and 770 are rotated about their pivot, they raise the shaft of the platen and thereby cause same to be elevated so that the printing on the paper may be seen and also as an aid in inserting the paper. These plates 769 and 770 are provided on one side with shoulders 783 adapted to engage an abutment whereby to limit the oscillation of the plates in one direction. These plates are also provided with projections 784 carrying a shaft 629 to which is secured a curved plate 785 adapted to serve as a guide in the insertion of paper around the platen. As previously stated, the lifting of shaft 629 releases a lever 628 (Fig. 52) whereby a locking means is permitted to lock the hammer mechanism to prevent the same from being actuated while the platen is in elevated position.

For the insertion of paper, the platen will normally be raised to the position shown in Fig. 46, in which position it will be held by roller bearing 774 on lever 775. The paper will now be fed over a guide plate 786 (see Figs. 37, 41, 49) and below the platen, passing in between the platen and roll 787, carried on a shaft pivoted in levers 788 under spring tension due to springs 789. The paper will now pass between plate 785 and the platen and will come into view about a plate 790 at the point indicated by the arrow in Fig. 44. By now pulling forwardly on lever 791, a roller bearing 792 is caused to press downwardly on a cam 793 upon the support for plate 790, thereby forcing this plate to raise to the position shown in Fig. 46. Continuing the feeding of the paper will cause the same to be fed between the platen and roll 794 mounted upon a shaft pivoted in the end of a pair of supports 795 normally spring tensioned toward the platen by springs 796. This paper can now be allowed to come out above plate 797 (Figs. 41 and 44) or beneath this plate, as shown in Figs. 44 and 47. Connected with this plate is a cutting edge 798 (Figs. 2, 37 and 41) to serve in tearing the paper when the same is fed from a roll and it is desired to separate a part already used. The upper dotted line position shown in Fig. 44 is that ordinarily used when feeding sheets of paper through the machine.

When it is desired to place the paper for filling in or completing a line partly written, the paper may be properly lined up by pulling lever 791 to the position shown in Fig. 44 so that plate 790 is in the position shown in Figs. 44 and 45 with the edge thereof just below the printing line. In this position, pin 799 rests in a notch in the cam face 800 of lever 801. This lever has projecting from one side thereof a finger piece 802, whereby the same may be operated, and has secured to the opposite side thereof a roller bearing 803 adapted to cooperate with a cam member 804 projecting from member 781. As the platen is lowered about its pivot 768, roller bearing 803 engages cam member 804 and rocks lever 801 about its pivot 805 to release pin 799 from the notch in cam face 800, therefore permitting lever 791 to assume its normal position, roller bearing 792 then being out of contact with cam 793. This permits plate 790 under tension of spring 789 to drop until stop member 806 strikes pin 807. Secured to the end of shaft 808 upon which lever 791 rocks is a cam member 809 (see Fig. 41) which engages a finger 810 when lever 791 is pulled forwardly thereby pushing finger 810 backwardly from shaft 808. When this happens roller bearing 753, which normally engages the ratchet 751 and is carried by a projection of plate 811 of which finger 810 forms a part, is raised from the ratchet and permits the platen to be turned over free from the normal retarding influence of the roller bearing and ratchet. The arm upon which roller bearing 753 is mounted is continued beyond this bearing and is provided with an attachment for a spring adapted to bias the roller bearing toward the ratchet.

When lever 791 is rocked backwardly from normal position (see Fig. 47) pin 812 engages a finger 813 projecting downwardly and backwardly from arm 795 and rocks this arm about its pivot 808 to raise roller 794 from the platen, whereby to release the paper. At the same time, a pin 814 on lever 791 engages an end 815 of lever 788 and rocks the same about its pivot 816 to release the roller 787 from the paper on the lower side of the platen.

Pivoted on the outer end of shaft 782 is a lever 817, provided with a sleeve 818 to give the same a firm bearing. (Figs. 41 and 42.) This lever has at one end a pin 819 to which is pivoted a link 820, the opposite end of which is pivoted at 821 to a rocker member 822 secured to shaft 823. Also secured to shaft 823 is a locking member 824 (see Figs. 41, 80 and 81), having a shoulder 825 adapted to be engaged by a bail 826ª, whose ends are turned over to form a pair of levers 826. This bail is adapted to rock member 824 about its pivot (Figs. 1, 32, 37, 38, 41 and 80). Locking member 824 has thereon a projection 827 adapted to engage notches in any one of a plurality of feathers 828, carried by a shaft 829, as best shown in Figs. 37 and 80. The free end of lever 826 carries a rod 830 which rests in a double cam slot 831 in one end of a reciprocable plate 832. This plate is provided with a slot 833, through which passes the bolt 834, which serves to secure the plate to the base of the machine and guide it in its reciprocation. The forward end of this plate is provided with a perforation 835, which receives the end 836 of a lever 837, pivoted at 838 and having its opposite end fork-shaped, as at 839, to engage a pin 840, carried by the carriage clutch control CC. It will therefore be obvious that when this clutch control CC is rocked about its pivot 841, plate 832 will be reciprocated and one or the other end of slot 831 may be caused to engage rod 830, whereby to raise finger 827 of locking member 824 out of a position in which it engages the notches of feathers 828. It should perhaps be noted in this connection that clutch control CC is provided with a plurality of notches in one part of its periphery adapted to be engaged by a pin 842 to hold the clutch control in adjusted position. This pin 842 is carried by a plate 843 biased upwardly by a spring connected to pin 841.

The carriage runway casting 844 has secured to the ends thereof a pair of castings 845 (see Figs. 39 and 42) through which extends the shaft 829. This shaft is provided near one end with a notched stop member 846 adapted to be engaged by a stop pawl 847, which is spring tensioned toward the shaft to hold the same in any adjusted position in which the pawl engages one of the notches in the plate 846. Shaft 829 is provided at one end with a milled head whereby it may be rotated to place any one of feathers 828 in position for the notches thereof to be engaged by projection 827 of locking member 824. As shown in Fig. 39, castings 845 are continued downwardly and support the shaft upon which member 826 is pivoted.

For details of the paper carrier and support, reference may be had to Figs. 1, 2, 37, 38, 41, 48 and 49. Secured to the outer face of each carriage casting by means of screws 850 is a plate 849, forming a supporting means for several parts of the carriage. Secured in plates 849 are pins 851 and 852, adapted to receive notches in the end plates 854 of the roll holder mechanism 853 whereby to support the same. Upon plates 854 are pivoted at 855 hook members 856 adapted to be pressed into engagement with pins 852 by means of springs 857, whereby to lock the roll holder to the carriage. (Figs. 1 and 38.) The paper roll 858 is supported on pins 859, carried by plates 860, which are adjustable longitudinally of shaft 861. The lower end of plates 860 is provided with a notch (Fig. 37) to engage a shaft 862 to permit longitudinal shifting of the plates but to prevent oscillation thereof about shaft 861. Mounted in the upper ends of plates 849 is a shaft 863, which serves as a support for the reading support 864, carrying edge guides 865, secured to plate 864 by means of bolts and wing nuts 866 (Figs. 48 and 49) the bolts sliding in slots 867 in plate 864. Between plate 864 and guides 865 is a layer of soft material such as felt 868, to prevent the scratching of one part by the other.

The end plates supporting plate 864 are provided with notches adapted to engage shafts 782 and 863, the latter of these being engaged by a spring pressed hook 869 pivoted at 870, whereby the paper supporting table 864 is locked to the machine.

Carriage runway 844 is grooved in two opposite edges and the faces 871 of these grooves provide faces against which ride rollers enclosed in cages to serve as supporting and guiding means for the carriage in its reciprocation on the runway. This carriage has a main casting 872 (Fig. 37) to which the other parts of the carriage are secured and by which they are supported on the runway. The bearings each comprise a substantially rectangular cage having in opposite sides perforations for the reception of the ends of a spindle forming the axle of a roller the edge of which projects through opposite openings at right angles to the perforations. Each cage is also provided with other perforations and openings so arranged that another roller may be contained therein with its bearing surface at right angle to the bearing surface of the first mentioned roller, the structure being shown most clearly in Figs. 37 and 41.

*Shifting mechanism for carriage.*

Secured in the member 832 is a pin 873 (Figs. 25 and 37) which projects through a slot 874 in a lever 875 pivoted at 876 and has at its opposite end a cam face 877 divided into two parts by a notch 878. This cam face is adapted to be engaged by roller bearings 879 carried by one end of each of levers 880 and 881, drawn toward each other by a spring 882. It will be seen from the above that when lever 875 is rocked about its pivot, one or the other of roller bearings 879 will drop into notch 878, thereby permitting either lever 880 or 881 to be pulled toward the other whereby the mechanism connected therewith is caused to be actuated. The pins mounted in the ends of levers 880 and 881 (see Fig. 32) engage in grooves between flanges on sleeves 883 and 884. This causes the sleeves to slide longitudinally on shaft 885 and thus causes the engagement of either disk 886 or 887 with a disk 888, secured to shaft 885. Slidably mounted on these sleeves are a pair of gear wheels 889 and 890, which are driven from shaft 891. Hence when one of disks 886 and 887 is caused to engage disk 888 and shaft 891 is driven, shaft 885 will thereby be caused to rotate and carry with it gear 892 in mesh with rack 893 secured to the carriage. By reason of the fact that a gear 894 secured to shaft 891 (Figs. 32 and 37) is in direct engagement with gear 889 and a gear 895 also secured to shaft 891 in indirect engagement with gear 890, through the intermediary of a gear 896, shaft 885 will be caused to rotate in one or the other direction depending upon which of disks 886 or 887 is in engagement with disk 888.

By referring to Figs. 25, 31, 32, 33, and 37, it will be seen that shaft 891 is continued forwardly and is provided upon its forward end with a bevelled gear 897, which meshes with a bevelled gear 898 upon a shaft 899. Secured to left end of this shaft is a gear 900, meshed with the gear 901 loosely mounted on shaft 585, and secured to gear 901 is a plate 903, having a stop member 904, normally engaged by one of the levers 905 and 906 pivoted at 902 and 902ª. Carried between gear 901 and plate 903 is a pawl 907 corresponding to pawl 587 and normally spring pressed into engagement with a ratchet 908 keyed to shaft 585, but which is held out of engagement therewith when either stop member 905 and 906 comes into engagement with the projecting end of this pawl. It will therefore be seen that since shaft 585 is constantly rotating when the motor is running, gear 901 will be driven whenever pawl 907 is released by the disengagement of stop lever 905 or 906 therefrom. This will cause the driving of gear 900, shafts 899 and 891 to gears 889 and 890, and the connected disks 886 and 887. This will drive disk 888, shaft 885, gear 892, and rack 893, as heretofore explained in the event that either disk 886 or 887 is in engagement with 888. It should be noted in this connection that casing 8, inclosing gears 897 and 898, and shaft 899, is normally sufficiently filled with lubricating material to keep all operating parts contained therein in properly lubricated condition. The shafts passing through the walls of casing 8 are properly bushed to prevent an undue amount of grease from passing outwardly through the perforations in the walls of the casing. If it is desired to have the mechanism just described constantly driven, all that is necessary is to connect levers 905 and 906 by a link 909, shown in dotted lines in Fig. 32. This is a detachable link, the ends of which are bent over to be slipped through perforations in the levers so that the same may be attached and detached at will. Levers 905 and 906 are normally biased toward each other by means of a spring 905ª and have their motion in one direction limited by stop pins 905ᵇ and 905ᶜ.

Debit-credit carriage control.

Reference will now be made to Figs. 25, 31, 32, 33 and 34, in which Figs. 25 and 32 show the debit credit control mechanism in normal position. In this position, actuation of the ASC lever does not cause any actuation of the carriage driven mechanism. When it is desired to place the added items at one side of the sheet and the subtracted items at the other side, as in preparing bank statements, for example, the control lever DC is shifted to the right or left of normal position shown in Figs. 2ª and 25. In Fig. 34 the lever is shown in solid lines as shifted to the left and in dotted lines as shifted to the right. When this control is shifted to the left, as shown in Fig. 34, the subtracted items will be placed at the left side of the paper and the added items at the right. Assuming the DC lever set as shown in Fig. 34 and the CC lever pulled forwardly to the end of the slot marked "Right", if the ASC lever is now pulled forwardly to subtracting position, the carriage will be caused to shift to the right, thereby causing the placing of the paper for the printing of subtracted items at the left of the paper. After this has happened and before the items are entered, it is advisable though not necessary to set the CC lever at "Left" so that when the ASC lever is pushed upwardly to adding position, the carriage will be shifted to the left for the entry of added items on the right side of the paper. It will of course be understood that in either of these positions as many items as desired may be entered before the carriage is shifted and also that the carriage will not be shifted to the right with the ASC lever in adding position nor to the left with the ASC lever in subtracting position unless the DC control is shifted to the dotted line position shown in Fig. 34 neither will there be any shifting of the carriage if either the DC or the CC control is in central position. Normally there is no change in the DC control since it is customarily desired to have the subtracted items at the left and the added items at the right.

Extending downwardly from member 125 and below its pivot 126 (see Figs. 25 and 33) is an arm 910, offset laterally as shown at 911 and extending downwardly as shown at 912. At its lower end, this arm is pivoted to a link 913, which is connected at its forward end to a pair of members 914 upon an oscillatory member 915 (Fig. 34) having throughout the greater portion of its length an S-shaped slot 916. Extending through this slot is a headed pivot pin 917 connected to the DC lever and adapted with the shifting of this lever to slide in the slot 916. Secured to plate 915 is a plate 918, carrying the securing means whereby the mechanism being described is secured to the base plate 3 of the machine. It will be seen from the above that when the ASC lever remains in any fixed position, the member 915 cannot be caused to oscillate about its pivot 922 and that therefore when the DC lever is moved to the right or left, its rearwardly extending portion 919 will be moved longitudinally carrying with it link 920, pivotally connected to a pair of bars 921, adapted to oscillate levers 905 and 906 about their pivots, as will be obvious from Fig. 33. When the pin 917 on the DC lever is at either end of slot 916 and the ASC lever is actuated, member 915 will be caused to move about its pivot 922 by the reciprocation of link 913, but if the DC lever is in its central or normal position, as shown in Fig. 2ª no reciprocation of parts 919 and 920 will be caused by the actuation of the ASC lever.

Driving mechanism.

In connection with the description of the driving mechanism, reference should be made to Figs. 1, 4, 29, 30, and 31. By referring to Fig. 4, it will be seen that when the touch bar is pressed downwardly, bars 138 and 138ª rock levers 136 and 139 about their pivots 130 and 140, reciprocating link 137 rearwardly as heretofore explained. Pivotally connecting link 137 and lever 139 is a pin 923, which engages one end 924 of a lever 925, pivoted at 926 whose other end is provided with a lug 927, which, being depressed, engages and forces downwardly arm 928 of lever 929, pivoted at 930. Normally stop member 578 holds pin 579 out of the path of arm 928 and stop 580 out of the path of projection 582. If, however, the sub-minus total control has been pulled, pin 579 is released, as heretofore stated (see "Sub minus total control mechanism") and rises to the position shown in full lines in Fig. 35. Now as arm 928 is moved downwardly it engages pin 579, forcing it downwardly and rocking stop member 580 about its pivot to release disk 584. Depressing arm 928 carries rearwardly the stop member 589, heretofore referred to, thereby releasing disk 584 and its connected pawl 587. As previously stated, this operatively connects shaft 585 and disk 584 so that the latter is driven by the rotation of the former. Carried by disk 584 is a roller bearing 931, which, during the course of its rotation, engages finger 932 of lever 933, pivoted at 934, whose opposite end is pivotally connected at 935 to pawl 241, which, as previously explained, engages pin 243, thereby rocking shaft 117 about its pivot 118 to cause the clearing of the keyboard, as heretofore set forth. As this roller bearing travels further, it engages stop member 936, moving it forwardly until the shoulder of the stop member has been passed, when the roller bearing will engage in a notch in the end of this stop member, thereby preventing backward rotation of the mechanism. Members 933 and 936 are actuated toward each other by means of a spring 938, which tends to hold them in their normal positions. It will be seen from Fig. 4 that stop member 589 is held in normal stopping position by means of a spring 939. Coiled about the pivot 926 is a spring 940 having its ends engaging respectively a pin 941 on member 925 and an end 942 of lever 943, whose opposite end carries a roller bearing 944 pressing upwardly against pawl 241 to hold it in engagement with pin 243. Member 943 is limited in its upward motion by a stop finger 945, which engages base plate 3 of the machine. It should be mentioned in this connection that as disk 584 rotates about its pivot 585, it reciprocates link 191, which is pivotally connected at one end to disk 584 and at its opposite end to arm 209$^a$ of the segment 192, as heretofore set forth.

From Figs. 26 and 30, it will be seen that when finger 924 is forced rearwardly, it carries with it link 946, provided at one end with a hook 947, which engages a pin 948 carried by lever 925. This reciprocation of link 946 rocks member 949 about its pivot 950 and causes lug 951 to engage lever 952, rocking same about its pivot 953 against the tension of spring 954, and causes its end to engage arm 955 of a lever pivoted on pin 950, whereby the same is rocked about this pivot. As will be seen by comparing Figs. 26 and 30, the rocking of this lever causes links 956 and 957 to be raised, thereby actuating levers 958 and 959 about their respective pivots. It will be seen that lever 959 is provided with a pin 960 which engages a slot in the end of link 957 and that its hook 961 is caused to be disengaged from pin 962 when the lever is rocked about its pivot 959$^a$. Releasing this pin, which is connected to the operating bar 963 for the switch by an arm 964, permits the switch to be actuated, as will be explained.

As member 958 is rocked about its pivot, link 965, connected to said member by a pin 966, is reciprocated and carries with it switch operating bar 967 by reason of the connecting member 968, which has a pin and slot connection with link 965. Bars 963 and 967 have turned over ends 969 and 970 (Fig. 29) provided with adjustable means 971 which may be adjusted to engage the end of the push buttons 972 of the switch E. It will of course be understood that when one of these push buttons is forced inwardly, the other one will be forced outwardly, as is customary in such switches.

When link 956 is pulled upwardly, as heretofore explained, it carries with it pin 973 secured to member 958 and causes the rocking thereof about its pivot. This action is also assisted by a helical spring 974, having one end secured to a spool 975 and its opposite end secured to a pin 976, carried by member 958 (see Figs. 27 and 28). Inside of spool 975 is a spacing sleeve 977, and inside of this is another sleeve 978, which is secured to the spool by a pin 979 passing through these three members. Sleeve 978 is secured by means of the pins 980 to a member 981, pivoted on the same shaft 982 as member 958. It will therefore be seen that such a tension may be placed on spring 974 as to cause the projecting ends 983 and 984 of members 958 and 981 to approach each other. It will be seen from the above that when plate 584, carrying roller bearing 931, rotates about its pivot, this roller bearing (see Figs. 26 and 30) will engage end 984 of member 981 and cause the same to be rocked downwardly about its pivot. This will force link 985, pivotally connected at 986 to member 981, to be reciprocated forwardly, thereby carrying pivot 959$^a$ and with it link 959 into such a position that hook 961 may engage pin 962, when lever 959 is permitted to return to normal position. Link 985 is provided in its forward end with a slot 987 to permit the oscillation of pin 962 independently of the link. The purpose of this pin is merely to serve as a guiding means for link 985 in its reciprocation. It will be noted that lever 959 is provided with a projection 988 to which is connected a spring 989, adapted to rock said lever about its pivot 959$^a$, when it is free to do so by reason of the position of link 957.

Member 981 is provided on its forward side with a finger 990, adapted to abut against a stop member 991 to limit the rocking motion of said plate 981 in one direction about its pivot. Also projecting from plate 981 is an arm 992, carrying pivot pin 953 upon which member 952 is pivoted. Also carried by this arm 992 is pivot pin 993, upon which is mounted a pawl 994 adapted to engage the teeth of a ratchet 995. This will prevent forward motion of arm 992 and consequently place 981, under the influence of spring 974 at a greater rate than that at which ratchet 995 is driven by shaft 982 to which it is secured. Pawl 994 is pushed toward ratchet 995 by a spring 996 and rides over the teeth thereof when arm 992 is oscillated backwardly.

Ratchet 995 and shaft 982 are driven in the following manner: When stop member 589 releases pawl 587 and disk 584, the same are carried forward with shaft 585 as heretofore indicated. Carried by worm wheel M$^3$ inside of the casing 8 is a pin 997, which during the rotation of the worm wheel comes into engagement with the lever 998, forcing same rearwardly about its pivot shaft 999 to which is secured an arm 1000, carrying a roller bearing 1001. As this roller bearing is actuated forwardly, it engages the end of a reciprocatory shaft 1002 carrying at its forward end a pawl 1003 biased toward a ratchet wheel 1004 by a spring 1005. Shaft 1002 is normally held in a rearward position by a spring 1006, abutting against a collar on the shaft. It will thus be seen that as shaft 1002 is pushed forwardly, the pawl engages the teeth of ratchet wheel 1004 and rotates same about its shaft 1007 to which it is secured thereby causing actuation of worm 1008, carried by the shaft. The actuation of this worm causes the driving of gear 1009, secured to shaft 982 and through this the driving of ratchet 995, as set forth above. It will be noted that casting 7 supporting the timing mechanism T may be bodily removed from the base plate 3, carrying with it the timing mechanism, and that the machine will then be operative in the usual manner without the timing feature.

As roller bearing 931, carried by plate 584 is carried about shaft 585, it strikes a cam face on the end 983 of plate 958 and forces the same upwardly into normal position, shown in Fig. 26, thus restoring link 965 to its forward position, so that there will be no obstruction to the forward motion of the pin carried by connecting arm 968 when the timing mechanism reaches the point of throwing off the switch. This rotation of member 958 about its pivot causes link 956 to be pulled downwardly, thus forcing link 957 downwardly so that lever 959 may have its hook 961 raised under the influence of spring 989. This sets the hook in front of pin 962 so that when the plate 981 is rotated in a counterclockwise direction, the pulling backwardly of link 985 will cause bar 963 also to be pulled backwardly, thus throwing off the switch.

*Modifications.*

In the modification shown in Figs. 84 and 85, a different form of interlock for the ASC, TC, and STC levers is provided. In this form, when either the total or sub-total control is pulled, link 262 actuates the ASC lever, as in the form already described. This action is assisted by the engagement of pin 276 with link 277, which rocks shaft 280 to cause the ASC lever to be rocked on its pivot through the intermediary of link 1015 and rocker member 1013. Member 129 is provided with a hook 1010, which engages pin 311 on the total control and locks the same in forward position. It is now impossible to return the total control by itself, but if the ASC lever is pushed to adding position, cam 127, riding over roller bearing 128, mounted on lever 129, rocks the same about its pivot 130 and releases hook 1010 from pin 311. At the same time, pin 1011, engaging finger 1012, rocks arm 1013 about its pivot 234, carrying pin 1014, connected to link 1015, forwardly. This pulls arm 1016, pivotally connected to link 1015 forwardly about its pivot 280, thus pushing link 277 upwardly and rocking the TC and STC levers about their pivot 260.

When the non-add control is pulled forwardly about its pivot, the pivot member 244 is moved rearwardly and with it link 246. This pulls lever 248 rearwardly about its pivot so that finger 249 locks the ASC lever in adding position and causes cam member 250 to force downwardly locking finger 1017 on member 252. When the point of cam 250 passes the point of member 1017, the latter is permitted to again rise and the engagement of these two members then locks member 248 so that the release of the interlock is prevented until the machine has been actuated. When the touch bar is struck and the machine actuated, locking member 250 will be released from 1017 provided the repeat control has not been pulled forwardly. When this interlock is released, the non-add control will be returned to normal position, owing to member 253 being actuated about its pivot 180 by a spring surrounding said pivot, as shown in the dotted lines in Fig. 84. The connection of member 253 with the non-add control by means of pin 244 is shown in Fig. 84.

The release of the interlock between members 250 and 1017 is caused by member 117 engaging a cam face 1018 on a rearwardly projecting arm of member 252. It should be noted that finger 1017 has its end bent over to form a sufficient surface for engagement of member 250 to make it certain that these parts will inter-engage.

In the form shown in Figs. 84 and 85, arm 256, carrying hook 257, and the arm of lever 211, carrying pin 258, are dispensed with, as the same are now unnecessary.

Carried by link 226 is a hook member 1019, which is engaged by a pin 1020 on the total control when the same is pulled forwardly. The engagement of this pin with the hook member causes link 226 to be actuated forwardly in the event that the repeat control has previously been pulled, and causes the return thereof to normal position.

The construction shown in Fig. 60 may be simplified, as shown in Fig. 86, by the omission of members 190 and 317, together with connecting sleeve 315 and pin 188 on member 125.

The construction of the type magazine may be modified as shown in Figs. 87 and 88, by omitting the fingers shown in Fig. 50 between the springs and by adding a pair of springs 1021 connected at one end to a fixed portion of the type magazine and at their opposite end to the ends of a spring wire 1022, which engages a shoulder on each of the type bars, as shown best in Fig. 88. This will cause the retraction of any type bar which has been forced outwardly by a hammer blow, and does away with the necessity for a large number of springs. This also simplifies the construction of the type bar since the hook necessary in the construction shown in Fig. 50 may be dispensed with. The detail construction of the type bars may be seen by referring to Figs. 51, 54 and 89.

In order to insure perfect operation of the car-carriage stop members utilized in stopping the carriage when the same is actuated transversely of the machine, locking member 824 has a portion of the locking end 827 thereof cut away, as shown in Fig. 80, and in this cut-away portion is mounted a pivoted locking element 1023, formed of a pair of cross-arms of equal length but extending unequal distances from the point of union, as shown most clearly in Figs. 81 and 82. This locking member is pivoted at 1024 and is biased to the position of this locking member as shown in Fig. 83, in which one of the arms extends downwardly through a slot in one of the feathers 828, while the other arm rests on the top of this feather. When rod 830 is depressed, bail 826ª rises, engaging shoulder 825 and thereby lifting the locking member 1023 out of the slot, whereupon the springs 1025 rotate this locking member substantially into the position shown in Fig. 81. When the carriage control lever is operated to either extreme position or to a central position, bail 826ª permits member 824 to descend until the cross arms rest upon the top of the feather, thus holding the locking end 827 of member 824 above the plane of the feather. The force tending to cause rotation of member 824 about shaft 823 is sufficient so that when the carriage is caused to move transversely of the machine, one end of one of the arms 1023 will be caused to drop into a notch in the feather as the same reaches the end of the arm. The motion of the carriage will continue until projection 827 engages the notch, when further motion of the carriage is prevented.

In Figs. 76–79 inclusive is shown a mechanism for increasing the speed of transfer and simplifying the driving mechanism before the sector drive shaft and the sectors. In this construction, instead of having sectors 355 friction-driven from shaft 176, they are loosely mounted upon this shaft and are held in fixed relation with respect to sectors 356 by member 354, as heretofore explained, but are biased in one direction or the other with respect to said sector by means of springs 1026 and 1027. Rigidly secured to shaft 193 is a pair of crank arms 1030 pivotally connected to a pair of links 1031. The opposite end of these links is connected to a pair of members 1032 loosely mounted on shaft 176. Each of members 1032 carries a pin 1033, which projects through a slot 1034 in an end of arm 1029 is free to move downwardly under the influence of springs 1026 and 1027, mounted respectively on the sector arm 59 and an arm 1035 of sector 355. When the lower arm of spring 1027 strikes the bottom of hook 1036 on the arm 1035, this spring will cease to have any effect upon bail 1028, but link 1031 continues to force arms 1029 and bail 1028 downwardly to the limiting position as shown in Fig. 77. Carried on arms 1035 are roller bearings 1037, which are engaged by springs 1026 when bail 1028 has lowered to a point where it no longer keeps the springs out of contact with the roller bearing. When this spring engages the roller bearing and the bail moves away therefrom, if stop finger 354 be removed from notch 351, sector 355 will be moved forwardly with respect to sector 356 by the tension of spring 1026 against the roller bearing. This is the action during a subtracting operation and it will be seen that because of this structure sector 355 will be snapped forwardly quickly under the influence of spring 1026 mounted upon pin 384 and having an end secured to sector arm 59 by a pin 1026ª, since the sector 355 is loosely mounted upon shaft 176.

In Fig. 76, the parts are shown in normal position with the machine idle. If now a transfer is to be made in an adding operation, finger 347 is released and spring 352 causes the lowering of member 350, thereby releasing stop member 354. When this occurs, spring 1027, secured at 1038 and having one end secured to pin 1039 and its opposite end resting on roller bearing 1040, causes arm 1035 and with it sector 355 to be moved upwardly about shaft 176. It will therefore be seen that the transfer will be made to dial wheels 336 by sectors 355 instantly upon the release of stop member 354 from notch 351.

*Improving dial wheel visibility.*

In order to render the dial wheels visible at all times, the face plate 1041 of the machine is provided with a pair of slots 1042 and 1043, as seen best in Figs. 2 and 50. Beneath these slots is secured to each of the dial wheel arms 491 and 161, a shield 1044 or 1045, respectively. These plates cover the gear teeth of the dial wheels and all but one numeral thereof, it being provided with a notch 1046 as shown in Fig. 2. It will be noted that plate 1041 is secured to the frame castings and remains stationary while plates 1044 and 1045, being secured to movable arms 491 and 161, rise and fall therewith during the operation of the machine.

Locks.

At the left side of the machine (see Fig. 2) is a lock L secured to the carriage runway casting. The plunger 1047 of this lock passes through a perforation in the casing 6 and frame casting 5, thereby preventing the removal of the casting and carriage from the machine. This prevents unauthorized meddling with the mechanism of the inside of the machine.

Extending downwardly from base plate 3 of the machine (see Fig. 31) is a member carrying a lock L¹ having a plunger 1048, which extends through a perforation in 584 to prevent the actuation of pawl 587 and thereby prevent the machine from being turned over by touching off the touch bar TB.

Having described my invention, I claim:

1. In a machine of the character described, a set of dial wheels, a set of overdraft or net credit dial wheels, a set of sectors for operating the first set of dial wheels, a set of sectors for operating the second set of dial wheels, connecting means between the sectors for operating a sector of one set by a sector of the other set, and means for releasing the connection so that one sector may move relatively to its connected sector.

2. In a machine of the character described, a set of dial wheels, a set of overdraft or net credit dial wheels, means for operating the second set in conjunction with the first set, oscillatory means for limiting the amount of rotation of the first set of dial wheels, means for indicating when a subtracting operation causes the accumulated total to become negative, and means for determining the amount of a negative total, including an oscillatory feather carrying shaft whereby to change the limit of rotation of the overdraft dial wheels when determining the amount of a negative total.

3. In a machine of the character described, a set of dial wheels, a set of overdraft or net credit dial wheels, means for operating the second set in conjunction with the first set, oscillatory means for limiting the amount of rotation of the first set of dial wheels, means for indicating when a subtracting operation causes the accumulated total to pass zero, and means for determining the amount by which zero has been passed, including an oscillatory feather carrying shaft whereby to permit the overdraft or net credit dial wheels to rotate one more space than the first-named dial wheels.

4. In a machine of the character described, a set of overdraft or net credit dial wheels, means to rotate said dial wheels to determine the amount of the overdraft or net credit, means to limit the sphere of action of said last-named means, including a rotatably mounted feather carrying shaft.

5. In a machine of the character described, a set of overdraft or net credit dial wheels, means to rotate said dial wheels to determine the amount of an overdraft or net credit, means to limit the sphere of action of said last-named means, including a rotatably mounted feather-carrying shaft, the rotation of said feather-carrying shaft removing the feather from the path of said dial wheel rotating means, whereby the overdraft or net credit dial wheels are permitted to make a full revolution during the operation of determining a negative total.

6. In a machine of the character described, a set of overdraft or net credit dial wheels, means to rotate said dial wheels to determine the amount of an overdraft or net credit, means to limit the sphere of action of said last-named means, including a rotatably mounted feather carrying shaft, and means for restoring the shaft to normal position.

7. In a machine of the character described, a set of overdraft or net credit dial wheels, means to rotate said dial wheels to determine the amount of an overdraft or net credit, means to limit the sphere of action of said last-named means, including a rotatably mounted feather carrying shaft, and means for automatically restoring the shaft to normal position.

8. In a machine of the character described, two sets of dial wheels and a set of oscillatory sectors for each set of dial wheels, a sector of each set cooperating with a sector of the other set, said cooperating sectors being connected together for equal simultaneous motion but being adapted for limited relative motion when a transfer is to be made, in combination with means to restore said sectors to proper relative position after the transfer has been made.

9. In a machine of the character described, two sets of dial wheels, and a set of oscillatory sectors for each set of dial wheels, a sector of each set cooperating with a sector of the other set, said cooperating sectors being connected together for equal simultaneous motion but being adapted for limited relative motion when a transfer is to be made, in combination with means to limit the return motion of said sectors, and means to restore to normal position any sector which has been returned beyond that point.

10. In a machine of the character described, over-draft mechanism, transfer mechanism, and locking mechanism connected with the transfer mechanism adapted to be released by the operation of the overdraft mechanism.

11. In a machine of the character described, means for adding or subtracting numbers, means to predetermine the operation, means to accumulate the total, means to determine the amount of a negative total, means to control the last-named means, and means to lock said control means when actuated whereby completion of the operation of determining the negative total is rendered necessary, in combination with means to lock the means for predetermining the operation and to automatically release the same upon completion of the operation of determining the negative total and to lock the means for determining the negative total.

12. In a machine of the character described, means for adding and subtracting numbers, means to predetermine the operation, means to accumulate the total, means to determine the amount of a negative total, means to control the last-named means, and means to lock said control means when actuated, whereby completion of the operation of determining a negative total is rendered necessary, in combination with means to lock the means for predetermining the operation and to automatically release the same upon completion of the operation of determining the negative total and to lock the means for determining the negative total, said accumulating means being provided with means to control the actuation of the locking means.

13. In a machine of the character described, a set of oscillatory sectors adapted to actuate cooperating dial wheels, a lantern to limit rearward oscillating motion of said sectors and means to oscillate said lantern to rock in a reverse direction any of the sectors which have been released for transferring.

14. In a machine for adding, subtracting, and listing items, mechanism for indicating by a special character any subtracted number which causes the total accumulated by the machine to pass zero, including a hammer, means to hold the hammer inoperative, a set of dial wheels each provided with a tripping finger, the finger of one of the dial wheels being operative to cause the releasing of the hammer holding means, whereby the hammer is permitted to cause the printing of a special character.

15. In a machine for adding and subtracting numbers, mechanism for determining the amount by which the accumulated total has passed zero by reason of one or more subtraction operations, controls for predetermining the operation of finding this amount, locking mechanism for holding one of these controls in actuated position, a latch member for holding the lock in inoperative position, and connections between the latch member and the control whereby actuation of the latter will cause the former to release the lock to lock the control in actuated position.

16. In a machine of the character described, a set of dial wheels, one of said dial wheels having a cam thereon, a rocking lever adapted to engage said cam, a shaft, supporting and connecting means mounted on said shaft for oscillatory motion, arms secured to said last-named means, one of said arms engaging said lever and the other of said arms having secured thereto one end of a link, the remaining end of said link being secured to a pivotally mounted link, operation predetermining controls, locking means for said controls and connecting means between said locking means and said last-named link whereby the rocking of said first-named lever will cause such placing of the parts that actuation of the machine will cause the unlocking of certain controls and the locking of others.

17. In a machine for adding and subtracting numbers, a shaft, friction-drive mechanism secured to said shaft, a sector mounted on said shaft and engaging said friction drive mechanism, another sector loosely mounted on said shaft, locking mechanism holding the sectors in fixed relation to each other, means for unlocking the locking mechanism whereby relative motion of said sectors will be permitted, a U-shaped bail mounted on said shaft and driven by the driving mechanism of the machine, in combination with resilient means connecting the said sectors and adapted to connect the sectors and the U-shaped bail, whereby relative motion of the sectors will be caused when the locking mechanism is unlocked.

18. In a machine for adding and subtracting numbers, a pair of sectors locked together for simultaneous movement, one of said sectors being frictionally driven, mechanism for unlocking the locking means, whereby the sectors may have relative motion, a movable member, and resilient means engaging said sectors and adapted to be engaged by said movable member whereby, when the movable member is actuated, limited relative movement between the movable member and the sectors will be caused.

19. In a machine for adding and subtracting numbers, a pair of sectors locked together for simultaneous movement, one of said sectors being frictionally driven, mechanism for unlocking the locking means, whereby the sectors may have relative motion, a movable member, and resilient means engaging said sectors and adapted to engage said movable member, one of said resilient means causing relative movement between the sectors when they are unlocked and the movable member is actuated.

20. In a machine for adding and subtracting numbers, a pair of sectors locked together for simultaneous movement, one of said sectors being frictionally driven, mechanism for unlocking the locking means, whereby the sectors may have relative motion, a movable member, and resilient means secured to each sector and adapted to engage said movable member, one of said resilient means adapted to cause relative movement between the sectors when they are unlocked.

21. In a machine for adding and subtracting numbers, a sector driving shaft, friction drive members secured to said shaft, a plurality of sectors mounted on said shaft and driven thereby through the friction drive members, a plurality of sectors loosely mounted on said shaft adjacent said first-named sectors, means to lock said sectors for simultaneous movement in pairs, means to release said locking means so that one sector may oscillate in either direction with respect to its connected sector, a spring on each sector to cause relative movement between the sectors in one direction or the opposite when unlocked, and mechanism to cause the actuation of said sectors.

22. In a machine of the character described, a plurality of banks of keys, a plurality of rotatable correction keys for said banks, an index mark on each correction key, adapted to show whether the key is in normal or rotated position.

23. In a machine of the character described, a plurality of banks of keys, a rotatable correction key for each bank, and an index mark on each correction key to indicate when in normal position that the machine will function normally, but indicating when in rotated position that the part of the machine to the right of the bank in which the rotated key is located will function independently of that bank and those to the left thereof.

24. A correction bar for a key bank in a machine of the character described, comprising a bar provided on one edge with an apertured flange, and having on its opposite edge a pair of lugs lying substantially in the plane of the bar, a third lug bent at an angle to this plane, and a pair of bayonet slots whereby the bar may be easily assembled in the machine and may be reciprocated to retract the stop wires and to release the keys.

25. In a machine of the character described a bank of keys having one key which may function either as part of a splitting mechanism or part of a correction mechanism, the functioning of the key in either respect not affecting its functioning in the other.

26. In a machine of the character described, a key bearing upon its face a numeral indicating the first two figures of the year and adapted, when actuated, to cause the setting of other parts of the mechanism so that the latter, when actuated, shall cause the printing of that part of the year.

27. In a machine of the character described, a key bearing upon its face a numeral indicating the first two figures of the year and adapted, when actuated, to cause the setting of other parts of the mechanism so that the latter, when actuated, shall cause the printing of that part of the year, in combination with other keys adapted to be set to cause the printing of the remaining figures of the year.

28. In a machine of the character described, a bank of keys comprising months of the year, another key adjacent said bank and comprising the first two numerals of the year number.

29. In a machine of the character described, a bank of keys comprising months of the year, another key adjacent said bank and comprising the first two numerals of the year number, a type bar holder provided with type bars corresponding to each of the above named keys, mechanism for causing the type bars to print a character corresponding to any selected one of the above named keys.

30. In a machine of the character described, a dial wheel, a sector for actuating said dial wheel, a series of stops to stop said dial wheel after it has been rotated a predetermined number of spaces, means for predetermining which stop shall be effective in stopping the sector, a zero stop for preventing actuation of the sector to thereby prevent rotation of the dial wheel, means for removing the zero stop to permit rotation of the dial wheel when rotation thereof is desired, and a feather carrying shaft adapted to stop the sector when the dial wheel rotates nine or more spaces.

31. In a machine of the character described, a dial wheel, a sector for actuating said dial wheel, a zero stop for preventing actuation of the sector to thereby prevent rotation of the dial wheel, means for removing the zero stop to permit rotation of the dial wheel when rotation thereof is desired, and a feather carrying shaft adapted to stop the sector when the dial wheel rotates nine or more spaces.

32. A stop mechanism comprising a rotatable shaft, a clutch element secured thereto, a plate carrying a fixed stop having a pivoted clutch element mounted thereon, said plate being loosely mounted on said shaft, a gear connected to said plate, and a pair of stop members adapted to be selectively placed in the path of said pivoted clutch element and said stop on said plate, whereby to disconnect said clutch elements and said stop members.

33. A stop mechanism comprising a rotatable shaft, a clutch element secured thereto, a plate carrying a fixed stop and having a pivoted clutch element mounted thereon, said plate being loosely mounted on said shaft, a gear connected to said plate, and a pair of stop members adapted to be selectively placed in the path of said pivoted clutch element and said stop on said plate, whereby to disconnect said clutch elements and to stop rotation of said gear by means of one or the other of said stop members, in combination with means to connect said pair of stop members and hold them out of position to engage said stop member on said plate and the connected clutch element, whereby continuous operation of said gear is rendered possible.

34. A stop mechanism comprising a rotatable shaft, a clutch element secured thereto, a plate carrying a fixed stop and having a pivoted clutch element mounted thereon, said plate being loosely mounted on said shaft, a gear connected to said plate and a pair of stop members adapted to be selectively placed in the path of said pivoted clutch element and said stop on said plate, whereby to disconnect said clutch element and to stop rotation of said gear by means of one or the other of said stop members, in combination with means to predetermine and indicate which of the stop members is to be effective in stopping the rotation of the gear.

35. In a machine for adding, subtracting and printing items, means for causing the items to be sorted out and printed in separate columns, said machine having a carriage and an addition-subtraction control, and said means including an automatic release for the carriage whereby the same is permitted to be automatically shifted to right or left upon the actuation of the addition-subtraction control.

36. A manual release mechanism for a stop pawl in a machine of the character described comprising an elongated bale adapted to engage the pawl, a control adapted to be actuated manually and a connection between the control and the bale whereby the latter may be actuated by the actuation of the former.

37. In a stop mechanism, a fixed element carrying an adjustable stop member, a movable element carrying a movable stop member, an elongated pivoted member for moving said movable stop member and a cam member for actuating said pivoted member.

38. A carriage control mechanism comprising a manually actuated member, a lever engaged thereby to be rocked about its pivot, a link reciprocated by said lever, a lever rocked about its pivot by said link, resiliently held levers controlling oppositely rotating clutch members and engaging said last named lever, said clutch controlling levers being adapted upon actuation of said manually actuated means to cause engagement of one or the other clutch member with a member to be driven, whereby said driven member may be rotated in one direction or the other.

39. In a machine of the character described, a pivoted control member, a lever adapted to be rocked thereby, a slidable link connected with said lever, a direction reversing clutch actuated by said link, and a stop mechanism releasing member simultaneously actuated by said link, whereby the member to be actuated may be released for movement and a clutch may be thrown for causing movement thereof in one or the other direction by actuation of a single control member.

40. A carriage release mechanism for a machine of the character described having a longitudinally shiftable carriage, comprising a lever mounted thereon, a link connected to said lever, a pivotally mounted locking pawl, and connections between same and the link whereby the pawl may be released from locking position and the carriage shifted manually upon actuation of the lever.

41. A carriage release mechanism for a machine of the character described having a longitudinally shiftable carriage, a lever mounted thereon, a link connected to said lever, a pivotally mounted locking pawl, and connections between same and the link whereby the pawl may be released from locking position and the carriage shifted manually upon actuation of the lever, in combination with mechanism for actuating the carriage by power driven means.

42. In a carriage mechanism in which the carriage is adapted to be actuated by power driven mechanism, means for locking the carriage in definite locations, and manually operated means for releasing the locking means and shifting the carriage.

43. In a machine of the character described, a frame carrying operative parts, a cover for said frame and parts, a carriage runway casting removably secured to said frame, and a lock secured to the runway casting, having a plunger adapted to enter alined perforations in the cover and frame, whereby to prevent unauthorized removal of the cover and casting from the frame.

44. In a machine of the character described, a support carrying operative parts and provided with a cover for said parts, a second support, external to said cover, connected to said first named support and removable therefrom, said last named support carrying a lock adapted to engage the first named support and cover, whereby to prevent unauthorized removal of said cover and second named support.

In witness whereof, I hereunto subscribe my name to this specification.

MARTIN TEETOR.